(12) United States Patent
Zhang et al.

(10) Patent No.: US 12,446,038 B2
(45) Date of Patent: Oct. 14, 2025

(54) METHOD FOR RESOLVING OVERLAPPING OF UPLINK TRANSMISSIONS IN A WIRELESS COMMUNICATION SYSTEM BASED ON PRIORITIES

(71) Applicant: Samsung Electronics Co., Ltd., Gyeonggi-do (KR)

(72) Inventors: Sa Zhang, Beijing (CN); Feifei Sun, Beijing (CN); Jingxing Fu, Beijing (CN); Yi Wang, Beijing (CN)

(73) Assignee: Samsung Electronics Co., Ltd., Seoul (KR)

( * ) Notice: Subject to any disclaimer, the term of this patent is extended or adjusted under 35 U.S.C. 154(b) by 852 days.

(21) Appl. No.: 17/574,952

(22) Filed: Jan. 13, 2022

(65) Prior Publication Data

US 2022/0225380 A1 Jul. 14, 2022

(30) Foreign Application Priority Data

| Jan. 13, 2021 | (CN) | 202110044600 |
| Jan. 29, 2021 | (CN) | 202110126982 |
| Apr. 2, 2021 | (CN) | 202110363842 |
| May 19, 2021 | (CN) | 202110546503 |
| Aug. 4, 2021 | (CN) | 202110893383 |

(Continued)

(51) Int. Cl.
*H04W 72/1268* (2023.01)
*H04W 72/21* (2023.01)
(Continued)

(52) U.S. Cl.
CPC ....... *H04W 72/21* (2023.01); *H04W 72/1268* (2013.01); *H04W 72/23* (2023.01); *H04W 72/566* (2023.01); *H04L 1/1812* (2013.01)

(58) Field of Classification Search
CPC .......... H04W 72/232; H04W 72/1268; H04W 72/1284; H04L 1/1812
See application file for complete search history.

(56) References Cited

U.S. PATENT DOCUMENTS 12,335,050 B2 * 6/2025 Yin ................. H04W 72/56
2020/0228173 A1 * 7/2020 Ye ................... H04L 5/0055
(Continued)

FOREIGN PATENT DOCUMENTS

| EP | 3 681 072 | 7/2020 |
| WO | WO 2020/168351 | 8/2020 |
| WO | WO 2020/206226 | 10/2020 |

OTHER PUBLICATIONS

ETSI, "TS 138 213 V16.3.0", Nov. 2020, pp. 1-171 (Year: 2020).*
(Continued)

*Primary Examiner* — Salvador E Rivas
(74) *Attorney, Agent, or Firm* — The Farrell Law Firm, P.C.

(57) ABSTRACT

The disclosure provides a method performed by a second type of transceiving node in a wireless communication system, including receiving a first type of data and/or a first type of control signaling from a first type of transceiving node, and transmitting uplink control information (UCI) to the first type of transceiving node, wherein, if multiple physical uplink control channels (PUCCHs) with UCIs of different priorities overlap in a time domain, the multiple PUCCHs are multiplexed and/or prioritized.

4 Claims, 18 Drawing Sheets

(30) Foreign Application Priority Data

Aug. 23, 2021 (CN) .......................... 202110970547
Sep. 29, 2021 (CN) .......................... 202111152755
Oct. 18, 2021 (CN) .......................... 202111212263

(51) Int. Cl.
*H04W 72/23* (2023.01)
*H04W 72/566* (2023.01)
*H04L 1/1812* (2023.01)

(56) References Cited

U.S. PATENT DOCUMENTS

2021/0136791 A1* 5/2021 Akkarakaran ........ H04L 5/0044
2022/0287057 A1* 9/2022 Yamamoto ............ H04W 72/23
2023/0354313 A1* 11/2023 Yin ........................ H04L 1/1854

OTHER PUBLICATIONS

ETSI, "TR 121 915 V15.0.0", Oct. 2019, pp. 1-120 (Year: 2019).*
Moderator (OPPO), "Summary#1 of Email Thread [103-e-NR-IIOT_URLLC_enh-04]", R1-2009546, 3GPP TSG RAN WG1 #102-e, Aug. 17-28, 2020, 96 pages.
Moderator (OPPO), "Summary#1 on Intra-UE Multiplexing/Prioritization for R17", R1-2009045, 3GPP TSG RAN WG1 #103-e, Oct. 26-Nov. 13, 2020, 44 pages.
European Search Report dated Mar. 27, 2024 issued in counterpart application No. 22739721.3-1213, 13 pages.
3GPP TS 38.331 V16.7.0 (Dec. 2021) Technical Specification 3rd Generation Partnership Project; Technical Specification Group Radio Access Network; NR; Radio Resource Control (RRC) protocol specification (Release 16), pp. 963.
3GPP TS 38.213 V16.0.0 (Dec. 2019) Technical Specification 3rd Generation Partnership Project; Technical Specification Group Radio Access Network; NR; Physical layer procedures for control (Release 16), pp. 146.
Radiocommunication Study Groups, International Telecommunication Union, Document 5D/TEMP/466-E, Oct. 21, 2014, English only, SWG Traffic, Working Document Towards a Preliminary Draft New Report ITU-R M M.[IMT.BEYOND2020.TRAFFIC] IMT Traffic estimates beyond year 2020, pp. 35.
ITU-R Radiocommunication Sector of ITU, Report ITU-R M.2320. 0, (Nov. 2014), Future technology trends of terrestrial IMT systems, M Series, Mobile, radiodetermination, amateur and related satellite services, International Telecommunication Union, pp. 32.
ITU-R Radiocommunication Sector of ITU, Recommendation ITU-R M.2083-0 (Sep. 2015), IMT Vision-Framework and overall objectives of the future development of IMT for 2020 and beyond, M Series, Mobile, radiodetermination, amateur and related satellite services, International Telecommunication Union, pp. 21.
Nokia et al., "On UL Intra-UE Prioritization and Multiplexing Enhancements", R1-2008843, 3GPP TSG RAN WG1 #103-e, Oct. 26-Nov. 13, 2020, 20 pages.
ZTE, "Discussion on Enhanced Intra-UE Multiplexing", R1-2008824, 3GPP TSG RAN WG1 #103-e, Oct. 26-Nov. 13, 2020, 9 pages.
Vivo, "Intra-UE Multiplexing/Prioritization for Rel-17 URLLC", R1-2007658, 3GPP TSG RAN WG1 #103-e, Oct. 26-Nov. 13, 2020, 9 pages.
International Search Report dated Apr. 29, 2022 issued in counterpart application No. PCT/KR2022/000659, 7 pages.

* cited by examiner

METHOD FOR RESOLVING OVERLAPPING OF UPLINK TRANSMISSIONS IN A WIRELESS COMMUNICATION SYSTEM BASED ON PRIORITIES

PRIORITY

This application is based on and claims priority under 35 U.S.C. § 119 to Chinese Patent Application Nos. 202110044600.8, 202110126982.9, 202110363842.3, 202110546503.9, 202110893383.X, 202110970547.4, 202111152755.X, and 202111212263.5, which were filed in Chinese Patent Office on Jan. 13, 2021, Jan. 29, 2021, Apr. 2, 2021, May 19, 2021, Aug. 4, 2021, Aug. 23, 2021, Sep. 29, 2021, and Oct. 18, 2021, respectively, the entire disclosure of each of which is incorporated herein by reference.

BACKGROUND

1. Field

The disclosure relates generally to a transmitting method and a receiving method for uplink control information, and more particularly, to determining physical resources for transmitting uplink control information (UCI) according to UCI of different priorities.

2. Description of Related Art

In order to meet the increasing demand for wireless data communication services since the deployment of fourth generation (4G) communication systems, efforts have been made to develop improved fifth generation (5G) or pre-5G communication systems, also referred to as beyond 4G networks or post-long term evolution (LTE) systems.

In order to achieve a higher data rate, 5G communication systems are implemented in higher frequency millimeter wave (mmWave) bands, e.g., 60 gigahertz (GHz) bands. In order to reduce propagation loss of radio waves and increase a transmission distance, technologies such as beamforming, massive multiple-input multiple-output (MIMO), full dimensional MIMO (FD-MIMO), array antenna, analog beamforming and large-scale antenna are being researched in 5G communication systems.

In addition, developments of system network improvement are underway based on advanced small cell, cloud radio access network (RAN), ultra-dense network, device-to-device (D2D) communication, wireless backhaul, mobile network, cooperative communication, coordinated multi-points (CoMP), and reception-end interference cancellation, for example.

In 5G systems, hybrid frequency shift keying (FSK) and quadrature amplitude modulation (FQAM) and sliding window superposition coding (SWSC) as advanced coding modulation (ACM), and filter bank multi carrier (FBMC), non-orthogonal multiple access (NOMA) and sparse code multiple access (SCMA) as advanced access technologies have been developed.

With the rapid development of information industry, especially the increasing demand from mobile Internet and internet of things (IoT), unprecedented challenges have been brought to the future mobile communication technology. Specifically, the growth of mobile traffic and the number of UE connections and of connected devices continues to rise at an alarming rate with the massive IoT devices gradually infiltrating in the mobile communication network. In order to meet the unprecedented challenges, the communication industry and academia have performed extensive research on the current 5G mobile communication technology. International Telecommunication Union (ITU) report ITU-R provides information related to the technology trends of 5G, aiming at solving significant problems such as significantly improved system throughput, consistent user experience, scalability to support IoT, delay, energy efficiency, cost, network flexibility, support of emerging services and flexible spectrum utilization. In 3GPP (3rd generation partnership project), the first stage of 5G is already in progress. To support more flexible scheduling, the 3GPP decides to support variable hybrid automatic repeat request-acknowledgement (HARQ-ACK) feedback delay in 5G. In existing LTE systems, a time from reception of downlink data to uplink transmission of HARQ-ACK is fixed. For example, in frequency division duplex (FDD) systems, the delay is 4 subframes. In time division duplex (TDD) systems, a HARQ-ACK feedback delay is determined for a corresponding downlink subframe according to an uplink and downlink configuration. In 5G systems, whether FDD or TDD systems, for a determined downlink time unit (for example, a downlink slot or a downlink mini slot), the uplink time unit that can feedback HARQ-ACK is variable. For example, the delay of HARQ-ACK feedback can be dynamically indicated by physical layer signaling, or different HARQ-ACK delays can be determined according to factors such as different services or user capabilities.

The 3GPP has defined three directions of 5G application scenarios-enhanced mobile broadband (eMBB), massive machine-type communication (mMTC) and ultra-reliable and low-latency communication (URLLC). The eMBB scenario aims to further improve data transmission rate on the basis of the existing mobile broadband service scenario, so as to enhance user experience and pursue ultimate communication experience between people. mMTC and URLLC are the application scenarios of the Internet of Things, but their respective emphases are different: mMTC being mainly information interaction between people and things, while URLLC mainly reflecting communication requirements between things.

In 5G, eMBB and URLLC will adopt a manner of joint networking, that is, both URLLC services and eMBB services are supported in the same cell. Since URLLC services may be sparse services, compared with URLLC alone networking, eMBB and URLLC joint networking can improve the spectrum efficiency of the system. When there are URLLC services in the system, it is preferred to schedule URLLC services, and when there are no URLLC services in the system or the resources occupied by URLLC services are less, eMBB services can be scheduled. At present, when there is a conflict between URLLC services and eMBB services, data and/or control information of URLLC services will be preferentially transmitted, thus losing performance of eMBB services. Therefore, how to optimize the transmission of data and control information of services (e.g., eMBB services) is a problem to be solved urgently.

As such, there is a need in the art for a transmitting method and apparatus and a receiving method and apparatus for uplink control information, in order to improve the transmission of the uplink control information.

SUMMARY

The disclosure has been made to address at least the above-mentioned problems and/or disadvantages and to provide at least the advantages described below.

Accordingly, an aspect of the disclosure is to provide a multiplexing method that can improve transmission probability of the HARQ-ACK of a lower priority by ensuring delay and reliability of the scheduling request (SR) of the higher priority.

Another aspect of the disclosure is to provide a multiplexing method that reduces probability of downlink data retransmission, thereby increasing system spectrum efficiency.

Another aspect of the disclosure is to provide a multiplexing method that can dynamically indicate whether to multiplex through higher layer signaling configuration or downlink control information (DCI), which can also increase scheduling flexibility.

Another aspect of the disclosure is to provide a method which increases transmission probability of a HARQ-ACK of a lower priority, reduces the number of retransmissions of downlink data, increase system spectrum efficiency, and reduces user side delay.

In accordance with an aspect of the disclosure, a method performed by a second type of transceiving node in a wireless communication system includes receiving a first type of data and/or a first type of control signaling from a first type of transceiving node, and transmitting uplink control information (UCI) to the first type of transceiving node, wherein, if multiple physical uplink control channels (PUCCHs) with UCIs of different priorities overlap in a time domain, the multiple PUCCHs are multiplexed and/or prioritized.

In accordance with an aspect of the disclosure, a second type of transceiving node in a wireless communication system is provided, which includes: a transceiver, configured to receive a first type of data and/or a first type of control signaling from a first type of transceiving node; a controller, configured to control the overall operation of the second type of transceiving node, including: controlling the transceiver to receive the first type of data and/or the first type of control signaling from the first type of transceiving node, and controlling the transceiver to transmit UCI to the first type of transceiving node in the time unit, where if multiple Physical Uplink Control Channels (PUCCHs) with UCIs of different priorities overlap in time domain, the multiple PUCCHs are multiplexed and/or prioritized.

In accordance with an aspect of the disclosure, a method performed by a first type of transceiving node in a wireless communication system is provided, which includes: transmitting a first type of data and/or a first type of control signaling to a second type of transceiving node; and receiving Uplink Control Information (UCI) from the second type of transceiving node in the time unit, where if multiple Physical Uplink Control Channels (PUCCHs) with UCIs of different priorities overlap in time domain, the multiple PUCCHs are multiplexed and/or prioritized.

In accordance with an aspect of the disclosure, a first type of transceiving node in a wireless communication system is provided, which includes: a transceiver, configured to transmit a first type of data and/or a first type of control signaling to a second type of transceiving node, and receive Uplink Control Information (UCI) from the second type of transceiving node in the time unit; and a controller, configured to control the overall operation of the first type of transceiving node, including: controlling the transceiver to transmit the first type of data and/or the first type of control signaling to the second type of transceiving node, and controlling the transceiver to receive Uplink Control Information (UCI) from the second type of transceiving node in the time unit, where if multiple Physical Uplink Control Channels (PUCCHs) with UCIs of different priorities overlap in time domain, the multiple PUCCHs are multiplexed and/or prioritized.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
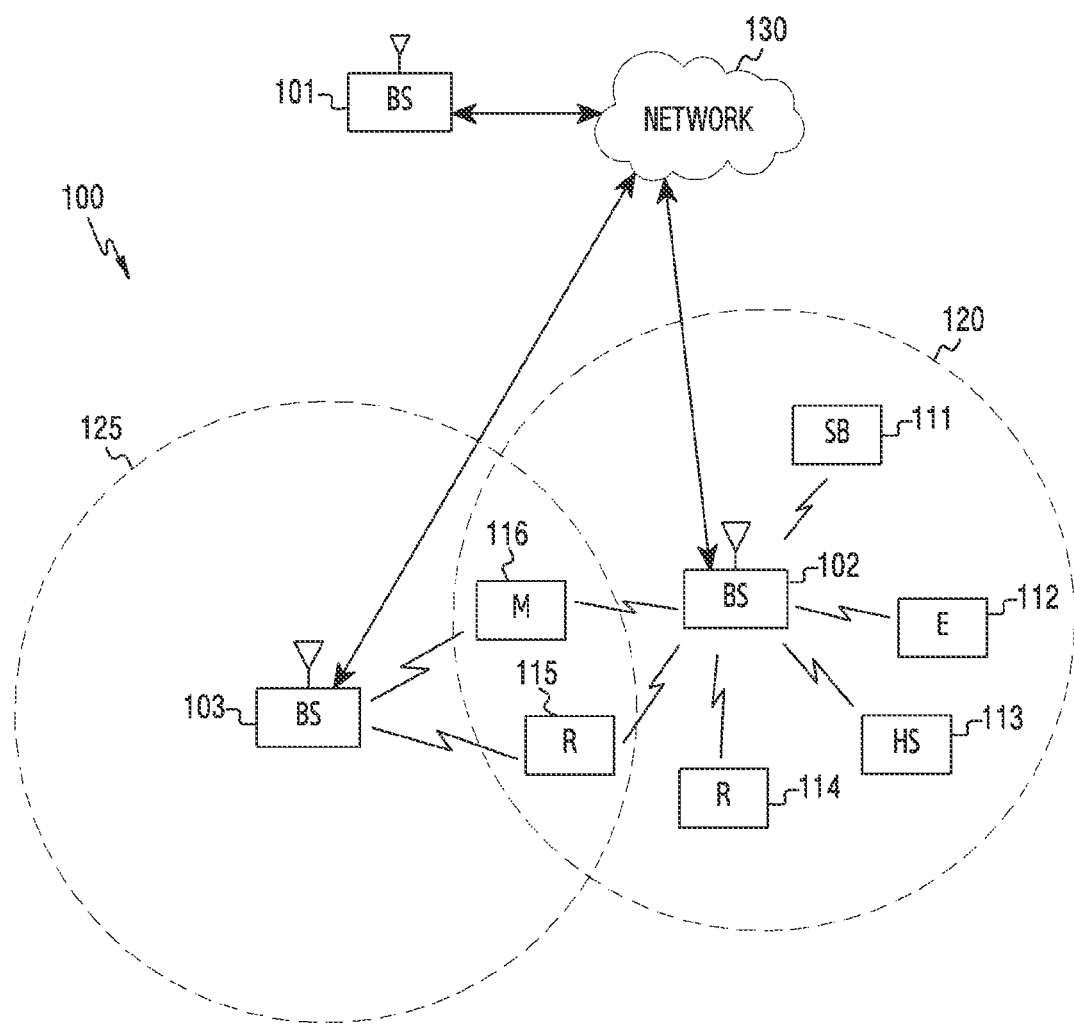
FIG. 1 illustrates a wireless network to which the disclosure is applied.

Hereinafter, embodiments are described in detail with reference to the accompanying drawings. The same reference denotations may be used to refer to the same or similar elements throughout the specification and the drawings. In the following description and drawings, a detailed description of known functions or configurations that may make the subject matter of the disclosure unnecessarily unclear will be omitted.

Herein, the term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C. For example, "at least one of: A, B, or C" includes any of the following combinations: A, B, C, A and B, A and C, B and C, and A and B and C.

Terms used herein to describe the embodiments of the disclosure are not intended to limit and/or define the scope of the disclosure. For example, unless otherwise defined, the technical terms or scientific terms used in the present disclosure shall have the ordinary meaning understood by those with ordinary skill in the art to which the disclosure pertains.

It should be understood that "first", "second" and similar words used in the present disclosure do not express any order, quantity or importance, but are only used to distinguish different components. Unless otherwise indicated by the context clearly, similar words such as "a", "an" or "the" in a singular form do not express a limitation of quantity but express an existence of at least one.

As used herein, any reference to "one example" or "example", "one embodiment" or "embodiment" indicates that particular elements, features, structures or characteristics described in connection with the embodiment are included in at least one embodiment. The phrases "in one embodiment" or "in one example" appearing in different places in the specification do not necessarily refer to the same embodiment.

It will be further understood that similar words such as the term "include" or "comprise" indicate that elements or objects appearing before the word encompass the listed elements or objects appearing after the word and their equivalents, but other elements or objects are not excluded. Similar words such as "connect" or "connected" are not limited to physical or mechanical connection, but can include electrical connection, whether direct or indirect. "Upper", "lower", "left" and "right" are only used to express a relative positional relationship, and when an absolute position of the described object changes, the relative positional relationship may change accordingly.

Those skilled in the art can understand that terminal and terminal device as used herein include not only devices with wireless signal receiver which have no transmitting capability, but also devices with receiving and transmitting hardware which can perform bidirectional communication on a bidirectional communication link. Such devices may include cellular or other communication devices with single-line displays or multi-line displays or cellular or other communication devices without multi-line displays, a personal communications service (PCS), which may combine voice, data processing, fax and/or data communication capabilities, a PDA, which may include an RF receiver, a pager, an internet/intranet access, a web browser, a notepad, a calendar and/or a global positioning system (GPS) receiver, a conventional laptop and/or palmtop computer or other devices having and/or including a radio frequency receiver. Terminal and terminal device as used herein may be portable, transportable, installed in vehicles (aviation, sea transportation and/or land), or suitable and/or configured to operate locally, and/or in distributed form, operate on the earth and/or any other position in space and be a communication terminal, an internet terminal, a music/video playing terminal, such as a PDA, a mobile Internet device (MID) and/or a mobile phone with music/video playing functions, a smart television (TV), a set-top box and other devices.

Depending on the network type, the term base station or BS can refer to any component or collection of components configured to provide wireless access to a network, such as a transmit point (TP), a transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP NR interface/access, long term evolution (LTE), LTE advanced (LTE-A), high speed packet access (HSPA), Wi-Fi 802.11a/b/g/n/ac, etc. For the sake of convenience, the terms BS and gNB are used interchangeably herein to refer to network infrastructure components that provide wireless access to remote terminals. Also, depending on the network type, the term user equipment or UE can refer to any component such as mobile station, subscriber station, remote terminal, wireless terminal, receive point, user device, or simply terminal. For the sake of convenience, the terms user equipment and UE are used herein to refer to remote wireless equipment that wirelessly accesses a BS, whether the UE is a mobile device (such as a mobile telephone or smartphone) or is normally considered a stationary device (such as a desktop computer or vending machine).

In describing the wireless communication system herein, higher layer signaling is a signal transmission method for transmitting information from a base station to a terminal through a downlink data channel of physical layer or transmitting information from a terminal to a base station through an uplink data channel of physical layer The signal transmission method may include methods for transmitting information through radio resource control (RRC) signaling, packet data convergence protocol (PDCP) signaling, or medium access control (MAC) control element (MAC CE).

The embodiments discussed below for describing the disclosure are for illustration only and should not be interpreted as limiting the scope of the present disclosure in any manner. Those skilled in the art will understand that the principles of the present disclosure can be implemented in any suitably arranged wireless communication system. For example, although the disclosure will be directed to LTE and 5G communication system, those skilled in the art can understand that the main points of the present disclosure can also be applied to other communication systems with similar technical backgrounds and channel formats with slight modifications without departing from the scope of the present disclosure. For example, the communication systems may include a global system for mobile communications (GSM) system, code division multiple access (CDMA) system, wideband code division multiple access (WCDMA) system, general packet radio service (GPRS), long term evolution (LTE) system, LTE frequency division duplex (FDD) system, LTE time division duplex (TDD), universal mobile telecommunications system (UMTS), worldwide interoperability for microwave access (WiMAX) communication system, or 5G system or new radio (NR) c. In addition, the technical schemes of the embodiments of the disclosure can be applied to future-oriented communication technologies.

It should be noted that in the disclosure, the same reference numerals in different drawings will be used to refer to the same elements already described.

FIG. 1 illustrates an example wireless network 100 to which the disclosure is applied.

The wireless network 100 includes a gNodeB (gNB) 101, a gNB 102, and a gNB 103. gNB 101 communicates with gNB 102 and gNB 103. Each gNB also refers to a base station (BS), as shown. gNB 101 also communicates with at least one Internet protocol (IP) network 130, such as the Internet, a private IP network, or other data networks.

Depending on a type of the network, other well-known terms such as base station or access point can be used instead of gNodeB or gNB. For convenience, the terms gNodeB and gNB are used herein to refer to network infrastructure components that provide wireless access for remote terminals. Depending on the type of the network, other well-known terms such as mobile station, user station, remote terminal, wireless terminal or user apparatus can be used instead of user equipment or UE. For convenience, the terms user equipment and UE may be used herein to refer to remote wireless devices that wirelessly access the gNB, regardless of whether the UE is a mobile device (such as a mobile phone or a smart phone) or a fixed device (such as a desktop computer or a vending machine).

The gNB 102 provides wireless broadband access to the network 130 for a first plurality of UEs within a coverage area 120 of gNB 102, including a UE 111, which may be placed in a small business (SB), a UE 112, which may be placed in an enterprise (E), a UE 113, which may be placed in a wireless fidelity (WiFi) hotspot (HS), a UE 114, which may be placed in a first residence (R), a UE 115, which may be placed in a second residence (R), and a UE 116, which may be a mobile device (M), such as a cellular phone, a wireless laptop computer, a wireless personal data assistant (PDA). The gNB 103 provides wireless broadband access to network 130 for a second plurality of UEs within a coverage area 125 of gNB 103. The second plurality of UEs include a UE 115 and a UE 116. One or more of gNBs 101-103 can communicate with each other and with UEs 111-116 using 5G, LTE, LTE-A, worldwide interoperability of microwave access (WiMAX) or other advanced wireless communication technologies.

The dashed lines show approximate ranges of the coverage areas 120 and 125, and are shown as circles for illustration and explanation purposes. It should be clearly understood that the coverage areas associated with the gNBs, such as the coverage areas 120 and 125, may have other shapes depending on configurations of the gNBs and changes in the radio environment associated with natural obstacles and man-made obstacles.

As will be described in more detail below, one or more of gNB 101, gNB 102, and gNB 103 include a two-dimensional (2D) antenna array and support codebook designs and structures for systems with 2D antenna arrays.

Although FIG. 1 illustrates the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
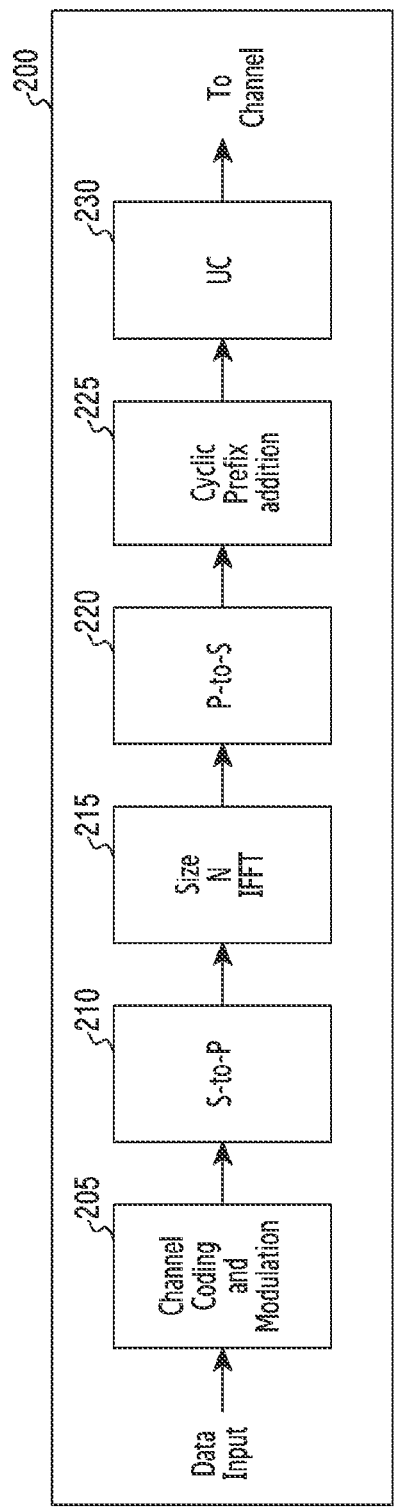
FIGS. 2A and 2B illustrate example wireless transmission and reception paths according to an embodiment.
Figure 2B:
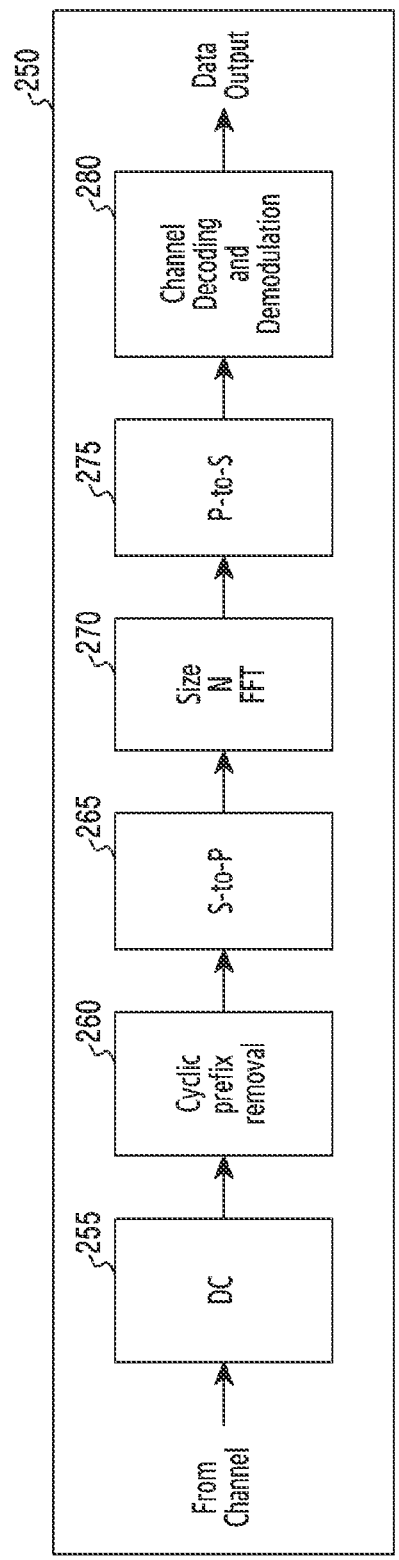

FIGS. 2A and 2B illustrate example wireless transmission and reception paths according to an embodiment. Herein, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. The reception path 250 is configured to support codebook designs and structures for systems with 2D antenna arrays as described herein.

As seen in FIG. 2A, the transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. As seen in FIG. 2B, the reception path 250 includes a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The S-to-P block 210 converts (such as, demultiplexes) serial modulated symbols in parallel data to generate N parallel symbol streams, where N is a size of the IFFT/FFT used in the gNB 102 and the UE 116. The size N IFFT block 215 performs IFFT operations on the N parallel symbol streams to generate a time-domain output signal. The P-to-S block 220 converts (such as multiplexes) parallel time-domain output symbols from the Size N IFFT block 215 to generate a serial time-domain signal. The cyclic prefix addition block 225 inserts a cyclic prefix in the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from the gNB 102 arrives at the UE 116 after passing through the wireless channel, and operations in reverse to those at the gNB 102 are performed at the UE 116. The down-converter 255 down-converts the received signal to a baseband frequency, and the cyclic prefix removal block 260 removes the cyclic prefix to generate a serial time-domain baseband signal. The S-to-P block 265 converts the time-domain baseband signal in a parallel time-domain signal. The Size N FFT block 270 performs an FFT algorithm to generate N parallel frequency-domain signals. The P-to-S block 275 converts the parallel frequency-domain signal in a sequence of modulated data symbols. The channel decoding and demodulation block 280 demodulates and decodes the modulated symbols to recover the original input data stream.

Each of the gNBs 101-103 may implement a transmission path 200 similar to that for transmitting to the UEs 111-116 in the downlink and may implement a reception path 250 similar to that for receiving from the UEs 111-116 in the uplink. Similarly, each of the UEs 111-116 may implement a transmission path 200 for transmitting to the gNBs 101-103 in the uplink, and may implement a reception path 250 for receiving from the gNBs 101-103 in the downlink.

Each of the components in FIGS. 2A and 2B can be implemented using only hardware or a combination of hardware and software/firmware. For example, at least some of the components in FIGS. 2A and 2B may be implemented in software, while other components may be implemented in configurable hardware or a combination of software and configurable hardware. The FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as discrete Fourier transform (DFT) and inverse discrete Fourier transform (IDFT) functions. For the DFT and IDFT functions, the value of variable N may be any integer (such as 1, 2, 3, 4, etc.), while for the FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
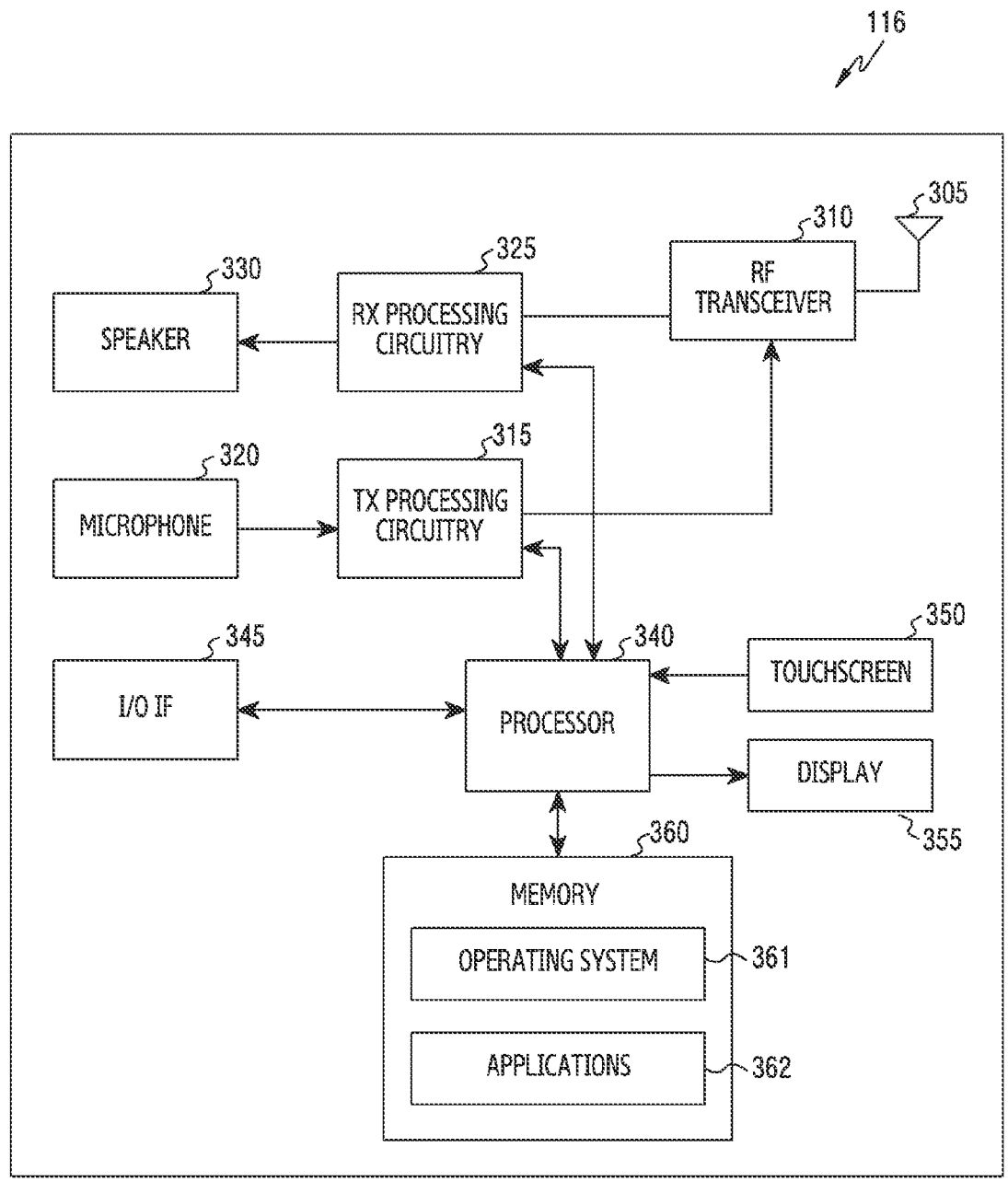
FIG. 3A illustrates an example user equipment (UE) according to an embodiment.

FIG. 3A illustrates a UE 116 according to an embodiment. The embodiment of UE 116 shown in FIG. 3A is for illustration only and the present disclosure is not limited to any specific implementation of the UE.

The UE 116 includes an antenna 305, an RF transceiver 310, a transmission (TX) processing circuit 315, a microphone 320, a reception (RX) processing circuit 325, a speaker 330, a processor/controller 340, an input/output (I/O) interface 345, an input device(s) (touchscreen) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal in an RF signal transmitted via the antenna 305.

The processor/controller 340 can include one or more processors or other processing devices and executes an OS 361 stored in the memory 360 in order to control the overall operation of the UE 116. For example, the processor/controller 340 can control the reception of forward channel signals and the transmission of backward channel signals through the RF transceiver 310, the RX processing circuit 325 and the TX processing circuit 315 according to well-known principles. The processor/controller 340 includes at least one microprocessor or microcontroller.

The processor/controller 340 is also capable of executing other processes and programs residing in the memory 360, such as operations for channel quality measurement and reporting for systems with 2D antenna arrays. The processor/controller 340 can transport data in or out of the memory 360 as required by an execution process. The processor/controller 340 is configured to execute the application 362 based on the OS 361 or in response to signals received from the gNB or the operator. The processor/controller 340 is also coupled to an I/O interface 345 which provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of the UE 116 can input data in the UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates the UE 116, various changes can be made to FIG. 3A. For example, various components in FIG. 3A can be combined, further subdivided or omitted, and additional components can be added according to specific requirements. As a specific example, the processor/controller 340 can be divided in a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
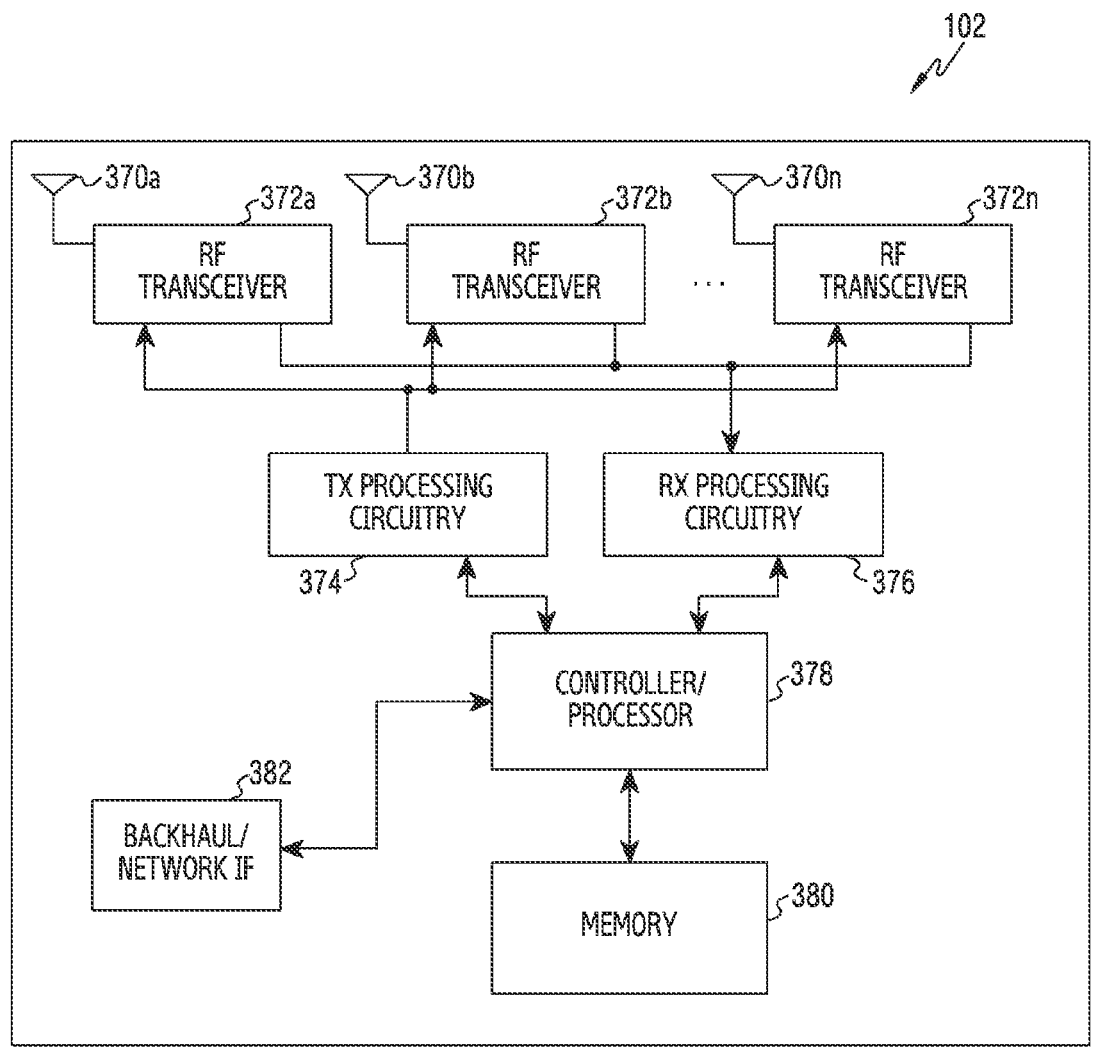
FIG. 3B illustrates an example gNB according to an embodiment.

FIG. 3B illustrates a gNB 102 according to an embodiment. The embodiment of gNB 102 shown in FIG. 3B is for illustration only, and the present disclosure is not limited to any specific implementation of a gNB. It should be noted that gNB 101 and gNB 103 can include the same or similar structures as gNB 102.

As shown in FIG. 3B, the gNB 102 includes a plurality of antennas 370a-370n, a plurality of RF transceivers 372a-372n, a TX processing circuit 374, and an RX processing circuit 376. In certain embodiments, one or more of the plurality of antennas 370a-370n include a 2D antenna array. The gNB 102 also includes a controller/processor 378, a memory 380, and a backhaul or network interface 382.

The RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. The RX processing circuit 376 transmits the processed baseband signal to controller/processor 378 for further processing.

The TX processing circuit 374 receives analog or digital data (such as voice data, network data, email or interactive video game data) from the controller/processor 378. The TX processing circuit 374 encodes, multiplexes and/or digitizes outgoing baseband data to generate a processed baseband or IF signal. The RF transceivers 372a-372n receive the outgoing processed baseband or IF signal from TX processing circuit 374 and up-convert the baseband or IF signal in an RF signal transmitted via antennas 370a-370n.

The controller/processor 378 can include one or more processors or other processing devices that control the overall operation of the gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind interference sensing (BIS) process such as that performed through a BIS algorithm, and decode a received signal from which an interference signal is subtracted. A controller/processor 378 may support any of a variety of other functions in gNB 102. The controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described herein. The controller/processor 378 supports communication between entities such as web real-time communications (RTCs). The controller/processor 378 can move data in or out of the memory 380 as required by an execution process.

The controller/processor 378 is also coupled to the backhaul or network interface 382 which enables the gNB 102 to communicate with other devices or systems through a backhaul connection or through a network. The backhaul or network interface 382 can support communication over any suitable wired or wireless connection(s). For example, when the gNB 102 is implemented as a part of a cellular communication system, such as a cellular communication system supporting 5G or new radio access technology or NR, LTE or LTE-A, the backhaul or network interface 382 can enable the gNB 102 to communicate with other gNBs through wired or wireless backhaul connections. When the gNB 102 is implemented as an access point, the backhaul or network interface 382 can allow the gNB 102 to communicate with a larger network, such as the Internet, through a wired or wireless local area network or through a wired or wireless connection. The backhaul or network interface 382 includes any suitable structure that supports communication through a wired or wireless connection, such as an ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions is configured to cause the controller/processor 378 to execute the BIS process and decode the received signal after subtracting at least one interference signal determined by the BIS algorithm.

As will be described in more detail below, the transmission and reception paths of the gNB 102 (implemented using RF transceivers 372a-372n, TX processing circuit 374 and/or RX processing circuit 376) support aggregated communication with frequency division duplex (FDD) cells and time division duplex (TDD) cells.

Although FIG. 3B illustrates the gNB 102, various changes may be made to FIG. 3B. For example, the gNB 102 can include any number of each component shown in FIG. 3A. The access point can include many backhaul or network interfaces 382, and the controller/processor 378 can support routing functions to route data between different network addresses. Although shown as including a single instance of the TX processing circuit 374 and a single instance of the RX processing circuit 376, the gNB 102 can include multiple instances of each (such as one for each RF transceiver).

Herein, a first type of transceiving node may be a base station, and a second type of transceiving node may be a UE.

Figure 4:
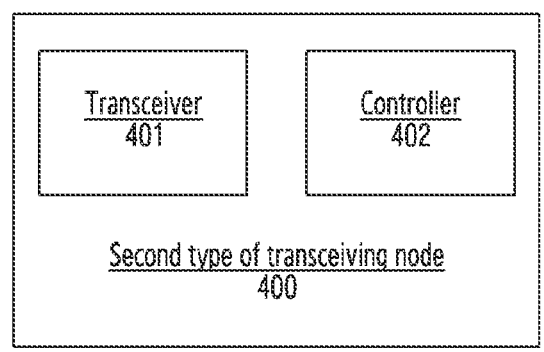
FIG. 4 illustrates a second type of transceiving node according to an embodiment.

FIG. 4 illustrates a second type of transceiving node according to an embodiment.

Referring to FIG. 4, the second type of transceiving node 400 may include a transceiver 401 and a controller 402.

The transceiver 401 may be configured to receive a first type of data and/or a first type of control signaling from a first type of transceiving node and transmit a second type of data and/or a second type of control signaling to the first type of transceiving node in the time unit.

The controller 402 may be an application specific integrated circuit (ASIC) or at least one processor. The controller 402 may be configured to control the overall operation of the second type of transceiving node and control the second type of transceiving node to implement the methods of the present disclosure. For example, the controller 402 may be configured to, if multiple PUCCHs with UCIs of different priorities overlap in the time domain, multiplex and/or prioritize the multiple PUCCHs, and control the transceiver 401 to transmit the second type of data and/or the second type of control signaling to the first type of transceiving node in the time unit.

The controller 402 may be configured to perform one or more of the methods of the embodiments described below, such as to control the second type of transceiving node to execute one or more of the methods described in conjunction with FIGS. 5 to 9.

The first type of data may be data transmitted by the first type of transceiving node to the second type of transceiving node. In the following examples, downlink data in a physical downlink shared channel (PDSCH) illustrates the first type of data, but the disclosure is not limited thereto.

The second type of data may be data transmitted by the second type of transceiving node to the first type of transceiving node. In the following examples, uplink data in a physical uplink shared channel (PUSCH) illustrates the second type of data, but the disclosure is not limited thereto.

The first type of control signaling may be control signaling transmitted by the first type of transceiving node to the second type of transceiving node. In the following examples, downlink control signaling illustrates the first type of control signaling, but the disclosure is not limited thereto. The downlink control signaling may be downlink control information (DCI) in a physical downlink control channel (PDCCH) and/or control signaling in a PDSCH.

The second type of control signaling may be control signaling transmitted by the second type of transceiving node to the first type of transceiving node. In the following examples, uplink control signaling illustrates the second type of control signaling, but the disclosure is not limited thereto. The uplink control signaling may be UCI in a PUCCH and/or control signaling in a PUSCH. The types of UCI may contain one or more of HARQ-ACK information, Scheduling Request (SR), link recovery request (LRR), CSI, or configured grant (CG) UCI.

The PUCCH with the SR may include a positive SR or a negative SR.

The CSI may also be a Part 1 CSI and/or a Part 2 CSI.

As to the time unit, the second type of transceiving node transmits the second type of data and/or the second type of control signaling. In the following examples, an uplink time unit illustrates the second type of time unit, but the disclosure is not limited thereto.

The time units may be one or more slots, one or more sub-slots, one or more orthogonal frequency division multiplexing (OFDM) symbols, or one or more subframes.

Figure 5:
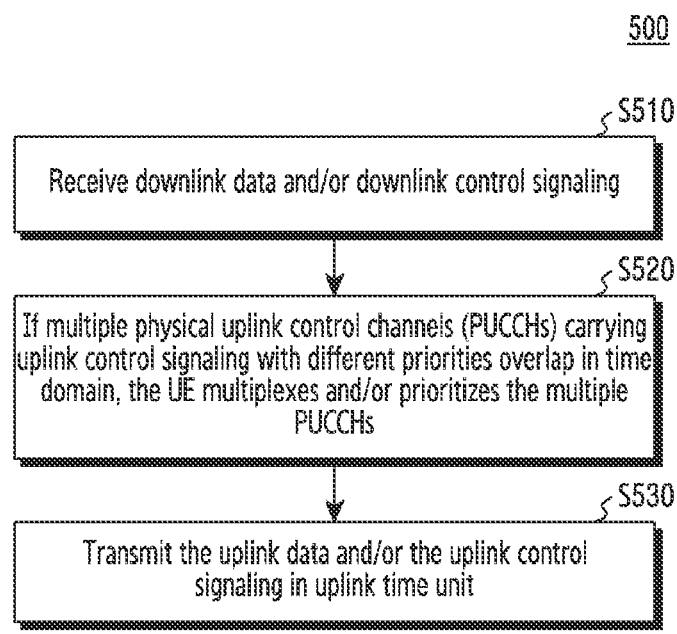
FIG. 5 illustrates a method performed by a UE according to an embodiment.

FIG. 5 illustrates a method performed by a UE according to an embodiment.

Referring to FIG. 5, in step S510, the UE receives downlink data and/or downlink control signaling from a base station.

In step S520, if multiple PUCCHs with uplink control signaling of different priorities overlap in time domain, the UE multiplexes and/or prioritizes the multiple PUCCHs.

In step S530, the UE transmits the uplink data and/or the uplink control signaling to the base station in the uplink time unit.

The downlink control signaling may include DCI in the PDCCH and/or control signaling in the PDSCH. For example, the DCI can be used to schedule PUSCH transmission or PDSCH reception.

In one example, the UE receives the DCI and receives the PDSCH according to time domain resources indicated in the DCI. For example, a parameter K0 may be used to indicate a time interval between the PDSCH scheduled by the DCI and the PDCCH with the DCI, and the unit of K0 may be a slot.

Figure 6A:
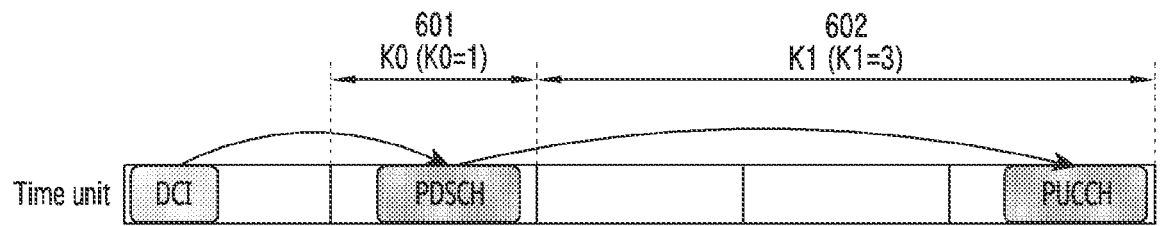
FIGS. 6A, 6B, and 6C illustrate uplink transmission timing according to an embodiment.
Figure 6B:
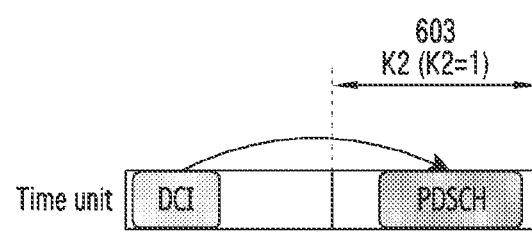
Figure 6C:
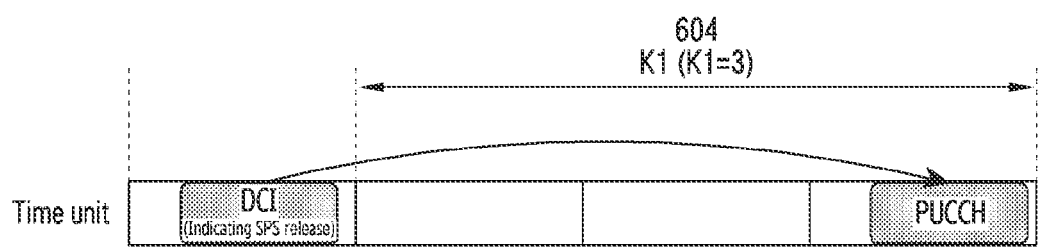

FIGS. 6A, 6B, and 6C illustrate uplink transmission timing according to an embodiment. Specifically, FIG. 6A shows K0=1 at 601. In this case, the time interval between the PDSCH scheduled by the DCI and the PDCCH with the DCI is 1 slot.

The may also UE receive the DCI and transmits the PUSCH according to the time domain resources indicated in the DCI. A parameter K2 may be used to indicate a time interval between the PUSCH scheduled by the DCI and the PDCCH with the DCI, and the unit of K2 may be a slot. For example, FIG. 6B shows K2=1 at 603. In this case, the time interval between the PUSCH scheduled by the DCI and the PDCCH with the DCI is 1 slot.

The UE may also receive the PDSCH and may transmit HARQ-ACK information of the PDSCH on the PUCCH in the uplink time unit. As seen in FIG. 6A, the parameter K1 may be used to indicate the time interval between the PUCCH for transmitting the HARQ-ACK information of the PDSCH and the PDSCH, and the unit of K1 may be an uplink time unit, such as a slot or a sub-slot. Specifically, FIG. 6A shows K1=3 at 602. In this case, the time interval between the PUCCH for transmitting the HARQ-ACK information of the PDSCH and the PDSCH is 3 slots. Alternatively, the parameter K1 may be used to indicate the time interval between SPS PDSCH reception and the PUCCH feeding back its HARQ-ACK, where the K1 is indicated in the DCI for activating the SPS PDSCH.

The UE may also receive a DCI indicating a semi-persistent scheduling (SPS) release, and may transmit HARQ-ACK information of the DCI on the PUCCH of the uplink time unit. For example, the parameter K1 may be used to indicate the time interval between the PUCCH for transmitting HARQ-ACK information of the DCI and the DCI, and the unit of K1 may be an uplink time unit, such as a slot or a sub-slot. For example, FIG. 6C shows K1=3 at 604. In this instance, the time interval between the PUCCH for transmitting the HARQ-ACK information of the DCI and the DCI is 3 slots.

Returning to FIG. 5, and as in above-described step S520, the UE may report (or transmit) UE capability to the base station. For example, the UE reports (or transmits) the UE capability to the base station by transmitting the PUSCH which includes UE capability information.

The base station may configure higher layer signaling for the UE according to the UE capability previously received from the UE, as in above-described step S510. For example, the base station transmits PDSCH to configure higher layer signaling for the UE. In this case, the PDSCH transmitted by the base station contains higher layer signaling for UE configuration. It should be noted that higher layer signaling is signaling of a higher layer compared to physical layer signaling. For example, the higher layer signaling may include RRC signaling and/or a MAC CE.

The UE may be configured with two levels of priorities for uplink transmission, including a first priority (higher priority) and a second priority (lower priority) which are different from each other. The first priority may be higher than the second priority or the first priority may be lower than the second priority. However, the embodiments of the present disclosure are not limited thereto, and the UE may be configured with more than two levels of priorities. For the sake of convenience, description will be made herein considering that the first priority is higher than the second priority. It should be noted that embodiments of the present disclosure are applicable to scenarios where the first priority may be higher than, lower than, or equal to the second priority.

In one example, the two levels of priorities may be indicated by priority numbers or priority indexes (e.g., priority index 1 and priority index 0). For example, a larger priority index may correspond to the higher priority, that is, a priority corresponding to priority index 1 may be higher than a priority corresponding to priority index 0. In this case, a larger priority index (e.g., priority index 1) may be the higher priority (e.g., the first priority), and a smaller priority index (e.g., priority index 0) may be the lower priority (e.g., the second priority). However, the embodiments of the present disclosure are not limited thereto, and other priority indexes or indicators may be used to indicate the two levels of priorities. For the sake of convenience, description is made considering that a priority corresponding to a larger priority index (e.g., priority index 1) is higher than a priority corresponding to a smaller priority index (e.g., priority index 0). In addition, priority index 1 may be used interchangeably with the first priority, a larger priority index or the higher priority, and priority index 0 may be used interchangeably with the second priority, a smaller priority index or the lower priority.

The two levels of priorities configured for the UE may be two physical layer priorities. For example, one of the two levels of priorities (the first priority (e.g., priority index 1) or the second priority (e.g., priority index 0)) may be provided for PUSCH or PUCCH. Specifically, a PUSCH or PUCCH transmission (including a transmission with repetitions if there is a transmission with repetitions) may be of (for example, correspond to) priority index 0 or a larger priority index (e.g., priority index 1).

The first priority or higher priority (e.g., a larger priority index (e.g., priority index 1)) may correspond to a first service (e.g., a URLLC service), and the second priority or lower priority (e.g., a smaller priority index (e.g., priority index 0)) may correspond to a second service (e.g., an eMBB service).

In one example, for a CG-PUSCH transmission, a UE may determine a priority index according to a priority parameter (for example, the parameter priority in 3GPP) (if configured).

For a PUCCH transmission with HARQ-ACK information corresponding to a SPS PDSCH reception or an SPS PDSCH release, a UE may determine the priority index of the PUCCH transmission from a HARQ-ACK codebook priority parameter and/or a HARQ-ACK codebook index parameter (for example, the parameter HARQ-CodebookID in 3GPP) (if configured).

If no priority is configured or indicated for a certain PUSCH or PUCCH transmission of the UE, the priority index of the PUSCH or PUCCH transmission may be 0.

If the UE monitors a PDCCH to detect DCI format 0_1 and DCI format 1_1 or to detect DCI format 0_2 and DCI format 1_2 in an active DL BWP, the priority index may be provided by a priority indicator field. If the UE indicates that it has the capability to monitor the PDCCH in the active DL BWP to detect DCI format 0_1 and DCI format 1_1 and to detect DCI format 0_2 and DCI format 1_2, DCI format 0_1 or DCI format 0_2 may schedule a PUSCH transmission with any priority, and DCI format 1_1 or DCI format 1_2 may schedule a PDSCH reception and trigger a PUCCH transmission with corresponding HARQ-ACK information of any priority.

The UE may be configured with PUCCH configuration list parameters (for example, the parameter PUCCH-ConfigurationList in 3GPP), which may contain two PUCCH configuration parameters (for example, the parameter PUCCH-Config in 3GPP), including a first PUCCH configuration parameter and a second PUCCH configuration parameter. For example, the first PUCCH configuration parameter may correspond to the second priority (e.g., a smaller priority index (e.g., priority index 0)), that is, the priority of the first PUCCH configuration parameter may be the second priority (e.g., a smaller priority index (e.g., priority index 0)). The second PUCCH configuration parameter may correspond to the first priority (e.g., a larger priority index (e.g., priority index 1)), and the priority of the second PUCCH configuration parameter may be the first priority (e.g., a larger priority index (e.g., priority index 1)).

For example, a sub-slot length parameter (for example, the parameter subslotLengthForPUCCH in 3GPP) of each PUCCH configuration parameter of the first PUCCH configuration parameter and the second PUCCH configuration parameter may be 7 OFDM symbols, or 6 OFDM symbols, or 2 OFDM symbols. Sub-slot configuration lengths parameters of different PUCCH configuration parameters may be configured separately. If no sub-slot configuration length parameter is configured in a PUCCH configuration parameter, the scheduling time unit of the PUCCH configuration parameter is one slot by default. If a sub-slot length parameter is configured in a PUCCH configuration parameter, the scheduling time unit of the PUCCH configuration parameter is a configured sub-slot configuration length in OFDM symbols.

The UE may be configured with a PDSCH HARQ-ACK codebook list parameter (for example, the parameter pdsch-HARQ-ACK-CodebookList in 3GPP). For example, the PDSCH HARQ-ACK codebook list parameter may contain two PDSCH HARQ-ACK codebook configurations parameters (for example, the parameter pdsch-HARQ-ACK-Codebook in 3GPP), including a first PDSCH HARQ-ACK codebook configuration parameter and a second PDSCH HARQ-ACK codebook configuration parameter. For example, the first PDSCH HARQ-ACK codebook configuration parameter corresponds to the first PDSCH HARQ-ACK codebook configuration, the first HARQ-ACK codebook configuration is associated with a PUCCH with a smaller priority index (e.g., priority index 0), and the second PDSCH HARQ-ACK codebook configuration parameter corresponds to the second HARQ-ACK codebook configuration, the second HARQ-ACK codebook is associated with a PUCCH with the larger priority index (e.g., priority index 1). In this case, the priority of the first HARQ-ACK codebook may be the second priority (e.g., a smaller priority index (e.g., priority index 0)), and the priority of the second HARQ-ACK codebook may be the first priority (e.g., the larger priority index (e.g., priority index 1)).

The PDSCH HARQ-ACK codebook configuration (for example, the parameter pdsch-HARQ-ACK-Codebook) is used to configure a HARQ-ACK codebook type. The PDSCH HARQ-ACK codebook configuration parameter may be semi-static (e.g., semiStatic), dynamic, or enhanced dynamic (for example, the parameter pdsch-HARQ-ACK-Codebook-r16 in 3GPP is enhancedDynamic).

The HARQ-ACK codebook may include HARQ-ACK information of one or more PDSCH and/or DCI. If the HARQ-ACK information of one or more PDSCH and/or DCI is transmitted in a same uplink time unit, the UE may generate the HARQ-ACK codebook according to a predefined rule. For example, the UE can generate the HARQ-ACK codebook according to pseudo code specified in a standard. If the UE receives a DCI format, where the DCI format indicates SPS deactivation, the UE transmits HARQ-ACK information in the DCI format. If the UE receives a DCI format, where the DCI format indicates that a secondary cell is dormant, the UE transmits HARQ-ACK information in the DCI format. If the UE receives a DCI format, where the DCI format indicates to transmit HARQ-ACK information for all HARQ-ACK processes (such as one shot HARQ-ACK codebook, or Type-3 HARQ-ACK codebook in 3GPP (e.g., TS38.213)), the UE transmits the HARQ-ACK information of all HARQ-ACK processes. If the UE receives a DCI format, where the DCI format schedules a PDSCH, the UE transmits HARQ-ACK information of the PDSCH. The UE may also receive an SPS PDSCH, and transmit HARQ-ACK information of the SPS PDSCH. If the UE is configured to receive the SPS PDSCH by higher layer signaling, the UE transmits HARQ-ACK information of the SPS PDSCH. If the UE is configured to receive the SPS PDSCH by higher layer signaling, the SPS PDSCH may be cancelled by other signaling. If at least one uplink OFDM symbol in the semi-static frame structure configured by higher layer signaling overlaps with a symbol of the SPS PDSCH, the UE does not receive the SPS PDSCH. If the UE is configured to receive the SPS PDSCH by higher layer signaling according to a predefined rule, the UE transmits HARQ-ACK information of the SPS PDSCH.

If the HARQ-ACK information transmitted in the same uplink time unit does not include any HARQ-ACK information in the DCI format, and does not include the HARQ-ACK information of a dynamically scheduled PDSCH scheduled through the DCI format, or if the HARQ-ACK information transmitted in the same uplink time unit only includes the HARQ-ACK information of one or more SPS PDSCHs, the UE can generate the HARQ-ACK information according to the rules for generating the SPS PDSCH HARQ-ACK codebook.

If the HARQ-ACK information transmitted in the same uplink time unit includes HARQ-ACK information in any DCI format, and/or HARQ-ACK information of a dynamically scheduled PDSCH (for example, a PDSCH scheduled through a DCI format), the UE can generate HARQ-ACK information according to the rules for generating the HARQ-ACK codebook of the dynamically scheduled PDSCH and/or the DCI. For example, the UE may determine to generate a semi-static HARQ-ACK codebook (for example, Type-1 HARQ-ACK codebook in 3GPP (e.g., TS 38.213)) or a dynamic HARQ-ACK codebook (for example, Type-2 HARQ-ACK codebook in 3GPP (e.g., TS 38.213)) or an enhanced dynamic HARQ-ACK codebook (for example, Type-2 HARQ-ACK codebook based on grouping and HARQ-ACK retransmission in 3GPP (e.g., TS 38.213)) according to the PDSCH HARQ-ACK codebook configuration parameter (for example, the parameter pdsch-HARQ-ACK-Codebook in 3GPP).

The dynamic HARQ-ACK codebook and/or the enhanced dynamic HARQ-ACK codebook may determine the size and sequence of the HARQ-ACK codebook according to an assignment index. For example, the assignment index may be a downlink assignment index (DAI). In the following embodiments, the assignment index is DAI, but the present disclosure is not limited thereto, and any other suitable assignment index may be adopted.

The DAI field includes at least one of a first type of DAI and a second type of DAI.

The first type of DAI may a counter-DAI (C-DAI). The first type of DAI may indicate a cumulative count of at least one of the PDSCH scheduled in the current downlink time unit, or the DCI indicating the SPS PDSCH release, or the DCI indicating the secondary cell dormancy. By receiving time including the first type of DAI and the information of the first type of DAI, it is possible to determine respective sorting of bits in the HARQ-ACK codebook corresponding to at least one of the PDSCH reception, the DCI indicating the SPS PDSCH release, or the DCI indicating that the secondary cell dormancy. The first type of DAI may be included in the downlink DCI format.

The second type of DAI may be total-DAI (T-DAI), which may indicate a total number of at least one of all PDSCH receptions corresponding to the uplink time unit, the SPS PDSCH release, or that the secondary cell is in dormancy. The second type of DAI may be included in a downlink DCI format and/or an uplink DCI format (UL DAI).

In the following example, the first type of DAI is C-DAI and the second type of DAI is T-DAI but the disclosure is not limited thereto.

Table 1 and Table 2 below show a corresponding relationship between the DAI field and $V_{T-DAI,m}$ or $V_{C-DAI,c,m}$. The number of bits for C-DAI and T-DAI is limited.

For example, when C-DAI or T-DAI is represented by 2 bits, the value of the C-DAI or T-DAI in DCI can be determined by the Equation in Table 1, i.e., $V_{T-DAI,m}$ or $V_{C-DAI,c,m}$.

$V_{T-DAI,m}$ is a value of the T-DAI in the DCI received at a PDCCH monitoring occasion m, and $V_{C-DAI,c,m}$ is a value of the C-DAI in the DCI of a serving cell c received at the PDCCH monitoring occasion m. Both $V_{T-DAI,m}$ and $V_{C-DAI,c,m}$ are related to the number of bits in the DAI field in the DCI. An MSB is a most significant bit, and an LSB is a least significant bit.

TABLE 1

| DAI Field MSB, LSB | $V_{T-DAI, m}$ or $V_{C-DAI, c, m}$ | Y |
|---|---|---|
| 0, 0 | 1 | (Y − 1)mod 4 + 1 = 1 |
| 0, 1 | 2 | (Y − 1)mod 4 + 1 = 2 |
| 1, 0 | 3 | (Y − 1)mod 4 + 1 = 3 |
| 1, 1 | 4 | (Y − 1)mod 4 + 1 = 4 |

For example, if C-DAI or T-DAI is 1, 5, or 9, as shown in Table 1, the DAI field is indicated by "00", and the value of $V_{T-DAI,m}$ or $V_{T-DAI,c,m}$ is expressed as "1" by the Equation in Table 1. Y may represent the value of the DAT (the value of the DAT before transformation by the Equations in the Y column) corresponding to the number of DCIs actually transmitted by the base station.

For example, when C-DAI or T-DAT in the DCI is 1 bit, a value greater than 2 may be expressed by the Equation in Table 2, i.e., $V_{T-DAI,m}$ or $V_{C-DAI,c,m}$.

TABLE 2

| DAI field | $V_{T-DAI, m}$ or $V_{C-DAI, c, m}$ | Y |
|---|---|---|
| 0 | 1 | (Y − 1)mod 2 + 1 = 1 |
| 1 | 2 | (Y − 1)mod 2 + 1 = 2 |

When the uplink physical channel of the UE is configured with multiple priorities, how to improve the possibility and reliability of a physical channel transmission of the lower priority under the premise of ensuring the delay and reliability of a physical channel transmission of the higher priority is a problem for which a solution is needed. For example, if PUCCHs with UCIs of different priorities overlap in the time domain, multiple PUCCHs may be multiplexed in one PUCCH for transmission, or the multiple PUCCHs may be subjected to prioritization. PUCCH prioritization refers to, for example, transmitting a PUCCH of the higher priority rather than transmitting a PUCCH of the lower priority, or multiplexing multiple PUCCHs of the higher priority in one PUCCH for transmission rather than transmitting one or more PUCCHs of the lower priority. In different scenarios, the UE can adopt different methods. Hereinafter, specific embodiments are used to explain how the UE handles the problem that the PUCCHs with the UCIs of different priorities overlap in the time domain in different scenarios.

The method for multiplexing and/or prioritizing the UCIs of different priorities herein may also be applicable to UCI(s) of unicast PDSCH and/or UCI(s) of groupcast (or multicast)/broadcast PDSCH. For example, the UCIs of the first priority and the second priority may both be HARQ-ACK, SR, and CSI of the unicast PDSCH. For example, the UCIs of the first priority and the second priority may both be HARQ-ACK of the multicast/broadcast PDSCH. For example, the UCI of the first priority may be HARQ-ACK, SR, CSI of the unicast PDSCH, and the UCI of the second priority may be HARQ-ACK of the multicast/broadcast PDSCH.

Unicast may refer to a manner in which a network communicates with one UE, and groupcast/broadcast may refer to a manner in which the network communicates with multiple UEs. For example, a unicast PDSCH may be received by one UE, and the scrambling of the PDSCH may be based on a UE-specific radio network temporary indicator (RNTI), e.g., C-RNTI. A unicast PDSCH may also be a unicast SPS PDSCH. A groupcast (or multicast)/broadcast PDSCH may be received by more than one UE simultaneously, and the scrambling of the A groupcast/broadcast PDSCH may be based on a UE-group-common RNTI. For example, the UE-group-common RNTI for the scrambling of the groupcast/broadcast PDSCH may include an RNTI for the scrambling of a dynamically scheduled groupcast/broadcast transmission (for example, PDSCH) (referred to as a G-RNTI or a first RNTI herein) or an RNTI for the scrambling of a groupcast/broadcast SPS PDSCH (referred to as a GS-RNTI or a second RNTI herein). The GS-RNTI and G-RNTI can be different RNTIs or the same RNTI. UCI of unicast PDSCH may include HARQ-ACK information, SR, or CSI of the unicast PDSCH. UCI of groupcast/broadcast PDSCH may include HARQ-ACK information of the groupcast/broadcast PDSCH. Herein, "groupcast/broadcast" may refer to at least one of groupcast or broadcast. Although the present disclosure refers to the RNTI for the scrambling of the dynamically scheduled groupcast/broadcast transmission (for example, PDSCH) as the G-RNTI or first RNTI, and refers to the RNTI for the scrambling of the groupcast/broadcast SPS transmission (for example, SPS PDSCH) as the GS-RNTI or second RNTI. However, such nomenclature for RNTI is only one example, and any suitable manner can be used to name each RNTI. For example, the RNTI for the scrambling of the dynamically scheduled groupcast/broadcast transmission (for example, PDSCH) is referred to as a second RNTI, and the RNTI for the scrambling of the groupcast/broadcast SPS transmission (for example, SPS PDSCH) is referred to as a first RNTI.

Herein, the UE may be configured with a PUCCH configuration list parameter (for example, the parameter PUCCH-ConfigurationList in 3GPP), which may contain two PUCCH configuration parameters (for example, the parameter PUCCH-Config in 3GPP), including a first PUCCH configuration parameter and a second PUCCH configuration parameter. For example, the first PUCCH configuration parameter may correspond to the second priority (e.g., a smaller priority index (e.g., priority index 0)), that is, the priority of the first PUCCH configuration parameter may be the second priority (e.g., a smaller priority index (e.g., priority index 0)). The second PUCCH configuration parameter may correspond to the first priority (e.g., a larger priority index (e.g., priority index 1)), and the priority of the second PUCCH configuration parameter may be the first priority (e.g., a larger priority index (e.g., priority index 1)).

For example, a sub-slot configuration length parameter (for example, the parameter subslotLengthForPUCCH in 3GPP) of each PUCCH configuration parameter of the first PUCCH configuration parameter and the second PUCCH configuration parameter may be 7 OFDM symbols, or 6 OFDM symbols, or 2 OFDM symbols. Sub-slot configuration lengths parameter of different PUCCH configuration parameters may be configured separately. If no sub-slot length parameter is configured in a PUCCH configuration parameter, the scheduling time unit of the PUCCH configuration parameter is one slot by default. If a sub-slot length parameter is configured in a PUCCH configuration parameter, the scheduling time unit of the PUCCH configuration parameter is a configured sub-slot configuration length in OFDM symbols.

If a PUCCH with a HARQ-ACK of the lower priority overlaps with a PUCCH with an SR of the higher priority, PUCCH resources transmitted by the UE can be determined based on the number of the HARQ-ACK bits of the lower priority and/or the format of the PUCCH with a HARQ-ACK of the lower priority and/or the number of the PUCCH symbols. For example, if the format of the PUCCH with a HARQ-ACK of the lower priority is PUCCH format 3 and/or PUCCH format 4 and the number of the PUCCH symbols is greater than or equal to a predefined threshold X1 (X1 can be a positive integer), the UE transmits the PUCCH with the SR of the higher priority, and the UE does not transmit the PUCCH with a HARQ-ACK of the lower priority. If the format of the PUCCH with a HARQ-ACK of the lower priority is PUCCH format 3 and/or PUCCH format 4 and the number of the PUCCH symbols is less than or equal to the predefined threshold X1 (X1 can be a positive integer), the UE multiplexes the SR of the higher priority and the HARQ-ACK of the lower priority in one PUCCH for transmission. This PUCCH may be the PUCCH with a HARQ-ACK of the lower priority. For example, if the format of the PUCCH with a HARQ-ACK of the lower priority is PUCCH format 2, the UE multiplexes the SR of the higher priority and the HARQ-ACK of the lower priority in one PUCCH for transmission. This PUCCH may include the HARQ-ACK of the lower priority.

If a PUCCH with a HARQ-ACK of the lower priority overlaps with a PUCCH with an SR of the higher priority, PUCCH resources transmitted by the UE can be determined based on the format of the PUCCH with the SR of the higher priority and/or the number of the HARQ-ACK bits of the lower priority and/or the format of the PUCCH with a HARQ-ACK of the lower priority and/or the number of the PUCCH symbols. For example, if the format of the PUCCH with a HARQ-ACK of the lower priority is PUCCH format 3 and/or PUCCH format 4, and the format of the PUCCH with the SR of the higher priority is PUCCH format 0, the UE transmits the PUCCH with the SR of the higher priority, and the UE does not transmit the PUCCH with a HARQ-ACK of the lower priority. If the format of the PUCCH with a HARQ-ACK of the lower priority is PUCCH format 3 and/or PUCCH format 4, and the format of the PUCCH with the SR of the higher priority is PUCCH format 1, the UE multiplexes the SR of the higher priority and the HARQ-ACK of the lower priority in one PUCCH for transmission. This PUCCH may include the HARQ-ACK of the lower priority.

If a PUCCH with a HARQ-ACK of the lower priority overlaps with a PUCCH with an SR of the higher priority, PUCCH resources transmitted by the UE can be determined based on the starting symbol and/or the ending symbol of the PUCCH with the SR of the higher priority and/or the starting symbol and/or the ending symbol of the PUCCH with a HARQ-ACK of the lower priority. For example, if the ending symbol of the PUCCH with a HARQ-ACK of the lower priority does not proceed (i.e., precedes) the ending symbol of the PUCCH with the SR of the higher priority, the UE multiplexes the SR of the higher priority and the HARQ-ACK of the lower priority in one PUCCH for transmission. This PUCCH may be the PUCCH with a HARQ-ACK of the lower priority. If the ending symbol of the PUCCH with a HARQ-ACK of the lower priority proceeds the ending symbol of the PUCCH with the SR of the higher priority, the UE transmits the PUCCH with the SR of the higher priority, and the UE does not transmit the PUCCH with a HARQ-ACK of the lower priority. For example, if the ending symbol of the PUCCH with a HARQ-ACK of the lower priority precedes the ending symbol of the PUCCH with the SR of the higher priority by X2 symbols (X2 may be a positive integer), the UE multiplexes the SR of the higher priority and the HARQ-ACK of the lower priority in one PUCCH for transmission. This PUCCH may be the PUCCH with a HARQ-ACK of the lower priority. If the ending symbol of the PUCCH with a HARQ-ACK of the lower priority proceeds the ending symbol of the PUCCH with the SR of the higher priority by X2 symbols (X2 may be a positive integer), the UE transmits the PUCCH with the SR of the higher priority, and the UE does not transmit the PUCCH with a HARQ-ACK of the lower priority.

If a PUCCH with a HARQ-ACK of the lower priority overlaps with a PUCCH with an SR of the higher priority, PUCCH resources transmitted by the UE can be determined based on the starting symbol and/or the ending symbol of the PUCCH with the SR of the higher priority and/or the starting symbol and/or the ending symbol of the PUCCH with a HARQ-ACK of the lower priority and/or the format of the PUCCH with the SR of the higher priority and/or the number of the HARQ-ACK bits of the lower priority and/or the format of the PUCCH with a HARQ-ACK of the lower priority and/or the number of the PUCCH symbols. For example, if the ending symbol of the PUCCH in PUCCH format 3 or PUCCH format 4 with a HARQ-ACK of the lower priority precedes the ending symbol of the PUCCH with the SR of the higher priority by X3 symbols (X3 can be a non-negative integer, for example, X3 is 0), the UE multiplexes the SR of the higher priority and the HARQ-ACK of the lower priority in one PUCCH for transmission. This PUCCH may be the PUCCH with a HARQ-ACK of the lower priority. If the ending symbol of the PUCCH in PUCCH format 3 or PUCCH format 4 with a HARQ-ACK of the lower priority proceeds the ending symbol of the PUCCH with the SR of the higher priority by X3 symbols (X3 can be a non-negative integer, for example, X3 is 0), the UE transmits the PUCCH with the SR of the higher priority, and the UE does not transmit the PUCCH with a HARQ-ACK of the lower priority.

If a PUCCH with a HARQ-ACK of the lower priority overlaps with a PUCCH with an SR of the higher priority in time domain, the HARQ-ACK of the lower priority and the SR of the higher priority may be multiplexed in one PUCCH resource. For example, the PUCCH resource may include an SR of the higher priority, may include the HARQ-ACK of the lower priority, may include the HARQ-ACK of the higher priority, or may be configured by higher layer signaling specifically for the HARQ-ACK of the lower priority and SR of the higher priority.

The PUCCH resource sent by the UE may be determined according to the number of the HARQ-ACK bits of the lower priority. For example, if the number of the HARQ-ACK bits of the lower priority is greater than or equal to a predefined threshold X4 (X4 may be a positive integer, for example, X4 is equal to 2 or X4 is equal to 1), the PUCCH resource may be a PUCCH with a HARQ-ACK of the lower priority. Alternatively, the PUCCH resource may include the HARQ-ACK of the higher priority, or may be configured by higher layer signaling specifically for HARQ-ACK of the lower priority and SR of the higher priority. If the number of the HARQ-ACK bits of the lower priority is less than or equal to the predefined threshold X4 (X4 may be a positive integer, for example, X4 is equal to 2 or X4 is equal to 1), the PUCCH resource may be a PUCCH with an SR of the higher priority. Alternatively, the PUCCH resource may include the HARQ-ACK of the higher priority, or may be configured by higher layer signaling specifically for HARQ-ACK of the lower priority and SR of the higher priority.

If the format of the PUCCH with a HARQ-ACK of the lower priority and the SR of the higher priority is a PUCCH format x (for example, the PUCCH format x may be a PUCCH format 2 or a PUCCH format 3 or a PUCCH format 4), the SR of the higher priority and the HARQ-ACK of the lower priority may be jointly coded. If the format of the PUCCH with a HARQ-ACK of the lower priority and the SR of the higher priority is a PUCCH format x (for example, the PUCCH format x may be a PUCCH format 2 or a PUCCH format 3 or a PUCCH format 4), a maximum code rate may be of a PUCCH format x of the lower priority or of a PUCCH format x of the higher priority or an additionally configured maximum code rate of the PUCCH format x of the lower priority (for example, an additionally configured maximum code rate parameter of the PUCCH format x is used to determine the maximum code rate when the format of the PUCCH with a HARQ-ACK of the lower priority and the SR of the higher priority is the PUCCH format x).

If the format of the PUCCH with a HARQ-ACK of the lower priority and the SR of the higher priority is a PUCCH format x (i.e., a PUCCH format 2 or a PUCCH format 3), the number of physical resource blocks (PRBs) may be determined according to the determined maximum code rate. For example, the number of PRBs of the PUCCH format x may be determined in a mode specified in 3GPP TS38.213.

If the format of the PUCCH with a HARQ-ACK of the lower priority and SR of the higher priority is a PUCCH format x (i.e., a PUCCH format 2 or a PUCCH format 3 or a PUCCH format 4), the SR of the higher priority and the HARQ-ACK of the lower priority may be separately coded.

If the PUCCH with a HARQ-ACK of the lower priority, the PUCCH with a HARQ-ACK of the higher priority, and the PUCCH with an SR of the higher priority all overlap in time domain, the HARQ-ACK of the lower priority, the HARQ-ACK of the higher priority, and the SR of the higher priority are all multiplexed in one PUCCH that may be used for a HARQ-ACK of the higher priority.

If the PUCCH with a HARQ-ACK of the lower priority separately overlaps with the PUCCH with a HARQ-ACK of the higher priority and the PUCCH with an SR of the higher priority in time domain, the HARQ-ACK of the lower priority and the HARQ-ACK of the higher priority are multiplexed in one PUCCH that may be used for HARQ-ACK of the higher priority.

If in the time unit, there is a PUCCH with a HARQ-ACK of the lower priority, a PUCCH with a HARQ-ACK of the higher priority, and a PUCCH with an SR of the higher priority.

If the PUCCH with a HARQ-ACK of the higher priority overlaps with the PUCCH with an SR of the higher priority in time domain, the two PUCCHs are first multiplexed. If the PUCCH with a HARQ-ACK of the higher priority and SR of the higher priority overlaps with the PUCCH with a HARQ-ACK of the lower priority in time domain, the two PUCCHs are multiplexed.

The PUCCH herein also needs to meet certain multiplexing conditions, such as a timeline condition, and/or UE capability, and/or whether it is dynamically indicated and/or semi-statically configured to be multiplexed. For example, if a PUCCH with a HARQ-ACK of the lower priority only overlaps with a PUCCH with an SR of the higher priority in time domain, if the multiplexing conditions are met, the HARQ-ACK of the lower priority and the SR of the higher priority are multiplexed in one PUCCH that may be used for SR of the higher priority. If the multiplexing conditions are not met, the UE only sends the PUCCH with an SR of the higher priority, and does not send the PUCCH with a HARQ-ACK of the lower priority. For example, if the PUCCH with a HARQ-ACK of the lower priority overlaps with the PUCCH with an SR of the higher priority in the time domain, and the PUCCH with a HARQ-ACK of the lower priority has an associated DCI or DCI format or PDCCH, the UE may determine whether to multiplex the PUCCH with a HARQ-ACK of the lower priority and the PUCCH with an SR of the higher priority in one PUCCH according to the DCI or DCI format or an indication in PDCCH. If it is determined not to multiplex according to the DCI or DCI format or the indication in PDCCH, the UE sends the PUCCH with the SR of the higher priority, and does not send the PUCCH with a HARQ-ACK of the lower priority. For example, if the PUCCH with a HARQ-ACK of the lower priority overlaps with the PUCCH with an SR of the higher priority in time domain, or the PUCCH with a HARQ-ACK of the lower priority has no associated DCI or DCI format or PDCCH, the UE may determine whether to multiplex the PUCCH with a HARQ-ACK of the lower priority and the PUCCH with an SR of the higher priority in one PUCCH according to higher layer signaling parameter configuration. For example, the higher layer signaling parameter may be configured in the 3GPP parameter PUCCH-Config or PUCCH-FormatConfig. For example, the higher layer signaling parameter may be configured in the 3GPP parameter PUCCH-Resource or the 3GPP parameter SPS-PUCCH-AN. For example, the UE may report whether to support the PUCCH format x (for example, the PUCCH format x may be a PUCCH format 0 or a PUCCH format 1 or a PUCCH format 2 or a PUCCH format 3 or a PUCCH format 4) with a HARQ-ACK of the lower priority and the SR of the higher priority.

It should be noted that the SR herein may be a positive SR or a negative SR.

Herein, the UE may be configured with a PUCCH configuration list parameter (for example, PUCCH-ConfigurationList in 3GPP), which may contain two PUCCH configuration parameters (for example, PUCCH-Config in 3GPP), including a first PUCCH configuration parameter and a second PUCCH configuration parameter. For example, the first PUCCH configuration parameter may correspond to the second priority (e.g., a smaller priority index 0), that is, the priority of the first PUCCH configuration parameter may be the second priority (e.g., priority index 0). The second PUCCH configuration parameter may correspond to the first priority (e.g., a larger priority index 1), that is, the priority of the second PUCCH configuration parameter may be the first priority (e.g., priority index 1).

For example, a sub-slot configuration length parameter of each PUCCH configuration parameter of the first PUCCH configuration parameter and the second PUCCH configuration parameter (e.g., the parameter subslotLengthForPUCCH in 3GPP) may be 7 OFDM symbols, or 6 OFDM symbols, or 2 OFDM symbols. Sub-slot configuration length parameter of different PUCCH configuration parameters may be configured separately. If no sub-slot configuration length parameter is configured in a PUCCH configuration parameter, the scheduling time unit of the PUCCH configuration parameter is one slot by default. If a sub-slot configuration length parameter is configured in a PUCCH configuration parameter, the scheduling time unit of the PUCCH configuration parameter is a configured sub-slot configuration length in OFDM symbols.

If PUCCHs with UCIs of different priorities overlap in the time domain, multiple PUCCHs may be multiplexed in one PUCCH for transmission, or multiple PUCCHs may be prioritized, for example, a PUCCH of the higher priority is transmitted, but a PUCCH of the lower priority is not transmitted. The time unit for multiplexing and/or prioritizing the multiple PUCCHs of different priorities needs to be specified by a standard. For example, the time unit may be defined by using the section of the standard that describes the process of the UE reporting multiple UCI types. For example, the number of OFDM symbols a slot consists of may be defined in 3GPP TS 38.213 9.2.5, such as when pseudocodes for multiple PUCCHs multiplexing are performed.

The time unit for multiplexing and/or prioritizing multiple PUCCHs of different priorities may be a slot, for example, in 3GPP TS 38.213, PUCCH transmission resources with no repetitions in a slot are set to a set Q, and then the PUCCH in set Q is multiplexed and/or prioritized according to a predefined rule. Where, for a normal cyclic prefix (NCP), a slot may contain 14 OFDM symbols; for an extended cyclic prefix (ECP), a slot may contain 12 OFDM symbols. For another example, in 3GPP TS 38.213, if the UE is configured with 2 PUCCH configuration parameters (for example, PUCCH-Config), or the UE is configured with different sub-slot lengths (for example, subslotLengthForPUCCH), or the UE is configured with a PUCCH configuration list (for example, PUCCH-ConfigurationList), PUCCH transmission resources with no repetitions in a slot are set to a set Q, and then the PUCCHs in set Q are multiplexed and/or prioritized according to a predefined rule. Where, for an NCP, a slot may contain 14 OFDM symbols; and for an ECP, a slot may contain 12 OFDM symbols.

The time unit for multiplexing and/or prioritizing multiple PUCCHs of different priorities may be the PUCCH time unit of the higher priority, which is a slot of the higher priority. For example, in 3GPP TS 38.213, PUCCH transmission resources with no repetitions in a slot (or a sub-slot) are set to a set Q, and then PUCCHs in set Q are multiplexed and/or prioritized according to a predefined rule. The number of OFDM symbols that a slot of the higher priority (for example, the sub-slot) may contain is indicated by a sub-slot length parameter (for example, subslotLengthForPUCCH) in the PUCCH configuration parameter of the higher priority (for example, the second PUCCH-Config in the 3GPP parameter PUCCH-ConigurationList). If the sub-slot length parameter is not configured in the PUCCH configuration parameter of the higher priority, for the NCP, a slot may contain 14 OFDM symbols; and for the ECP, a slot may contain 12 OFDM symbols.

The time unit for multiplexing and/or prioritizing multiple PUCCHs of different priorities may be the PUCCH time unit of the lower priority, which is a slot of the lower priority. For example, in 3GPP TS 38.213, PUCCH transmission resources with no repetitions in a sub-slot are set to a set Q, and then PUCCHs in set Q are multiplexed and/or prioritized according to a predefined rule. The number of OFDM symbols that a slot (or sub-slot) of the lower priority may contain is indicated by a sub-slot length parameter (for example, subslotLengthForPUCCH) in the PUCCH configuration parameter of the lower priority (for example, the first PUCCH-Config in the 3GPP parameter PUCCH-ConfigurationList). If the sub-slot length parameter is not configured in the PUCCH configuration parameter of the lower priority, for the NCP, a slot may contain 14 OFDM symbols, and for the ECP, a slot may contain 12 OFDM symbols.

The time unit for multiplexing and/or prioritizing multiple PUCCHs of different priorities may be the maximum value of the PUCCH time unit of the lower priority and the PUCCH time unit of the higher priority.

The time unit for multiplexing and/or prioritizing multiple PUCCHs of different priorities may be the minimum value of the PUCCH time unit of the lower priority and the PUCCH time unit of the higher priority.

The time unit for multiplexing and/or prioritizing multiple PUCCHs of different priorities may be the least common multiple of the PUCCH time unit of the lower priority and the PUCCH time unit of the higher priority.

The time unit for multiplexing and/or prioritizing multiple PUCCHs of different priorities may be a sub-slot length, and the UE does not expect that the configured sub-slots of different priorities have different lengths.

If the time unit for multiplexing and/or prioritizing the multiple PUCCHs of different priorities is the sub-slot length, multiple PUCCHs of a same priority and/or different priorities in respective sub-slots may be separately multiplexed and/or prioritized according to the time order with respect to sub-slots in a slot. The PUCCH multiplexing and/or prioritizing method is described in detail below by considering the time unit as a slot.

The method specifies the time unit for multiplexing and/or prioritizing multiple PUCCHs of different priorities, ensures consistency of understanding of the time unit by the UE and the base station, and improves reliability of PUCCH transmission.

Hereinafter, the method for multiplexing and/or prioritizing multiple PUCCHs of different priorities is specifically illustrated by considering the time unit as a slot. The method is also applicable to the time unit of other granularities, such as other time units defined in the present disclosure.

PUCCHs satisfying condition A in a slot may be grouped in a set Q1. For example, condition A may be a PUCCH with certain types, or condition A may be a PUCCH that may be multiplexed with a PUCCH with a HARQ-ACK of the higher priority. For example, a PUCCH with a HARQ-ACK of the higher priority, a PUCCH with a HARQ-ACK of the lower priority, and a PUCCH with an SR of the higher priority in a slot are grouped in a set Q1. A PUCCH with HARQ-ACK also needs to satisfy a certain timeline condition, such as one specified by 3GPP TS 38.213. For example, the resource in Q1 may be a PUCCH resource with a HARQ-ACK of the lower priority and/or a PUCCH resource with a HARQ-ACK of the higher priority and/or a PUCCH resource with an SR of the higher priority.

Resources in set Q1 are multiplexed and/or prioritized according to a predefined rule, such as a multiple-PUCCH multiplexing and/or prioritizing rule defined in a process of the UE reporting multiple UCI types in the PUCCH in 3GPP TS38.213 R15. Optionally, when the resources in set Q1 are multiplexed and/or prioritized, the resources need to be sorted according to a predefined sorting rule.

The sorting rule may also be based on the following. For PUCCH resources of different priorities, a PUCCH of the higher priority is placed before or after a PUCCH of the lower priority. PUCCH resources of a same priority may be sorted according to the sorting rule when multiple PUCCHs are multiplexed in the process of the UE reporting multiple UCI types in the PUCCH resources in 3GPP TS38.213 R15.

The predefined sorting rule of PUCCH resources/elements in a set according to the present disclosure may also be based on the following rule.

If the lengths of the sub-slots are configured, the sub-slots in a set are sorted according to the time order of the sub-slots, i.e., are sorted from earlier to later according to the time order of the sub-slots. For example, the sub-slot may be a sub-slot of the higher priority or of the lower priority.

Resources in one sub-slot are sorted according to a sorting priority of the UCI in resources from high to low. The sorting priority of the UCI may be determined according to the UCI type and/or the priority of the UCI according to a predefined rule. For example, the sorting priority of the UCI from high to low may be a HARQ-ACK of the higher priority, a HARQ-ACK of the lower priority, and an SR of the higher priority. For example, the sorting priority of the UCI from high to low may also be a HARQ-ACK of the higher priority, an SR of the higher priority, and a HARQ-ACK of the lower priority.

If a resource overlaps with multiple sub-slots, sorting of the resource or the sub-slot corresponding to (belonging to) the resource needs to be determined by a predefined rule.

A sorting priority of a resource with multiple UCI types (for example, a PUCCH resource with multiplexed multiple UCIs) may be the highest priority of sorting priorities among the multiple UCIs in this resource. For example, the sorting priority of the resource with a multiplexed HARQ-ACK of the higher priority and with a HARQ-ACK of the lower priority is the sorting priority of the carried HARQ-ACK of the higher priority.

Resources with a same UCI type may also be sorted according to a predefined rule, such as the sorting rule defined in 3GPP TS38.213.

A resource with a negative SR that does not overlap with a resource with HARQ-ACK and/or CSI in time domain is excluded/removed from the set.

Resources in a set are numbered, such as from 0 in an ascending order.

The predefined sorting rule of resources/elements in a set according to the present disclosure may also be based on the following rule.

If the sub-slot length is configured, a resource contained in a sub-slot with a smaller (or earlier) number (for example, a sub-slot of the higher priority, where, the priority of the sub-slot may correspond to the priority corresponding to the PUCCH configuration parameter (for example, PUCCH-Config in 3GPP)) is placed before a resource contained in a sub-slot with a larger (or later) number (for example, a sub-slot of the lower priority).

In a same sub-slot of the higher priority, a resource with HARQ-ACK of the higher priority and/or a HARQ-ACK of the lower priority is placed before a resource with a positive SR or a negative SR.

In a same sub-slot of the higher priority, a resource with a HARQ-ACK of the higher priority is placed before a resource with a HARQ-ACK of the lower priority.

If a resource with a HARQ-ACK of the lower priority overlaps with one or more resources with a HARQ-ACK of the higher priority in time domain, the resource with a HARQ-ACK of the lower priority is placed after a first resource with a HARQ-ACK of the higher priority. If the resource with a HARQ-ACK of the lower priority does not overlap with the resource with a HARQ-ACK of the higher priority in time domain and the resource with a HARQ-ACK of the lower priority overlaps with one or more resources with a positive SR or a negative SR of the higher priority in time domain, the resource with a HARQ-ACK of the lower priority is placed after a first resource with an SR of the higher priority. If a resource with a HARQ-ACK of the lower priority does not overlap with a resource with a HARQ-ACK of the higher priority in time domain, and the resource with a HARQ-ACK of the lower priority does not overlap with the resource with the SR of the higher priority in time domain, and the resource with a HARQ-ACK of the lower priority overlaps with multiple sub-slots of the higher priority, the resource with a HARQ-ACK of the lower priority belongs to a first sub-slot of the overlapping higher priority. For example, the resource with a HARQ-ACK of the lower priority is put in a set in the sub-slot of the higher priority, and then is multiplexed and/or prioritized.

A sorting priority of a resource with multiple UCI types (for example, a PUCCH resource with multiplexed multiple UCIs) may be the highest priority of sorting priorities among the multiple UCIs in this resource. For example, when the UCI sorting priority from high to low is a HARQ-ACK of the higher priority and a HARQ-ACK of the lower priority and an SR of the higher priority, a sorting priority of a resource with a multiplexed HARQ-ACK of the higher priority and a resource with a HARQ-ACK of the lower priority is a sorting priority of the sent HARQ-ACK of the higher priority. Alternatively, the sorting priority of the UCIs from high to low may also be an SR of the higher priority, a HARQ-ACK of the higher priority, and a HARQ-ACK of the lower priority.

Resources with a same UCI type may be sorted by the following: a resource with an earlier first symbol is placed before a resource with a later first symbol. For resources with a same first symbol, a resource with more symbols or longer duration is placed before a resource with fewer symbols or shorter duration; resources with a same first symbol and the same number of symbols or same duration are arranged in an arbitrary sequence. Alternatively, resources with a same UCI type may be sorted as follows. A resource with an earlier first symbol is placed before a resource with a later first symbol; for resources with a same first symbol, a resource with more symbols or longer duration is placed after a resource with fewer symbols or shorter duration; and resources with a same first symbol and the same number of symbols or same duration are arranged in an arbitrary sequence.

A resource with a negative SR that does not overlap with a resource with HARQ-ACK and/or CSI in time domain is excluded/removed from the set.

The resources in a set are numbered from 0 in an ascending order.

It should be noted that the sorting rule of sets may also be applied to sorting of other sets according to other embodiments of the present disclosure.

After the resources in set Q1 are sorted, PUCCHs overlapping in time may be selected and one PUCCH resource may be determined to send a multiplexed UCI according to a predefined rule specified in 3GPP 38.213 9.2.5.

For example, the resources in set Q1 may be traversed in an ascending order. If the selected resource overlaps with a next resource in time domain, the next resource or subsequent multiple resources that overlap with the selected resource in time domain are multiplexed in one resource. In set Q1, the resource with the multiplexed UCI replaces the selected resource and the resource overlapped with the selected resource is removed. Set Q1 is re-sorted, and the resources in set Q1 are re-traversed in an ascending order. If the selected resource does not overlap with a next resource in time domain, the next resource is selected. After the traversal of set Q1 ends, the UE sends the resources in set Q1. It should be noted that, after the traversal of set Q1 is completed, there are no overlapping resources in Q1 in the time domain.

For example, according to pseudocode-1 below, a set Q (set Q may be set Q1) is traversed and the resources sent by the UE are determined.

---
pseudocode-1
---

Set c(Q) to the cardinality of set Q
Set j = 0 - index of first resource in set Q
Set o = 0 - counter of overlapped resources
while j ≤ C(Q)− 1
  if j < C(Q)− 1 and resource Q(j − o) overlaps with resource Q(j + 1)
    o = o + 1
    j = j + 1
  else
    if o > 0
      determine a single resource for multiplexing UCI associated with resources {Q(j − o), Q(j − o + 1),..., Q(j)} . For example, one resource is determined according to the method for multiplexing multiple PUCCHs in one PUCCH and/or prioritizing multiple PUCCHs as specified herein. Alternatively, one resource is determined according to the method specified in 3GPP TS 38.213 9.2.5.0, 9.2.5.1 and 9.2.5.2.

---
-continued pseudocode-1
---

Set the index of the single resource to j
      Q = Q \ {Q(j − o), Q(j − o + 1),..., Q(j − 1)}
      j = 0
      o = 0
      order(Q) % function that re-orders resources in current set Q.
        For example, sorting is performed according to the sorting rules specified in the present disclosure.
      Set C(Q) to the cardinality of set Q
    else
      j = j + 1
    end if
  end if
end while It should be noted that implementation of pseudocode-1 is relatively simple, with minor changes to the existing architecture, and may be implemented more conveniently based on the existing architecture.

For example, according to pseudocode-2 below, set Q (set Q may be set Q1) is traversed and the resources sent by the UE are determined.

---
pseudocode-2
---

Set C(Q) to the cardinality of set Q
Set j = 0 - index of first resource in set Q
Set o = 0 - counter of overlapped resources
while j ≤ C(Q)− 1
  if j < C(Q)− 1 and resource Q(j − o) overlaps with resource Q(j + 1)
    o = o + 1
    j = j + 1
  else
    if o > 0
      determine a single resource for multiplexing UCI associated with resources {Q(j − o), Q(j − o + 1),..., Q(j)} . For example, one resource is determined according to the method for multiplexing multiple PUCCHs in one PUCCH and/or prioritizing multiple PUCCHs as specified herein. Alternatively, one resource is determined according to the method specified in 3GPP TS 38.213 9.2.5.0, 9.2.5.1 and 9.2.5.2.
      Set the index of the single resource to j
      Q = Q \ {Q(j − o), Q(j − o + 1),..., Q(j − 1)}
      j = 0
      o = 0
      order(Q) % function that re-orders resources in current set Q .
        For example, sorting is performed according to the sorting rules specified herein.
      exclude/delete resources with a negative SR that does not overlap with a resource with HARQ-ACK and/or CSI in time domain from set Q.
      Set C(Q) to the cardinality of set Q
    else
      j = j + 1
    end if
  end if
end while It should be noted that, as compared with pseudocode-1, pseudocode-2 can reduce PUCCH resources for sending the negative SR, thereby reducing the resources for transmitting the UCI, which is favorable for conserving energy of the UE and reducing interference to uplink transmission of other UEs.

Figure 7A:
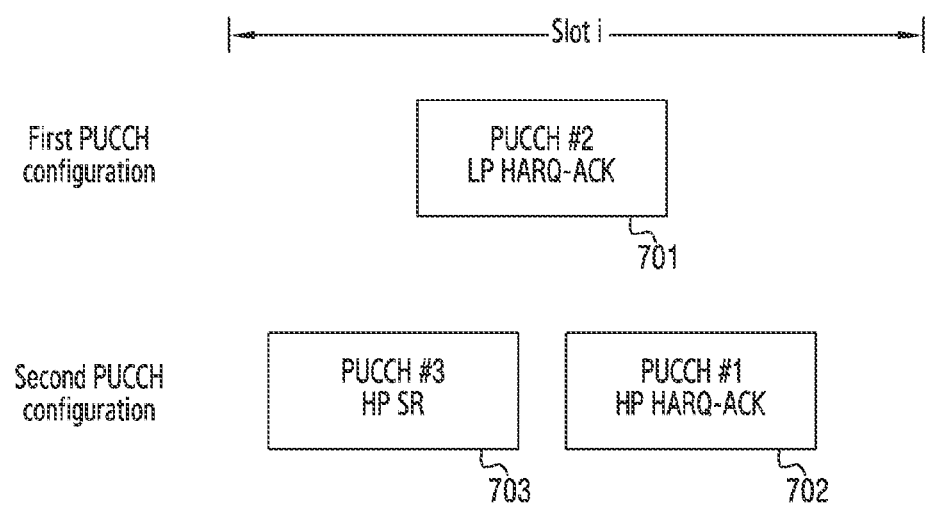
FIGS. 7A and 7B illustrate sorting multiple PUCCHs according to an embodiment.
Figure 7B:
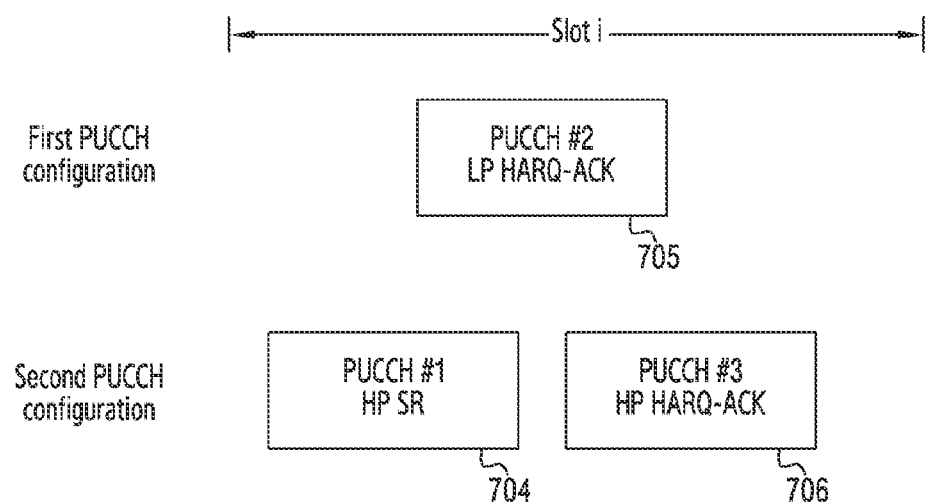

FIGS. 7A and 7B illustrate sorting multiple PUCCHs according to an embodiment.

As shown in FIG. 7A, there are 3 PUCCHs in slot i. according to the sorting rule, according to pseudocode-1 and/or pseudocode-2, the PUCCH 701 with a HARQ-ACK of the higher priority and the PUCCH 702 with a HARQ-ACK of the lower priority are multiplexed in one PUCCH.

The PUCCH 701 may include the HARQ-ACK of the higher priority. After executing pseudocode-1 and/or pseudocode-2, the resources in Q1 are two non-overlapped resources, namely, the PUCCH 703 with an SR of the higher priority and the PUCCH 701 with a HARQ-ACK of the higher priority and the PUCCH 702 with the HARQ-ACK of the lower priority. The UE sends these two PUCCHs.

In FIG. 7B, the 3 PUCCHs are sorted according to the method defined in 3GPP TS 38.213 R15 version. according to pseudocode-1 and/or pseudocode-2, the UE firstly prioritizes the PUCCH 704 with an SR of the higher priority and the PUCCH 705 with a HARQ-ACK of the lower priority. The UE only sends the PUCCH 704 with an SR of the higher priority and does not send the PUCCH 705 with a HARQ-ACK of the lower priority. After executing pseudocode-1 and/or pseudocode-2, the resources in Q1 are two non-overlapped resources, namely, the PUCCHs 704, 706 with the SR and HARQ-ACK of the higher priority.

As compared with the prior art, the method herein increases transmission probability of a HARQ-ACK of the lower priority, reduces the number of retransmissions of downlink data, increase system spectrum efficiency, and reduces user side delay.

In another example, the resources in set Q1 may be traversed in an ascending order. If the selected resource overlaps with a next resource in time domain, the next resource or subsequent multiple resources that overlap with the selected resource in time domain are multiplexed in one resource. In set Q1, the resource with the multiplexed UCI replaces the selected resource and the resource overlapped with the selected resource is removed. Set Q1 is re-sorted in set Q1, and the resources in set Q1 are re-traversed in an ascending order. If the selected resource does not overlap with a next resource in time domain, the next resource is selected. After the traversal of set Q1 ends, the UE sends the resources in set Q1. After the traversal of set Q1 is completed, there are no overlapping resources in Q1 in time domain.

For example, according to pseudocode-3 below, set Q (i.e., set Q1) is traversed and the resources sent by the UE are determined.

---
pseudocode-3
---

Set C(Q) to the cardinality of set Q
Set j = 0 - index of first resource in set Q
Set o = 0 - counter of overlapped resources
while j ≤ C(Q)− 1
  if j < C(Q)− 1 and resource Q(j − o) overlaps with resource Q(j + 1)
    o = o + 1
    j = j + 1
  else
    if o > 0
      determine a single resource for multiplexing UCI associated with resources {Q(j − o), Q(j − o + 1),..., Q(j)} . For example, one resource is determined according to the method for multiplexing multiple PUCCHs in one PUCCH and/or prioritizing multiple PUCCHs as specified herein. Alternatively, one resource is determined according to the method specified in 3GPP TS 38.213 9.2.5.0, 9.2.5.1 and 9.2.5.2.
      Set the index of the single resource to j
      Q = Q \ {Q(j − o), Q(j − o + 1),..., Q(j − 1)}
      j = 0
      o = 0
      exclude/delete resources with a negative SR that does not overlap with a resource with HARQ-ACK and/or CSI in time domain from set Q.
      add to set Q the resource with an SR that overlaps with a resource with HARQ-ACK and/or CSI in time domain in set. Q. For example, the resource with an SR may be a resource with ---
pseudocode-3 -continued
--- an SR that is not in set Q.
      order(Q) % function that re-orders resources in current, set Q .
        For example, sorting is performed according to the sorting rules specified in the present disclosure.
      Set C(Q) to the cardinality of set Q
    else
      j = j + 1
    end if
  end if
end while The method can improve reliability of UCI transmission and improve network performance.

Figure 8A:
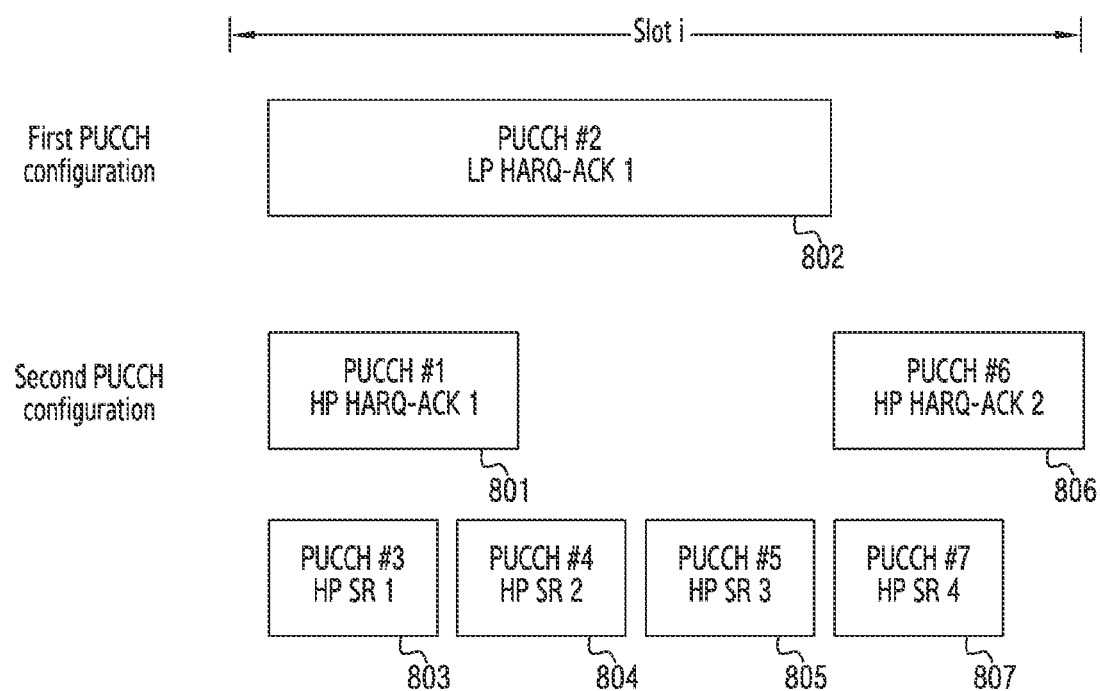
FIGS. 8A, 8B, and 8C illustrate sorting and multiplexing multiple PUCCHs according to an embodiment.
Figure 8B:
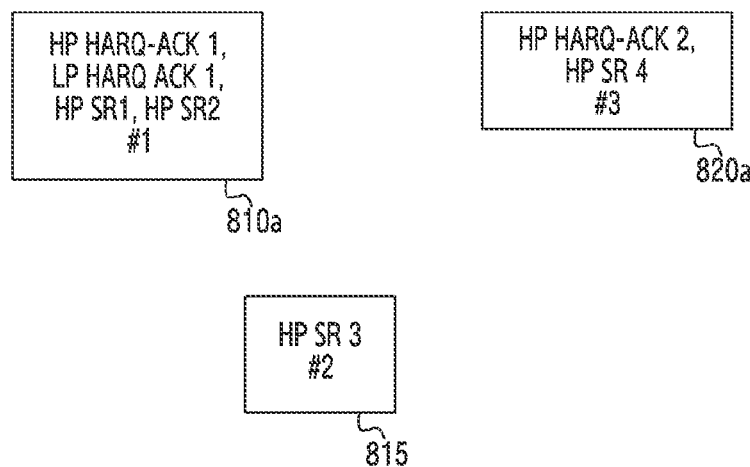
Figure 8C:
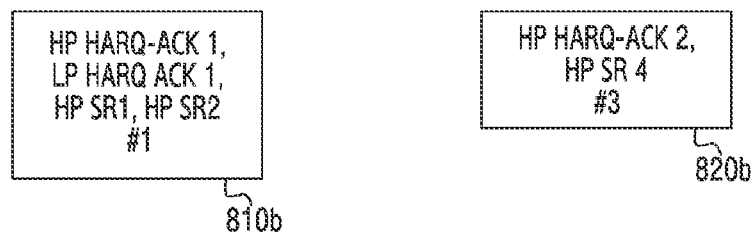

FIGS. 8A, 8B, and 8C illustrate sorting and multiplexing multiple PUCCHs according to an embodiment.

As shown in FIG. 8A, 7 PUCCHs 801, 802, 803, 804, 805, 806 and 807 with different UCIs in a slot are sorted. Based on pseudocode-1, the multiplexed PUCCH resources 810a, 815, and 820a are shown in FIG. 8B. If HP SR 3 is a negative SR, according to pseudocode-2, the multiplexed PUCCH resources 810b and 820b are shown in FIG. 8C.

Multiplexing and/or prioritizing PUCCHs of different priorities may also be performed as follows.

PUCCHs with a HARQ-ACK of the higher priority and PUCCHs with an SR of the higher priority are multiplexed and/or prioritized, i.e., are placed in a set, and then resources in the set are multiplexed and/or prioritized according to a predefined rule.

PUCCHs with a HARQ-ACK of the lower priority and PUCCHs with a HARQ-ACK of the higher priority and/or SR of the higher priority are multiplexed and/or prioritized, i.e., are placed in a set, and then resources in the set are multiplexed and/or prioritized according to a predefined rule.

Multiplexing and/or prioritizing PUCCHs of different priorities may also be performed as follows.

PUCCHs with a HARQ-ACK of the higher priority and PUCCHs with an SR of the higher priority are multiplexed and/or prioritized, i.e., are put in a set, and then resources in the set are multiplexed and/or prioritized according to a predefined rule.

PUCCHs of the lower priority (e.g., PUCCHs with a HARQ-ACK of the lower priority) and PUCCHs including a HARQ-ACK of the higher priority are multiplexed and/or prioritized.

For example, PUCCHs including the HARQ-ACK of the higher priority may be PUCCHs only with a HARQ-ACK of the higher priority. PUCCHs including the HARQ-ACK of the higher priority may be PUCCHs with a HARQ-ACK of the higher priority and SR of the higher priority.

For example, PUCCHs with a HARQ-ACK of the lower priority and PUCCHs including the HARQ-ACK of the higher priority are put in a set, and then resources in the set are multiplexed and/or prioritized according to a predefined rule.

PUCCHs with a HARQ-ACK of the lower priority or PUCCHs with a HARQ-ACK of the lower priority and with a HARQ-ACK of the higher priority, and PUCCHs with an SR of the higher priority are multiplexed and/or prioritized, i.e., are placed in a set, and then resources in the set are multiplexed and/or prioritized according to a predefined rule.

Multiplexing and/or prioritizing PUCCHs of different priorities may also be performed as follows.

PUCCHs with a HARQ-ACK of the lower priority and PUCCHs with a HARQ-ACK of the higher priority are multiplexed and/or prioritized, i.e., are placed in a set, and then resources in the set are multiplexed and/or prioritized according to a predefined rule.

PUCCHs including a HARQ-ACK of the higher priority and PUCCHs with an SR of the higher priority are multiplexed and/or prioritized. For example, PUCCHs including the HARQ-ACK of the higher priority may be PUCCHs only with a HARQ-ACK of the lower priority. PUCCHs including a HARQ-ACK of the lower priority may include a HARQ-ACK of the higher priority and an SR of the higher priority. For example, PUCCHs including the HARQ-ACK of the higher priority and PUCCHs with the SR of the higher priority are placed in a set, and then resources in the set are multiplexed and/or prioritized according to a predefined rule.

PUCCHs with a HARQ-ACK of the lower priority and PUCCHs with an SR of the higher priority are multiplexed and/or prioritized, i.e., are placed in a set, and then resources in the set are multiplexed and/or prioritized according to a predefined rule.

The predefined rule for multiplexing and/or prioritizing the resources in the set according to the method may reuse the method for multiplexing and/or prioritizing the resources in the set as defined in other embodiments or the method specified in 3GPP TS 38.213. The method clarifies the uplink control channel multiplexing method and improves reliability of uplink transmission. The method can increase transmission probability of a HARQ-ACK of the lower priority, reduce the number of retransmissions of downlink data, increase system spectrum efficiency, and reduce user side delay.

Hereinafter, the time unit is considered as the PUCCH time unit of the higher priority. The method for multiplexing and/or prioritizing multiple PUCCHs of different priorities is specifically illustrated by considering that the PUCCH time unit of the higher priority may be a slot/sub-slot of the higher priority. The method is also applicable to the time unit of other granularities, for example, other time units defined in the present disclosure.

PUCCHs satisfying condition B in a slot/sub-slot of the higher priority may be grouped in a set Q2. For example, condition B may be a PUCCH with certain types, or a PUCCH that may be multiplexed with a PUCCH with a HARQ-ACK of the higher priority. For example, a PUCCH with a HARQ-ACK of the higher priority and a PUCCH with an SR of the higher priority in a slot/sub-slot of the higher priority are grouped in a set Q2. A PUCCH with a HARQ-ACK of the higher priority, a PUCCH with a HARQ-ACK of the lower priority, and a PUCCH with an SR of the higher priority in a slot/sub-slot of the higher priority are grouped in a set Q2. Optionally, a PUCCH with HARQ-ACK also needs to satisfy a certain timeline condition as specified in 3GPP TS 38.213. For example, the PUCCH in Q2 may include HARQ-ACK of the lower priority and/or with a HARQ-ACK of the higher priority and/or with an SR of the higher priority.

If a PUCCH with a HARQ-ACK of the lower priority overlaps with multiple slots/sub-slots of the higher priority, it is necessary to determine the slots/sub-slots of the higher priority associated with the PUCCH with a HARQ-ACK of the lower priority. For example, the following method is performed. The PUCCH with a HARQ-ACK of the lower priority is placed in a set Q2 of a first sub-slot in the multiple slots/sub-slots of the higher priority. If there are no PUCCHs with a HARQ-ACK of the higher priority and/or PUCCHs with an SR of the higher priority in Q2, PUCCH resources with a HARQ-ACK of the higher priority may be used for HARQ-ACK of the lower priority. Alternatively, one PUCCH resource in the slot is used for HARQ-ACK of the lower priority according to a predefined rule.

If a PUCCH with a HARQ-ACK of the lower priority overlaps with multiple slots/sub-slots of the higher priority, it is necessary to determine the slots/sub-slots of the higher priority associated with the PUCCH with a HARQ-ACK of the lower priority. For example, the following method is performed. If a PUCCH with a HARQ-ACK of the lower priority overlaps with one or more PUCCHs with a HARQ-ACK of the higher priority in time domain, the PUCCH with a HARQ-ACK of the lower priority is placed in a set Q2 which contains a first PUCCH with a HARQ-ACK of the higher priority of the one or more slots/sub-slots of the higher priority. If the PUCCH with a HARQ-ACK of the lower priority does not overlap with the PUCCH with a HARQ-ACK of the higher priority in the time domain and the PUCCH with a HARQ-ACK of the lower priority overlaps with one or more PUCCHs with an SR of the higher priority (the SR may be a positive SR or a negative SR) in the time domain, the PUCCH with a HARQ-ACK of the lower priority is placed in the a set Q2 of the slots/sub-slots of the higher priority which contains a first PUCCH with an SR of the higher priority.

If the PUCCH with a HARQ-ACK of the lower priority overlaps with multiple slots/sub-slots of the higher priority, it is necessary to determine the slots/sub-slots of the higher priority associated with the PUCCH with a HARQ-ACK of the lower priority. For example, it may be performed in a mode below. If the PUCCH with a HARQ-ACK of the lower priority overlaps with one or more PUCCHs with a HARQ-ACK of the higher priority in the time domain, the PUCCH with a HARQ-ACK of the lower priority is placed in a set Q2 which contains a first PUCCH with a HARQ-ACK of the higher priority of the one or more slots/sub-slots of the higher priority. If the PUCCH with a HARQ-ACK of the lower priority does not overlap with the PUCCH with a HARQ-ACK of the higher priority in the time domain and the PUCCH with a HARQ-ACK of the lower priority overlaps with one or more PUCCHs with a positive SR of the higher priority in the time domain, the PUCCH with a HARQ-ACK of the lower priority is placed in a set Q2 of slots/sub-slots of the higher priority, which contains a first PUCCH with a positive SR of the higher priority. If the PUCCH with a HARQ-ACK of the lower priority does not overlap with the PUCCH with a HARQ-ACK of the higher priority in the time domain, the PUCCH with a HARQ-ACK of the lower priority does not overlap with the PUCCH with the positive SR of the higher priority in the time domain, and the PUCCH with a HARQ-ACK of the lower priority does not overlap with one or more PUCCHs with a negative SR of the higher priority in the time domain, the PUCCH with a HARQ-ACK of the lower priority is placed into a set Q2 of slots/sub-slots of the higher priority which contains a first PUCCH with a negative SR of the higher priority.

The disclosure provides a method for determining a set which contains a PUCCH of a HARQ-ACK of the lower priority, specifies a behavior of a UE, and improves reliability of uplink control signaling transmission.

PUCCHs in set Q2 are multiplexed according to a predefined multiple-PUCCH multiplexing rule defined in a process of the UE reporting multiple UCI types in the PUCCH in 3GPP TS38.213 R15. When the PUCCHs in set Q2 are multiplexed and/or prioritized, the PUCCHs need to be sorted, such as by a predefined sorting rule.

The sorting rule may also be based on for the following rule. For PUCCHs of different priorities, a PUCCH of the higher priority is placed before or after a PUCCH of the lower priority. PUCCHs of a same priority may be sorted according to the sorting rule when multiple PUCCHs are multiplexed in the process of the UE reporting multiple UCI types in the PUCCH in 3GPP TS38.213 R15. The sorting rule may also be defined in other embodiments of the present disclosure.

The predefined sorting rule of resources/elements in a set according to the present disclosure may also be based on the following rule.

A resource with HARQ-ACK (e.g., a HARQ-ACK of the higher priority and/or a HARQ-ACK of the lower priority) is placed before a resource with a positive SR or a negative SR.

A resource with a HARQ-ACK of the higher priority may be placed before a resource with a HARQ-ACK of the lower priority.

A sorting priority of a resource with multiple UCI types (e.g., a PUCCH resource with multiplexed multiple UCIs) may be the highest priority of sorting priorities among the multiple UCIs in this resource. For example, when the UCI sorting priority from high to low is a HARQ-ACK of the higher priority and a HARQ-ACK of the lower priority and an SR of the higher priority, a sorting priority of a resource with a multiplexed HARQ-ACK of the higher priority and a resource with a HARQ-ACK of the lower priority is a sorting priority of the resource with a HARQ-ACK of the higher priority. Alternatively, the sorting priority of the UCIs from high to low may also be an SR of the higher priority, a HARQ-ACK of the higher priority, and a HARQ-ACK of the lower priority.

Resources with a same UCI type may be sorted as follows. A resource with an earlier first symbol is placed before a resource with a later first symbol. For resources with a same first symbol, a resource with more symbols or a longer duration is placed before a resource with fewer symbols or shorter duration. Resources with a same first symbol and the same number of symbols or same duration are arranged in an arbitrary sequence. Alternatively, resources with a same UCI type may be sorted as follows. A resource with an earlier first symbol is placed before a resource with a later first symbol. For resources with a same first symbol, a resource with more symbols or a longer duration is placed after a resource with fewer symbols or shorter duration, and resources with a same first symbol and the same number of symbols or the same duration are arranged in an arbitrary sequence.

A resource with a negative SR that does not overlap with a resource with HARQ-ACK and/or CSI in the time domain is excluded/removed from the set.

The predefined sorting rule of resources/elements in a set herein may also be based on the following rule.

A resource with a HARQ-ACK of the higher priority is placed before a resource with a positive SR or a negative SR.

A resource with a HARQ-ACK of the higher priority is placed before a resource with a HARQ-ACK of the lower priority.

A resource with an SR of the higher priority is placed before a resource with a HARQ-ACK of the lower priority.

Resources with a same UCI type may be sorted as follows. A resource with an earlier first symbol is placed before a resource with a later first symbol. For resources with a same first symbol, a resource with more symbols or a longer duration is placed before a resource with fewer symbols or shorter duration; resources with a same first symbol and the same number of symbols or same duration are arranged in an arbitrary sequence. Alternatively, resources with a same UCI type may be sorted as follows. A resource with an earlier first symbol is placed before a resource with a later first symbol. For resources with a same first symbol, a resource with more symbols or a longer duration is placed after a resource with fewer symbols or a shorter duration, and resources with a same first symbol and the same number of symbols or same duration are arranged in an arbitrary sequence.

A resource with a negative SR that does not overlap with a resource with HARQ-ACK and/or CSI in the time domain is excluded/removed from the set.

The predefined sorting rule of resources/elements in a set according to the present disclosure may also be based on the following rule.

A resource with a HARQ-ACK of the higher priority is placed before a resource with a positive SR or a negative SR.

A resource with a HARQ-ACK of the higher priority is placed before a resource with a HARQ-ACK of the lower priority.

A resource with a HARQ-ACK of the lower priority is placed before a resource with an SR of the higher priority.

A sorting priority of a resource with multiple UCI types (e.g., a PUCCH resource with multiplexed multiple UCIs) may be the highest priority of sorting priorities among the multiple UCIs in this resource. For example, when the UCI sorting priority from high to low is a HARQ-ACK of the higher priority and a HARQ-ACK of the lower priority and an SR of the higher priority, a sorting priority of a resource with a multiplexed HARQ-ACK of the higher priority and a resource with a HARQ-ACK of the lower priority is a sorting priority of the resource with a HARQ-ACK of the higher priority. Alternatively, the sorting priority of the UCIs from high to low may also be an SR of the higher priority, a HARQ-ACK of the higher priority, and a HARQ-ACK of the lower priority.

Resources with a same UCI type may be sorted as follows. A resource with an earlier first symbol is placed before a resource with a later first symbol. For resources with a same first symbol, a resource with more symbols or a longer duration is placed before a resource with fewer symbols or shorter duration. Resources with a same first symbol and the same number of symbols or same duration are arranged in an arbitrary sequence, or resources with a same UCI type may be sorted as follows. A resource with an earlier first symbol is placed before a resource with a later first symbol. For resources with a same first symbol, a resource with more symbols or a longer duration is placed after a resource with fewer symbols or shorter duration, and resources with a same first symbol and the same number of symbols or same duration are arranged in an arbitrary sequence.

A resource with a negative SR that does not overlap with a resource with HARQ-ACK and/or CSI in the time domain is excluded/removed from the set.

The predefined sorting rule of resources/elements in a set according to the present disclosure may also be based on the following.

Sorting is first performed according to the types of the carried UCI. A resource of the higher priority is placed before a resource of the lower priority. For example, according to the UCI type, the priority from high to low may be a HARQ-ACK of the higher priority, a HARQ-ACK of the lower priority, and an SR of the higher priority. The priority from high to low may be an SR of the higher priority, a HARQ-ACK of the higher priority, and a HARQ-ACK of the lower priority.

Resources with a same UCI type or resources with UCI types of a same highest sorting priority may be sorted as follows. A resource with an earlier first symbol is placed before a resource with a later first symbol. For resources with a same first symbol, a resource with more symbols or longer duration is placed before a resource with fewer symbols or shorter duration. Resources with a same first symbol and the same number of symbols or same duration are arranged in an arbitrary sequence. Resources with a same UCI type may be sorted as follows. A resource with an earlier first symbol is placed before a resource with a later first symbol. For resources with a same first symbol, a resource with more symbols or a longer duration is placed after a resource with fewer symbols or shorter duration. Resources with a same first symbol and the same number of symbols or same duration are arranged in an arbitrary sequence.

A resource with a negative SR that does not overlap with a resource with HARQ-ACK and/or CSI in the time domain is excluded/removed from the set.

It should be noted that, the sorting rule according to this embodiment may also be applied to sorting of other sets according to other embodiments of the present disclosure.

After the resources in the set are sorted, PUCCHs overlapping in time may be selected and one PUCCH resource may be determined to send a multiplexed UCI according to a predefined rule, such as based on the method specified in 3GPP 38.213 9.2.5. For example, the predefined rule may be a multiplexing and/or prioritizing rule defined herein.

The mode specified in the method may also be combined with the sorting and/or specific multiplexing rules defined in other embodiments. The method specifies an uplink control channel multiplexing method which improves reliability of uplink transmission. The method can increase transmission probability of a HARQ-ACK of the lower priority, reduce the number of retransmissions of downlink data, increase system spectrum efficiency, and reduce user side delay.

The UE herein may be configured with a PUCCH configuration list parameter (e.g., PUCCH-ConfigurationList in 3GPP), which may contain two PUCCH configuration parameters (for example, PUCCH-Config in 3GPP), including a first PUCCH configuration parameter and a second PUCCH configuration parameter. For example, the first PUCCH configuration parameter may correspond to the second priority (e.g., a smaller priority index 0), that is, the priority of the first PUCCH configuration parameter may be the second priority (e.g., a smaller priority index 0). The second PUCCH configuration parameter may correspond to the first priority (e.g., a larger priority index 1), that is, the priority of the second PUCCH configuration parameter may be the first priority (e.g., 1).

For example, a sub-slot configuration length parameter of each PUCCH configuration parameter of the first PUCCH configuration parameter and the second PUCCH configuration parameter (e.g., subslotLengthForPUCCH in 3GPP) may be 7 OFDM symbols, or 6 OFDM symbols, or 2 OFDM symbols. Sub-slot configuration length parameter of different PUCCH configuration parameters may be configured separately. If no sub-slot configuration length parameter is configured in a PUCCH configuration parameter, the scheduling time unit of the PUCCH configuration parameter is one slot by default. If a sub-slot configuration length parameter is configured in a PUCCH configuration parameter, the scheduling time unit of the PUCCH configuration parameter is a configured sub-slot configuration length in OFDM symbols.

If PUCCHs with UCIs of different priorities overlap in the time domain, multiple PUCCHs may be multiplexed in one PUCCH for transmission or may be prioritized. For example, a PUCCH of the higher priority is transmitted, but a PUCCH of the lower priority is not transmitted. The time unit for multiplexing and/or prioritizing the multiple PUCCHs of different priorities needs to be specified by a standard. For example, the time unit may be defined by using the section of the standard that describes the process of the UE reporting multiple UCI types. For example, the number of OFDM symbols a slot consists of may be defined in 3GPP TS 38.213 9.2.5 when pseudocodes for multiplexing multiple PUCCHs are performed.

The time unit for multiplexing and/or prioritizing multiple PUCCHs of different priorities may be defined in other embodiments of the present disclosure.

The time unit for multiplexing and/or prioritizing multiple PUCCHs of a same priority may be a sub-slot with the priority.

Multiplexing and/or prioritizing PUCCHs of different priorities within a time unit (i.e., a slot) may be performed as follows.

PUCCHs of the higher priority are multiplexed and/or prioritized. For example, a PUCCH with a HARQ-ACK of the higher priority and a PUCCH with an SR of the higher priority are multiplexed and/or prioritized, such as in other embodiments of the present disclosure.

If a PUCCH with a HARQ-ACK of the lower priority overlaps with the PUCCH with a HARQ-ACK of the higher priority and/or SR of the higher priority in the time domain, the PUCCH with a HARQ-ACK of the lower priority and the PUCCH with a HARQ-ACK of the higher priority and/or the SR of the higher priority are multiplexed and/or prioritized according to the methods specified in other embodiments of the present disclosure.

A PUCCH with an SR of the lower priority and/or a PUCCH with a CSI of the lower priority and/or a PUCCH with a HARQ-ACK of the lower priority that does not overlap with a PUCCH with a HARQ-ACK of the higher priority and/or SR of the higher priority in the time domain are multiplexed and/or prioritized according to a multiplexing and/or prioritizing method specified in 3GPP TS38.213 or the methods specified in other embodiments of the present disclosure.

If the PUCCH with an SR or CSI of the lower priority and/or the HARQ-ACK of the lower priority overlaps with the PUCCH with a HARQ-ACK of the higher priority and/or SR of the higher priority in the time domain, the UE transmits the PUCCH with a HARQ-ACK of the higher priority and/or the SR of the higher priority, and the UE does not transmit the PUCCH with an SR or CSI of the lower priority and/or the HARQ-ACK of the lower priority.

PUCCHs of different priorities in a time unit (i.e., a slot) can be multiplexed and/or prioritized as follows.

PUCCHs of the higher priority are multiplexed and/or prioritized. For example, a PUCCH with a HARQ-ACK of the higher priority and a PUCCH with an SR of the higher priority are multiplexed and/or prioritized according to the methods specified in other embodiments of the present disclosure.

If a PUCCH with a HARQ-ACK of the lower priority overlaps with the PUCCH with a HARQ-ACK of the higher priority and/or SR of the higher priority in the time domain, the PUCCH with a HARQ-ACK of the lower priority and the PUCCH with a HARQ-ACK of the higher priority and/or the SR of the higher priority are multiplexed and/or prioritized according to the methods specified in other embodiments of the present disclosure.

A PUCCH with an SR of the lower priority and/or a PUCCH with CSI (for example, CSI of the lower priority) and/or a PUCCH with a HARQ-ACK of the lower priority (for example, a HARQ-ACK of the lower priority that does not overlap with the PUCCH with a HARQ-ACK of the higher priority and/or SR of the higher priority in the time domain) are multiplexed and/or prioritized.

If a PUCCH with an SR and/or CSI of the lower priority overlaps with a PUCCH with a HARQ-ACK of the higher priority and/or SR of the higher priority in the time domain, the UE transmits the PUCCH with a HARQ-ACK of the higher priority and/or the SR of the higher priority, and the UE does not transmit the PUCCH with an SR and/or CSI of the lower priority. If a PUCCH including the HARQ-ACK of the lower priority overlaps with the PUCCH with a HARQ-ACK of the higher priority and/or the SR of the higher priority in the time domain, the UE multiplexes the HARQ-ACK of the lower priority and/or HARQ-ACK of the higher priority and/or SR of the higher priority in one PUCCH. For example, the PUCCH including the HARQ-ACK of the lower priority may be a PUCCH only with a HARQ-ACK of the lower priority, and the PUCCH including the HARQ-ACK of the lower priority may be a PUCCH with a HARQ-ACK of the lower priority and/or SR or CSI of the lower priority.

PUCCHs of different priorities in a time unit can be multiplexed and/or prioritized as follows.

If a PUCCH with a HARQ-ACK of the lower priority overlaps with a PUCCH with a HARQ-ACK of the higher priority and/or SR of the higher priority in the time domain, the PUCCH with a HARQ-ACK of the lower priority and the PUCCH with a HARQ-ACK of the higher priority and/or the SR of the higher priority are multiplexed and/or prioritized.

The PUCCH with a HARQ-ACK of the higher priority and the PUCCH with an SR of the higher priority are multiplexed and/or prioritized.

A PUCCH with an SR of the lower priority and/or a PUCCH with CSI (for example, CSI of the lower priority) and/or a PUCCH with a HARQ-ACK of the lower priority that does not overlap with the PUCCH with a HARQ-ACK of the higher priority and/or SR of the higher priority in the time domain are multiplexed and/or prioritized.

If the PUCCH with an SR and/or CSI of the lower priority and/or HARQ-ACK of the lower priority overlaps with the PUCCH with a HARQ-ACK of the higher priority and/or the SR of the higher priority in the time domain, the UE transmits the PUCCH with a HARQ-ACK of the higher priority and/or the SR of the higher priority, and the UE does not transmit the PUCCH with an SR and/or CSI of the lower priority and/or the HARQ-ACK of the lower priority.

PUCCHs of different priorities in a time unit can be multiplexed and/or prioritized as follows.

If a PUCCH with a HARQ-ACK of the lower priority overlaps with a PUCCH with a HARQ-ACK of the higher priority and/or SR of the higher priority in the time domain, the PUCCH with a HARQ-ACK of the lower priority and the PUCCH with a HARQ-ACK of the higher priority and/or the SR of the higher priority are multiplexed and/or prioritized.

The PUCCH with a HARQ-ACK of the higher priority and the PUCCH with an SR of the higher priority are multiplexed and/or prioritized.

A PUCCH with an SR of the lower priority and/or a PUCCH with CSI of the lower priority and/or a PUCCH with a HARQ-ACK of the lower priority that does not overlap with the PUCCH with a HARQ-ACK of the higher priority and/or SR of the higher priority in the time domain are multiplexed and/or prioritized.

If a PUCCH with an SR or CSI of the lower priority overlaps with the PUCCH with a HARQ-ACK of the higher priority and/or SR of the higher priority in the time domain, the UE transmits the PUCCH with a HARQ-ACK of the higher priority and/or the SR of the higher priority, and the UE does not transmit the PUCCH with an SR and/or CSI of the lower priority. If a PUCCH including a HARQ-ACK of the lower priority overlaps with the PUCCH with a HARQ-ACK of the higher priority and/or SR of the higher priority in the time domain, the UE multiplexes the HARQ-ACK of the lower priority and/or the HARQ-ACK of the higher priority and/or the SR of the higher priority in one PUCCH. For example, the PUCCH including the HARQ-ACK of the lower priority may only include a HARQ-ACK of the lower priority. For example, the PUCCH including the HARQ-ACK of the lower priority may include a HARQ-ACK of the lower priority and/or SR or CSI of the lower priority.

PUCCHs of different priorities in a time unit can be multiplexed and/or prioritized as follows.

PUCCHs of the lower priority are multiplexed and/or prioritized. For example, a PUCCH with a HARQ-ACK of the lower priority, and/or a PUCCH with an SR of the lower priority, and/or a PUCCH with CSI of the lower priority is multiplexed and/or prioritized.

A PUCCH with a HARQ-ACK of the higher priority and a PUCCH with an SR of the higher priority are multiplexed and/or prioritized.

If a PUCCH including a HARQ-ACK of the lower priority overlaps with a PUCCH with a HARQ-ACK of the higher priority and/or SR of the higher priority in the time domain, the PUCCH with a HARQ-ACK of the lower priority and the PUCCH with a HARQ-ACK of the higher priority and/or SR of the higher priority are multiplexed and/or prioritized. For example, the PUCCH including the HARQ-ACK of the lower priority may be a PUCCH only with a HARQ-ACK of the lower priority, or the PUCCH including the HARQ-ACK of the lower priority may include a HARQ-ACK of the lower priority and/or SR or CSI of the lower priority.

If a PUCCH with an SR and/or CSI of the lower priority overlaps with a PUCCH with a HARQ-ACK of the higher priority and/or SR of the higher priority in the time domain, the UE transmits the PUCCH with a HARQ-ACK of the higher priority and/or the SR of the higher priority, and does not transmit the PUCCH with an SR and/or CSI of the lower priority.

A mode specified in the method may also be combined with the sorting and/or specific multiplexing rules defined in other embodiments. The method specifies an uplink control channel multiplexing method and improves reliability of uplink transmission. The method can increase transmission probability of a HARQ-ACK of the lower priority, reduce the number of retransmissions of downlink data, increase system spectrum efficiency, and reduce user side delay.

PUCCHs of different priorities in a time unit can be multiplexed and/or prioritized as follows.

A PUCCH with a HARQ-ACK of the lower priority, and/or a PUCCH with an SR of the lower priority, and/or a PUCCH with CSI (for example, CSI of the lower priority) is multiplexed and/or prioritized. The time unit for multiplexing and/or prioritizing PUCCH(s) may be the PUCCH time unit of the lower priority.

A PUCCH of the higher priority and/or a PUCCH of the lower priority is multiplexed and/or prioritized. For example, a PUCCH with a HARQ-ACK of the higher priority and/or a PUCCH with an SR of the higher priority and/or a PUCCH including a HARQ-ACK of the lower priority (the PUCCH including the HARQ-ACK of the lower priority may include a HARQ-ACK of the lower priority and/or SR of the lower priority and/or CSI of the lower priority) are multiplexed and/or prioritized. For example, a PUCCH including a HARQ-ACK of the lower priority is placed in a set Q of the higher priority, and then PUCCHs in set Q of the higher priority are multiplexed and/or prioritized. The time unit for multiplexing and/or prioritizing PUCCH(s) may be the PUCCH time unit of the higher priority.

If a PUCCH including a HARQ-ACK of the lower priority overlaps with the PUCCH with a HARQ-ACK of the higher priority and/or SR of the higher priority in the time domain, the PUCCH with a HARQ-ACK of the lower priority and the PUCCH with a HARQ-ACK of the higher priority and/or SR of the higher priority are multiplexed and/or prioritized. For example, the PUCCH including the HARQ-ACK of the lower priority may only include a HARQ-ACK of the lower priority, or may include a HARQ-ACK of the lower priority and/or an SR or CSI of the lower priority.

If the PUCCH with a HARQ-ACK of the lower priority and/or SR or CSI of the lower priority overlaps with the PUCCH with a HARQ-ACK of the higher priority and/or SR of the higher priority in the time domain, the PUCCH with a HARQ-ACK of the lower priority and the PUCCH with a HARQ-ACK of the higher priority and/or the SR of the higher priority are multiplexed and/or prioritized. The UE does not transmit (discards) the SR or CSI of the lower priority.

If the PUCCH with an SR and/or CSI of the lower priority overlaps with the PUCCH with a HARQ-ACK of the higher priority and/or SR of the higher priority in the time domain, the UE transmits the PUCCH with a HARQ-ACK of the higher priority and/or the SR of the higher priority, and the UE does not transmit the PUCCH with an SR and/or CSI of the lower priority.

A mode specified in the method may also be combined with the sorting and/or specific multiplexing rules defined in other embodiments. The method specifies an uplink control channel multiplexing method and improves reliability of uplink transmission. The method can increase transmission probability of a HARQ-ACK of the lower priority, reduce the number of retransmissions of downlink data, increase system spectrum efficiency, and reduce user side delay.

The method can reuse an existing PUCCH multiplexing method, reduce the complexity of UE implementation, and reduce UE power consumption.

For example, a PUCCH transmitted by the UE can be determined according to the following.

PUCCHs satisfying condition A in one slot can be grouped in a set Q1. For example, the condition A may be a PUCCH with certain types, or may be a PUCCH that can be multiplexed with a PUCCH with a HARQ-ACK of the higher priority. For example, a PUCCH with a HARQ-ACK of the higher priority, a PUCCH with a HARQ-ACK of the lower priority, and a PUCCH with an SR of the higher priority in one slot are grouped in a set Q1. The PUCCH with HARQ-ACK should further satisfy a certain timeline condition, such as specified in 3GPP TS 38.213.

PUCCHs satisfying condition B in one slot can be grouped in a set Q2. For example, the condition B may be a PUCCH with certain types, or may not be multiplexed with the PUCCH with a HARQ-ACK of the higher priority. For example, a PUCCH with an SR of the lower priority and a PUCCH with CSI in one slot are grouped in a set Q2. The PUCCH should further satisfy a certain timeline condition such as specified in 3GPP TS 38.213.

The PUCCHs in set Q2 are multiplexed according to predefined rules defined in a process of the UE reporting multiple UCI types in the PUCCHs in 3GPP TS38.213 R15. The PUCCHs in set Q2 are multiplexed PUCCHs.

The PUCCHs in set Q1 are multiplexed according to multiple PUCCHs multiplexing rules defined in a process of the UE reporting multiple UCI types in the PUCCHs in 3GPP TS38.213 R15. Optionally, when the PUCCHs in set Q1 are multiplexed, the PUCCHs may be sorted according to a predefined sorting rule.

The sorting rule of set Q1 may also be applicable to sorting of other sets in other embodiments of the present disclosure.

Before or after multiplexing, if a PUCCH in set Q1 overlaps with a PUCCH in set Q2 in the time domain, the PUCCH in set Q2 is removed, and the UE does not transmit the PUCCH in set Q2. Alternatively, before or after multiplexing, if a PUCCH with a HARQ-ACK of the higher priority and/or SR of the higher priority in set Q1 overlaps with a PUCCH in set Q2 in the time domain, the PUCCH in set Q2 is removed, and the UE does not transmit the PUCCH in set Q2.

The PUCCH only with a HARQ-ACK of the lower priority in set Q1 is removed from set Q1 and is placed in set Q2. The PUCCHs in set Q2 are multiplexed according to multiple PUCCHs multiplexing rules defined in the process of the UE reporting multiple UCI types in the PUCCH in 3GPP TS38.213 R15. If a PUCCH in set Q1 overlaps with a PUCCH in set Q2 in the time domain, the PUCCH in set Q2 is removed, and the UE does not transmit the PUCCH in set Q2.

The UE transmits the PUCCHs in set Q1 and set Q2.

The method can increase the transmission probability of SR and CSI of the lower priority. For example, there are 3 PUCCHs in one slot, a PUCCH1 with HARQ-ACK information of the lower priority, a PUCCH2 with CSI information of the lower priority, and a PUCCH3 with HARQ-ACK information of the higher priority. According to the method, the PUCCH1 and the PUCCH3 are multiplexed and then transmitted by a PUCCH4, and if the PUCCH4 does not overlap with the PUCCH2 in the time domain, the PUCCH2 and the PUCCH4 can be transmitted. In a last step of the method, if a multiplexed PUCCH in set Q2 overlaps with a PUCCH in set Q1 in the time domain, the PUCCH in set Q2 is removed. Thus, the UE does not transmit the PUCCH in set Q2, which can reduce complexity of UE implementation as well as complexity of a standard, and precludes an instance in which a PUCCH resource where the HARQ-ACK of the lower priority is multiplexed with a HARQ-ACK of the higher priority and/or SR of the higher priority overlaps with a PUCCH resource in set Q1 in the time domain.

For example, a PUCCH transmitted by the UE can be determined according to the following.

Step 0A: PUCCHs satisfying condition A in one slot are grouped in a set Q1. For example, the condition A may be a PUCCH with certain types, or may be a PUCCH that can be multiplexed with a PUCCH with a HARQ-ACK of the higher priority. For example, a PUCCH with a HARQ-ACK of the higher priority, a PUCCH with a HARQ-ACK of the lower priority, and a PUCCH with an SR of the higher priority in one slot are grouped in set Q1. The PUCCH with HARQ-ACK should further satisfy a certain timeline condition.

Step 0B: PUCCHs satisfying condition B in one slot are grouped in a set Q2. For example, the condition B may be a PUCCH with certain types, or may be a PUCCH that cannot be multiplexed with the PUCCH with a HARQ-ACK of the higher priority. For example, a PUCCH with an SR and a PUCCH with CSI of the lower priority in one slot are grouped in set Q2. The PUCCH should further satisfy a certain timeline condition.

Step 1: The PUCCHs in set Q2 are multiplexed according to predefined multiplexing rules defined in the process of the UE reporting multiple UCI types in the PUCCHs in 3GPP TS38.213 R15. The PUCCHs in set Q2 are multiplexed PUCCHs.

Step 2: The PUCCHs in set Q1 are multiplexed according to predefined multiplexing rules defined in the process of the UE reporting multiple UCI types in the PUCCHs in 3GPP TS38.213 R15. Optionally, before or after multiplexing, if a PUCCH in set Q1 overlaps with a PUCCH in set Q2 in the time domain, the PUCCH in set Q2 is removed, and the UE does not transmit the PUCCH in set Q2. Alternatively, before or after multiplexing, if a PUCCH with a HARQ-ACK of the higher priority and/or SR of the higher priority in set Q1 overlaps with a PUCCH in set Q2 in the time domain, the PUCCH in set Q2 is removed, and the UE does not transmit the PUCCH in set Q2.

Step 3: A PUCCH only with a HARQ-ACK of the lower priority in set Q1 is removed from set Q1 and is placed in set Q2. The PUCCHs in set Q2 are multiplexed according to predefined rules. If a multiplexed PUCCH not including a HARQ-ACK of the lower priority in set Q2 overlaps with a PUCCH in set Q1 in the time domain, the PUCCH in set Q2 is removed, and the UE does not transmit the PUCCH in set Q2. If the multiplexed PUCCH including the HARQ-ACK of the lower priority in set Q2 overlaps with a PUCCH in set Q1 in the time domain, the HARQ-ACK of the lower priority in the PUCCH in set Q2 is multiplexed with a PUCCH in set Q1 which overlaps with the PUCCH in set Q2 in the time domain, the multiplexed PUCCH is placed in set Q1, and the PUCCH that overlaps the PUCCH in set Q1 in the time domain is removed from set Q2.

Steps 1, 2, and 3 are repeated until all PUCCHs in set Q1 and set Q2 do not overlap in the time domain.

The UE transmits the PUCCHs inset Q1 and set Q2.

The method can increase the transmission probability of SR and CSI of the lower priority. The method can further increase the transmission probability of the HARQ-ACK of the lower priority, reduce the transmission delay of downlink data, and improve the system spectrum efficiency.

For example, a PUCCH transmitted by the UE can be determined according to the following steps.

Step 0A. PUCCHs satisfying condition C in one slot are grouped in a set Q3. For example, the condition C may be a PUCCH with certain types, or may be a PUCCH of the higher priority. For example, a PUCCH with a HARQ-ACK of the higher priority and a PUCCH with an SR of the higher priority in one slot are grouped in a set Q3. The PUCCH with HARQ-ACK should further satisfy a certain timeline condition.

Step 0B: PUCCHs satisfying condition D in one slot are grouped in a set Q4. For example, the condition D may be a PUCCH with certain types, or may be a PUCCH of the lower priority. For example, a PUCCH with a HARQ-ACK of the lower priority, a PUCCH with an SR and a PUCCH with CSI of the lower priority in one slot are grouped in set Q4. The PUCCH with HARQ-ACK should further satisfy a certain timeline condition.

Step 1: The PUCCHs inset Q4 are multiplexed according to predefined rules. For example, the predefined rules may be multiple PUCCHs multiplexing rules defined in the process of the UE reporting multiple UCI types in the PUCCHs in 3GPP TS38.213 R15. At this time, the PUCCHs in set Q4 are multiplexed PUCCHs.

Step 2: The PUCCHs in set Q3 are multiplexed according to predefined rules. For example, the predefined rules may be multiple PUCCHs multiplexing rules defined in the process of the UE reporting multiple UCI types in the PUCCHs in 3GPP TS38.213 R15. Optionally, before or after multiplexing, if a PUCCH in set Q3 overlaps with a PUCCH in set Q4 in the time domain, the PUCCH in set Q4 is removed, that is, the UE does not transmit the PUCCH in set Q4. Optionally, before or after multiplexing, if a PUCCH in set Q3 overlaps with a PUCCH only with an SR and/or CSI of the lower priority in set Q4 in the time domain, the PUCCH in set Q4 is removed, that is, the UE does not transmit the PUCCH in set Q4. Optionally, before or after multiplexing, if a PUCCH in set Q3 overlaps with a PUCCH without a HARQ-ACK of the lower priority in set Q4 in the time domain, the PUCCH in set Q4 is removed, that is, the UE does not transmit the PUCCH in set Q4. Optionally, before or after multiplexing, if a PUCCH in set Q3 overlaps with a PUCCH with a HARQ-ACK of the lower priority in set Q4 in the time domain, the PUCCH in set Q2 is removed and the HARQ-ACK of the lower priority in the PUCCH in set Q4 is multiplexed with the PUCCH in set Q1 that overlaps with the PUCCH in set Q4 in the time domain, and the multiplexed PUCCH is placed in set Q1. The PUCCH with a HARQ-ACK of the lower priority in set Q4 may be a PUCCH only with a HARQ-ACK of the lower priority in set Q4; or, the PUCCH with a HARQ-ACK of the lower priority in set Q4 may be a PUCCH only with a HARQ-ACK of the lower priority in set Q4.

Steps 1 and 2 are repeated until all PUCCHs in set Q3 and set Q4 do not overlap in the time domain.

The method is simple to implement, makes little modification to an existing standard, and can reduce processing time of the UE, reduce the user side delay, and improve network performance.

A method of multiplexing and/or prioritizing multiple PUCCHs of different priorities is described below by considering the time unit as a sub-slot with as higher priority as an example. The method is also applicable to time units of other granularities, such as other time units defined in the present disclosure.

PUCCHs in one slot are divided in two groups, there are PUCCHs of the higher priority in a first group, and there are PUCCHs of the lower priority in a second group. The PUCCHs in the first group are multiplexed first, and then the PUCCHs in the second group are multiplexed or prioritized. Optionally, all the PUCCHs are multiplexed once, i.e., without repetitions.

For example, the PUCCH transmitted by the UE can be determined according to the following:

Step 0A: PUCCHs satisfying the condition C in one slot are grouped in a set Q3. For example, the condition C may be a PUCCH with certain types, or may be a PUCCH of the higher priority. For example, a PUCCH with a HARQ-ACK of the higher priority and a PUCCH with an SR of the higher priority in one slot are grouped in set Q3. Optionally, a PUCCH with HARQ-ACK should further satisfy a certain timeline condition.

Step 0B: PUCCHs satisfying the condition D in one slot are grouped in a set Q4. For example, the condition D may be a PUCCH with certain types, or may be a PUCCH of the lower priority. For example, a PUCCH with a HARQ-ACK of the lower priority, a PUCCH with an SR and a PUCCH with CSI of the lower priority in one slot are grouped in set Q4. The PUCCH with HARQ-ACK should further satisfy a certain timeline condition.

Step 1: The PUCCHs in set Q4 are multiplexed according to predefined rules. For example, the predefined rules may be multiple PUCCHs multiplexing rules defined in the process of the UE reporting multiple UCI types in the PUCCHs in 3GPP TS38.213 R15. At this time, the PUCCHs in set Q4 are multiplexed PUCCHs.

Step 2: The PUCCHs in set Q3 are multiplexed according to predefined rules. For example, the predefined rules may be multiple PUCCHs multiplexing rules defined in the process of the UE reporting multiple UCI types in the PUCCHs in 3GPP TS38.213 R15. Optionally, before or after multiplexing, if a PUCCH in set Q3 overlaps with a PUCCH in set Q4 in the time domain, the PUCCH in set Q4 is removed, that is, the UE does not transmit the PUCCH in set Q4. Optionally, before or after multiplexing, if a PUCCH in set Q3 overlaps with a PUCCH only with an SR and/or CSI of the lower priority in set Q4 in the time domain, the PUCCH in set Q4 is removed, that is, the UE does not transmit the PUCCH in set Q4. Optionally, before or after multiplexing, if a PUCCH in set Q3 overlaps with a PUCCH without the HARQ-ACK of the lower priority in set Q4 in the time domain, the PUCCH in set Q4 is removed, that is, the UE does not transmit the PUCCH in set Q4. Optionally, before or after multiplexing, if a PUCCH in set Q3 overlaps with a PUCCH with a HARQ-ACK of the lower priority in set Q4 in the time domain, the PUCCH in set Q2 is removed and the HARQ-ACK of the lower priority in the PUCCH in set Q4 is multiplexed with a PUCCH in set Q1 that overlaps with the PUCCH in set Q4 in the time domain, and the multiplexed PUCCH is placed in set Q1. The PUCCH with a HARQ-ACK of the lower priority in set Q4 may be a PUCCH only with a HARQ-ACK of the lower priority in set Q4; or the PUCCH with a HARQ-ACK of the lower priority in set Q4 may be a PUCCH only with a HARQ-ACK of the lower priority in set Q4.

Steps 1 and 2 are repeated until all the PUCCHs in set Q3 and set Q4 do not overlap in the time domain.

The method is simple to implement, makes little modification to an existing standard, and can reduce the processing time of the UE, shorten the user side delay, and improve the network performance.

It should be noted that a multiplexing and/or prioritizing mode defined in the present disclosure is also applicable to scenarios of a HARQ-ACK, and/or an SR, and/or CSI of a same priority.

Herein, if there are a PUCCH with HARQ-ACK and/or CSI and a PUCCH with one or more SRs in a time unit, multiplexing can be performed as follows.

All configured SRs and HARQ-ACK and/or CSI in a time unit are multiplexed. For example, the number of all the configured SRs in a time unit is K, and positive or negative SRs can be indicated with $\lceil \log_2(K+1) \rceil$. For example, all 0s represent the negative SRs, and a binary number i represents an iP SR in the time unit. For example, the SRs can be sorted from small to large. The method may be applicable to a PUCCH format 2 and/or PUCCH format 3 and/or PUCCH format 4.

Figure 9:
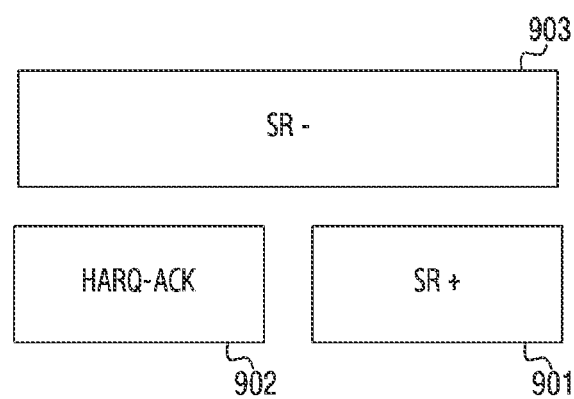
FIG. 9 illustrates sorting and multiplexing multiple PUCCHs according to an embodiment.

FIG. 9 illustrates sorting and multiplexing multiple PUCCHs according to an embodiment. As shown in FIG. 9, there are 3 PUCCHs in a time unit. A negative SR 903 overlaps with HARQ-ACK (for example, a PUCCH with HARQ-ACK 902 has the PUCCH format 2 and/or PUCCH format 3 and/or PUCCH format 4) and a positive SR 901. According to a method specified in 3GPP 38.213, the UE can determine a PUCCH resource to transmit the HARQ-ACK 902 and the SR, and the negative SR 903 can be multiplexed with a HARQ-ACK in the PUCCH with a HARQ-ACK. A PUCCH with the HARQ-ACK 902 and a negative SR 903 does not overlap with a PUCCH with a positive SR 901 in the time domain. The standard does not define which PUCCH the UE transmits. The standard stipulates that the UE transmits a PUCCH including the HARQ-ACK 902, and the positive SR 901 and the negative SR 903 and the HARQ-ACK 902 are multiplexed in one PUCCH according to the present disclosure.

Alternatively, when SRs, CSI and a HARQ-ACK in a time unit are sorted, it can be specified that:

A PUCCH including a HARQ-ACK is placed before a PUCCH that does not include the HARQ-ACK.

A PUCCH including CSI is placed before a PUCCH that does not include the CSI.

Alternatively, when SRs, CSI, and HARQ-ACK in a time unit are sorted, it can be specified that:

A PUCCH with a HARQ-ACK is placed before a PUCCH with an SR.

A PUCCH with CSI is placed before the PUCCH with an SR.

The method can ensure the consistency between the UE and the base station in understanding of uplink control channel transmission, so that the reliability of uplink transmission is improved, a case where the UE does not transmit the HARQ-ACK is avoided, the probability of retransmission of downlink data can be reduced, the spectrum efficiency can be improved, and user side delay can be decreased.

If the PUCCH with a HARQ-ACK of the lower priority overlaps with the PUCCH with an SR of the higher priority and the PUCCH with an SR of the lower priority in the time domain, a problem of solving PUCCH multiplexing occurs.

For example, it is specified in a standard and/or configured via higher layer signaling and/or dynamically indicated by DCI that the PUCCH with a HARQ-ACK of the lower priority and the PUCCH with an SR of the higher priority can be multiplexed in one PUCCH, and the UE does not transmit the PUCCH with an SR of the lower priority. The method can guarantee the transmission of SR information of the higher priority and reduces the uplink transmission delay of data of the higher priority. The method can be applicable to all PUCCH formats or to a specific PUCCH format. For example, it can be specified in a standard according to each format of the PUCCH with a HARQ-ACK of the lower priority and/or configured via higher layer signaling whether the method is supported. For example, the number of bits $N_{SR}$ of SR of the higher priority in a multiplexed UCI may be determined by the number K of the SR of the higher priority that overlaps with a PUCCH with a HARQ-ACK of the lower priority. $N_{SR}=K$. The number of bits $N_{SR}$ of the SR of the higher priority in the multiplexed UCI may be determined by the number K of the SR of the higher priority that overlaps with the PUCCH with a HARQ-ACK of the lower priority in a PUCCH time unit of the higher priority.

A corresponding relationship between the PUCCH with a HARQ-ACK of the lower priority and the PUCCH time unit of the higher priority may be determined by the methods specified in other embodiments of the present disclosure. Alternatively, the number of bits $N_{SR}$ of the SR of the higher priority in the multiplexed UCI may be determined by the number K of the SR of the higher priority that is configured in a time unit. The SR information of the higher priority can be indicated using a bitmap with the number of bits being K.

For example, it can be specified in a standard and/or configured via higher layer signaling and/or dynamically indicated by DCI that a PUCCH with a HARQ-ACK of the lower priority, a PUCCH with an SR of the higher priority, and a PUCCH with a HARQ-ACK of the lower priority can be multiplexed in one PUCCH. The method can increase the transmission probability of the SR of the lower priority on the premise of guaranteeing the transmission of SR information of the higher priority and reduces the uplink transmission delay of data of the higher priority and data of the lower priority. The method can be applicable to all PUCCH formats or to a specific PUCCH format. For example, it may be specified in a standard according to each format of a PUCCH with a HARQ-ACK of the lower priority and/or configured via higher layer signaling whether the method is supported. For example, if the PUCCH with a HARQ-ACK of the lower priority has a PUCCH format 2 and/or 3 and/or 4, the PUCCH with a HARQ-ACK of the lower priority is multiplexed with the PUCCH with a HARQ-ACK of the lower priority and the PUCCH with an SR of the higher priority in one PUCCH. The number of bits of SR of the higher priority in the multiplexed UCI can be determined by the methods specified herein. A bit sequence in the multiplexed UCI can be a sequence of a HARQ-ACK of the lower priority, an SR of the higher priority and an SR of the lower priority. A bit sequence in the multiplexed UCI can be of an SR of the higher priority, a HARQ-ACK of the lower priority and an SR of the lower priority.

For example, it can be specified in a standard and/or configured via higher layer signaling and/or dynamically indicated by DCI that if a PUCCH with a HARQ-ACK of the lower priority overlaps with more than one (greater than or equal to 2) PUCCH with an SR of the higher priority in the time domain, the UE transmits PUCCHs with an SR of the higher priority, and the UE does not transmit the PUCCH with a HARQ-ACK of the lower priority. The method can guarantee the transmission of the SR information of the higher priority and reduces the uplink transmission delay of the data of the higher priority. For example, it can be specified in a standard according to each format of a PUCCH with a HARQ-ACK of the lower priority and/or configured via higher layer signaling whether the method is supported.

For example, it can be specified in a standard and/or configured via higher layer signaling and/or dynamically indicated by DCI that the UE transmits a PUCCH with an SR of the higher priority, and the UE does not transmit a PUCCH with a HARQ-ACK of the lower priority, if the PUCCH with a HARQ-ACK of the lower priority overlaps with PUCCHs with the SRs of the higher priority in more than one (greater than or equal to 2) PUCCH time unit of the higher priority (for example, a slot/sub-slot of the higher priority) in the time domain. The method can guarantee the transmission of the SR information of the higher priority and reduces the uplink transmission delay of the data of the higher priority. For example, it can be specified by standard according to each format of a PUCCH with a HARQ-ACK of the lower priority and/or configured via higher layer signaling whether the method is supported.

For example, it can be specified in a standard and/or configured via higher layer signaling and/or dynamically indicated by DCI that a PUCCH with a HARQ-ACK of the lower priority can be associated with one PUCCH time units of a slot/sub-slot of the higher priority therein through predefined rules, if the PUCCH with a HARQ-ACK of the lower priority overlaps with PUCCHs with the SRs the higher priority in more than one (greater than or equal to 2) PUCCH time unit of a slot/sub-slot of the higher priority in the time domain, or if a PUCCH with a HARQ-ACK of the lower priority overlaps with more than one (greater than or equal to 2) PUCCH time unit of a slot/sub-slot of the higher priority in the time domain. For example, the predefined rules may be rules defined in other embodiments of the present disclosure. In a PUCCH time unit with the slot/sub-slot of the higher priority, the PUCCH with a HARQ-ACK of the lower priority is multiplexed with the SR of the higher priority (for example, the SR may overlap with the PUCCH with a HARQ-ACK of the lower priority in the time domain. For example, the SR may be configured in the time unit in one PUCCH resource. The PUCCH resource may be of the higher priority, for example, a PUCCH resource and/or a specifically configured PUCCH resource that can transmit the HARQ-ACK of the higher priority. Which PUCCH resource in the PUCCH resources with a HARQ-ACK of the higher priority will be used can be determined using a mode of determining a PUCCH resource with a HARQ-ACK and SR of a same priority specified in 3GPP TS38.213.

The SR in the present disclosure can be a positive SR or a negative SR unless specified otherwise. The embodiments of the present disclosure are separately applicable to three scenarios where the SR is a positive SR, a negative SR, or a positive and negative SR.

It should be noted that whether a HARQ-ACK of the lower priority can be multiplexed with an SR of the higher priority in the present disclosure can be explicitly indicated by a dedicated field in DCI and/or implicitly indicated by a certain field in the DCI that indicates other information, in the DCI for scheduling the HARQ-ACK of the lower priority.

The present disclosure specifies a processing method for a PUCCH with a HARQ-ACK of the lower priority overlapping with a PUCCH with an SR of the higher priority and a PUCCH with an SR of the lower priority in the time domain, defines a behavior of the UE, can improve the transmission reliability of the SR of the higher priority, shorten the uplink transmission delay of the data of the higher priority, and improve the flexibility of scheduling.

The UE may be configured with a PUCCH configuration list parameter (e.g., PUCCH-ConfigurationList in 3GPP), which may contain two PUCCH configuration parameters (for example, PUCCH-Config in 3GPP), including a first PUCCH configuration parameter and a second PUCCH configuration parameter. For example, the first PUCCH configuration parameter may correspond to the second priority (e.g., a smaller priority index 0), that is, the priority of the first PUCCH configuration parameter may be the second priority (e.g., a smaller priority index 0). The second PUCCH configuration parameter may correspond to the first priority (e.g., a larger priority index 1), and in other words, the priority of the second PUCCH configuration parameter may be the first priority (1).

For example, a sub-slot configuration length parameter (for example, subslotLengthForPUCCH in 3GPP) of each PUCCH configuration parameter of the first PUCCH configuration parameter and the second PUCCH configuration parameter may be 7 OFDM symbols, or 6 OFDM symbols, or 2 OFDM symbols. Sub-slot configuration lengths parameters of different PUCCH configuration parameters may be configured separately. If no sub-slot configuration length parameter is configured in a PUCCH configuration parameter, the scheduling time unit of the PUCCH configuration parameter is one slot by default. If a sub-slot configuration length parameter is configured in a PUCCH configuration parameter, the scheduling time unit of the PUCCH configuration parameter is a configured sub-slot configuration length in OFDM symbols.

If PUCCHs with UCIs of different priorities overlap in the time domain, the multiple PUCCHs may be multiplexed in one PUCCH for transmission, or the multiple PUCCHs are subjected to prioritization. For example, a PUCCH of the higher priority is transmitted, but a PUCCH of the lower priority is not transmitted. Time units for multiplexing and/or prioritizing multiple PUCCHs of different priorities need to be specified in a standard. For example, a section of the process that the UE reports various UCI types may be described in the standard so as to define the time unit. For example, it may be defined in 3GPP TS 38.213 9.2.5 how many OFDM symbols constitute one slot when pseudocodes for multiplexing multiple PUCCHs are performed.

The time units for multiplexing and/or prioritizing multiple PUCCHs of different priorities may be time units defined in other embodiments of the present disclosure.

The time units for multiplexing and/or prioritizing multiple PUCCHs of a same priority may be sub-slots under this priority.

PUCCHs of different priorities in a time unit may be multiplexed and/or prioritized as follows.

PUCCHs of the higher priority are multiplexed and/or prioritized. For example, a PUCCH with a HARQ-ACK of the higher priority and a PUCCH with an SR of the higher priority are multiplexed and/or prioritized.

If a PUCCH with a HARQ-ACK of the lower priority overlaps with a PUCCH with a HARQ-ACK of the higher priority and/or SR of the higher priority in the time domain, the PUCCH with a HARQ-ACK of the lower priority and the PUCCH with a HARQ-ACK of the higher priority and/or the SR of the higher priority are multiplexed and/or prioritized. A PUCCH with an SR of the lower priority and/or a PUCCH with a CSI of the lower priority and/or a PUCCH which does not overlap with the PUCCH with a HARQ-ACK of the higher priority and/or SR of the higher priority in the time domain and with a HARQ-ACK of the lower priority with a HARQ-ACK of the lower priority are multiplexed and/or prioritized.

If the PUCCH with an SR and/or CSI of the lower priority and/or HARQ-ACK of the lower priority overlaps with the PUCCH with a HARQ-ACK of the higher priority and/or SR of the higher priority in the time domain, the UE multiplexes the HARQ-ACK of the lower priority and the HARQ-ACK of the higher priority and/or the SR of the higher priority in one PUCCH. The UE transmits the PUCCH with a HARQ-ACK of the lower priority and the HARQ-ACK of the higher priority and/or the SR of the higher priority, and the UE does not transmit the PUCCH with an SR and/or CSI of the lower priority.

PUCCHs of different priorities in a time unit may be multiplexed and/or prioritized as follows.

If a PUCCH with a HARQ-ACK of the lower priority overlaps with a PUCCH with a HARQ-ACK of the higher priority and/or SR of the higher priority in the time domain, the PUCCH with a HARQ-ACK of the lower priority and the PUCCH with a HARQ-ACK of the higher priority and/or SR of the higher priority are multiplexed and/or prioritized.

The PUCCH with a HARQ-ACK of the higher priority and the PUCCH with an SR of the higher priority are multiplexed and/or prioritized.

The PUCCH with an SR and/or the PUCCH with the CSI of the lower priority and/or the PUCCH which does not overlap with the PUCCH with a HARQ-ACK of the higher priority and/or SR of the higher priority in the time domain and with a HARQ-ACK of the lower priority, with a HARQ-ACK of the lower priority are multiplexed and/or prioritized.

If the PUCCH with an SR and/or CSI of the lower priority and/or HARQ-ACK of the lower priority overlap with the PUCCH with a HARQ-ACK of the higher priority and/or SR of the higher priority in the time domain, the UE multiplexes the HARQ-ACK of the lower priority and the HARQ-ACK of the higher priority and/or the SR of the higher priority in one PUCCH. For example, the PUCCH with a HARQ-ACK of the lower priority and the PUCCH with a HARQ-ACK of the higher priority and/or the SR of the higher priority are multiplexed by using methods specified in other embodiments of the present disclosure. The UE transmits the PUCCH with a HARQ-ACK of the lower priority and the HARQ-ACK of the higher priority and/or the SR of the higher priority, and the UE does not transmit the PUCCH with an SR and/or CSI of the lower priority.

A mode specified in the method may also be combined with the sorting and/or specific multiplexing rules defined in other embodiments. The method specifies an uplink control channel multiplexing method and improves reliability of uplink transmission. The method can increase the transmission probability of the HARQ-ACK of the lower priority, reduce the number of retransmissions of downlink data, increase the system spectrum efficiency, and shorten the user side delay.

Herein, the UE may be configured with a PUCCH configuration list parameter (for example, PUCCH-ConfigurationList in 3GPP), which may contain two PUCCH configuration parameters (e.g., PUCCH-Config in the 3GPP), including a first PUCCH configuration parameter and a second PUCCH configuration parameter. For example, the first PUCCH configuration parameter may correspond to the second priority (e.g., a smaller priority index (e.g., priority index 0)), that is, the priority of the first PUCCH configuration parameter may be the second priority (e.g., a smaller priority index 0). The second PUCCH configuration parameter may correspond to the first priority (e.g., a larger priority index 1), and the priority of the second PUCCH configuration parameter may be the first priority index 1.

For example, a sub-slot configuration length parameter (for example, subslotLengthForPUCCH in 3GPP) of each PUCCH configuration parameter of the first PUCCH configuration parameter and the second PUCCH configuration parameter may be 7 OFDM symbols, or 6 OFDM symbols, or 2 OFDM symbols. Sub-slot configuration lengths parameters of different PUCCH configuration parameters may be configured separately. If no sub-slot configuration length parameter is configured in one PUCCH configuration parameter, the scheduling time unit of the PUCCH configuration parameter is one slot by default. If a sub-slot configuration length parameter is configured in one PUCCH configuration, the scheduling time unit of the PUCCH configuration parameter is a configured sub-slot configuration length in OFDM symbols.

If PUCCHs with UCIs of different priorities overlap in the time domain, the multiple PUCCHs may be multiplexed in one PUCCH for transmission, or the multiple PUCCHs are subjected to prioritization. For example, a PUCCH of the higher priority is transmitted, but a PUCCH of the lower priority is not transmitted. Time units for multiplexing and/or prioritizing multiple PUCCHs of different priorities need to be specified in a standard. For example, a section of the process that the UE reports various UCI types may be described in the standard so as to define the time unit.

The time units for multiplexing and/or prioritizing multiple PUCCHs with a same priority may be sub-slots under this priority.

PUCCHs of different priorities in a time unit may be multiplexed and/or prioritized in a mode below.

PUCCHs of the higher priority are multiplexed and/or prioritized. For example, a PUCCH with a HARQ-ACK of the higher priority and a PUCCH with an SR of the higher priority are multiplexed and/or prioritized.

The following considers time units as PUCCH time units of the higher priority, which may be a slot/sub-slot of the higher priority to illustrate the method of multiplexing and/or prioritization for multiple PUCCHs of different priorities. The method is also applicable to time units of other granularities, such as other time units defined in the present disclosure.

In one slot/sub-slot of the higher priority, PUCCHs satisfying condition E may be grouped in a set Q5. For example, the condition E may be a PUCCH with certain types, or the condition E may be a PUCCH that can be multiplexed with a PUCCH with a HARQ-ACK of the higher priority. For example, a PUCCH with a HARQ-ACK of the higher priority and a PUCCH with an SR of the higher priority in one slot/sub-slot of the higher priority are grouped in set Q5. For example, the PUCCH with a HARQ-ACK of the higher priority (e.g., DCI indicates that this PUCCH can be multiplexed with a PUCCH with a HARQ-ACK of the lower priority), the PUCCH with a HARQ-ACK of the lower priority and the PUCCH with an SR of the higher priority in one slot/sub-slot of the higher priority are grouped in set Q5. The PUCCH with HARQ-ACK should further satisfy a certain timeline condition. For example, the PUCCH in Q5 may be the PUCCH with a HARQ-ACK of the lower priority and/or the PUCCH with a HARQ-ACK of the higher priority and/or the PUCCH with an SR of the higher priority.

It can be configured via higher layer signaling whether the PUCCH with a HARQ-ACK of the higher priority can be multiplexed with the PUCCH with a HARQ-ACK of the lower priority. For example, it can be configured by a same parameter whether the PUCCH with a HARQ-ACK of the higher priority can be multiplexed with the PUCCH with a HARQ-ACK of the lower priority. If this parameter is configured, multiplexing can be implemented, and if this parameter is not configured, multiplexing cannot be implemented. Configuration may be separately performed through two parameters, one parameter can be used for configuring whether a PUCCH with a HARQ-ACK of dynamically scheduled PDSCHs of the higher priority can be multiplexed with the PUCCH with a HARQ-ACK of the lower priority, and the other parameter can be used for configuring whether a PUCCH with a HARQ-ACK of SPS PDSCHs of the higher priority can be multiplexed with the PUCCH with a HARQ-ACK of the lower priority. Configuration can be separately performed through two parameters, one parameter can be used for configuring whether a PUCCH with a HARQ-ACK of dynamically scheduled PDSCHs of the lower priority can be multiplexed with the PUCCH with a HARQ-ACK of the higher priority, and the other parameter can be used for configuring whether a PUCCH with a HARQ-ACK of SPS PDSCHs of the lower priority can be multiplexed with the PUCCH with a HARQ-ACK of the higher priority. Configuration can be performed through assigning four parameters, a parameter A can be used for configuring whether the PUCCH with a HARQ-ACK of dynamically scheduled PDSCHs of the higher priority can be multiplexed with the PUCCH with a HARQ-ACK of dynamically scheduled PDSCHs of the lower priority, a parameter B can be used for configuring whether the PUCCH with a HARQ-ACK of SPS PDSCHs of the higher priority can be multiplexed with the PUCCH with a HARQ-ACK of dynamically scheduled PDSCHs of the lower priority, a parameter C can be used for configuring whether the PUCCH with a HARQ-ACK of SPS PDSCHs of the higher priority can be multiplexed with the PUCCH with a HARQ-ACK of SPS PDSCHs of the lower priority, and a parameter D can be used for configuring whether the PUCCH with a HARQ-ACK of dynamically scheduled PDSCHs of the higher priority can be multiplexed with the PUCCH with a HARQ-ACK of SPS PDSCHs of the lower priority.

For the dynamically scheduled PDSCH, it also may be indicated in a DCI scheduling the PUCCH of the higher priority whether the PUCCH with a HARQ-ACK of this PDSCH can be multiplexed with the PUCCH with a HARQ-ACK of the lower priority. The HARQ-ACK of the lower priority may be HARQ-ACK of dynamically scheduled PDSCHs and/or the HARQ-ACK of SPS PDSCHs. It may also be indicated in the DCI scheduling the PUCCH of the lower priority whether the PUCCH with a HARQ-ACK of this PDSCH can be multiplexed with the PUCCH with a HARQ-ACK of the higher priority. The HARQ-ACK of the higher priority may be the HARQ-ACK of SPS PDSCHs. The HARQ-ACK of the higher priority may be a HARQ-ACK of dynamically scheduled PDSCHs and/or the HARQ-ACK of SPS PDSCHs.

It can be configured via the higher layer signaling whether the PUCCH with an SR of the higher priority can be multiplexed with the PUCCH with a HARQ-ACK of the lower priority. For example, it can be configured by a same parameter whether the PUCCH with an SR of the higher priority can be multiplexed with the PUCCH with a HARQ-ACK of the lower priority. If this parameter is configured, multiplexing can be implemented, and if this parameter is not configured, multiplexing cannot be implemented. Configuration may be separated performed through two parameters, one parameter can be used for configuring whether the PUCCH with a HARQ-ACK of dynamically scheduled PDSCHs of the lower priority can be multiplexed with the PUCCH with an SR of the higher priority, and the other parameter can be used for configuring whether the PUCCH with a HARQ-ACK of SPS PDSCHs of the lower priority can be multiplexed with the PUCCH with an SR of the higher priority.

For the dynamically scheduled PDSCH, it may also be indicated in the DCI scheduling the PUCCH of the lower priority whether the PUCCH with a HARQ-ACK of this PDSCH can be multiplexed with the PUCCH with an SR of the higher priority.

HARQ-ACKs indicated by multiple DCIs can be multiplexed in a same time unit, and it can be indicated in a DCI whether HARQ-ACK of the lower (or higher) priority can be multiplexed with UCI and/or data of the higher (or lower) priority. For example, it is indicated by a multiplexing indication field. It may be indicated in a DCI scheduling HARQ-ACK of the higher priority whether HARQ-ACK of the higher priority can be multiplexed with a HARQ-ACK of the lower priority. It may also be indicated in a DCI scheduling the PUSCH of the higher priority whether the PUSCH can be multiplexed with a HARQ-ACK of the lower priority. It may also be indicated in a DCI scheduling the PUSCH of the lower priority whether the PUSCH can be multiplexed with a HARQ-ACK of the higher priority. It can be specified in a standard and/or configured via higher layer signaling and/or dynamically indicated by DCI that indications of multiplexing indication fields in multiple DCIs indicating whether HARQ-ACKs of a same priority and/or HARQ-ACKs of different priorities are multiplexed in a same unit are all the same. For example, the UE does not expect that the multiplexing indication fields in multiple DCIs indicating whether HARQ-ACKs are multiplexed in a same unit are different. Alternatively, the UE does not expect to receive a multiplexing indication field in a first DCI indicating that HARQ-ACKs are multiplexed or transmitted in a same time unit and to receive a multiplexing indication field in a second DCI indicating no multiplexing. For example, the receiving time of the first DCI or the PDCCH monitoring occasion including the first DCI may be before or after the receiving time of the second DCI or the PDCCH monitoring occasion including the second DCI. Alternatively, the receiving time of the first DCI is the same as that of the second DCI or the same PDCCH monitoring occasion. It should be noted that it can be specified in a standard and/or configured via higher layer signaling and/or dynamically indicated by DCI that if a multiplexing indication field in the DCI scheduling the PUSCH of the higher priority indicates 1 (or 0), the instance represents multiplexing, and if the field indicates 0 (or 1), the instance represents PUSCH and PUCCH of the lower priority are transmitted simultaneously or only the PUSCH of the higher priority is transmitted. If a multiplexing indication field in the DCI scheduling the PUSCH of the lower priority indicates 1 (or 0), the instance represents multiplexing, and if the field indicates 0 (or 1), the instance represents PUSCH and PUCCH of the higher priority are transmitted simultaneously or only the PUCCH of the higher priority is transmitted. This method can reduce implementation complexity of the UE while improving flexibility of scheduling.

If a PUCCH of the higher priority (for example, PUCCH with HARQ-ACK) overlaps with multiple PUSCHs of the lower priority in the time domain, it can be specified in a standard and/or configured via higher layer signaling and/or dynamically indicated by DCI that UCI (for example, HARQ-ACK) are multiplexed in one PUSCH, and the UE transmits or cancels transmission of PUSCH without multiplexed UCIs. If the UE does not multiplex UCIs in any PUSCH, the UE transmits the PUCCH, and the UE cancels transmission of the PUSCH (for example, the PUSCH that does not support PUCCH and PUSCH simultaneous transmissions). All PUSCHs can be multiplexed with PUSCH of the lower priority and satisfy a multiplexing timeline condition. The UE selects one PUSCH to multiplex UCI according to a predefined rule (for example, selects the PUSCH with the earliest starting (or ending) symbol (or position) among the PDCCHs scheduling the PUSCHs. The UE selects the PUSCH with the earliest starting (or ending) symbol (or position) among the PUSCHs) and/or a dynamic indication, and transmits other PUSCHs. This method clarifies the behavior of the UE when multiple PUSCHs overlap with one PUCCH and improves the reliability of uplink transmission.

This method provides various configuration and dynamic indication modes for multiplexing the PUCCHs of different priorities, can improve flexibility of scheduling, improve reliability of transmission, and optimize the overall performance of a network.

If the PUCCH with a HARQ-ACK of the lower priority overlaps with multiple slots/sub-slots of the higher priority, the slots/sub-slots of the higher priority, which are associated with the PUCCH with a HARQ-ACK of the lower priority, should be determined. For example, the PUCCH with a HARQ-ACK of the lower priority can be placed in set Q5 of one sub-slot in the multiple slots/sub-slots of the higher priorities according to a predefined rule.

If the PUCCH with a HARQ-ACK of the lower priority overlaps with one or more PUCCHs with a HARQ-ACK of the higher priority in the time domain, the PUCCH with a HARQ-ACK of the lower priority is placed in set Q5 which contains a first PUCCH with a HARQ-ACK of the higher priority of the one or more slots/sub-slots of the higher priorities. If the PUCCH with a HARQ-ACK of the lower priority does not overlap with the PUCCH with a HARQ-ACK of the higher priority in the time domain and the PUCCH with a HARQ-ACK of the lower priority overlaps with one or more PUCCHs with a positive SR or a negative SR of the higher priority in the time domain, the PUCCH with a HARQ-ACK of the lower priority is placed in set Q5 of the slot/sub-slot of the higher priority, which contains a first PUCCH with an SR of the higher priority.

If the PUCCH with a HARQ-ACK of the lower priority overlaps with multiple slots/sub-slots of the higher priority, the slots/sub-slots of the higher priority, which are associated with the PUCCH with a HARQ-ACK of the lower priority, should be determined. For example, if the PUCCH with a HARQ-ACK of the lower priority overlaps with one or more PUCCHs with a HARQ-ACK of the higher priorities in the time domain and if at least one PUCCH in the one or more PUCCHs with a HARQ-ACK of the higher priorities is configured and/or indicated to be multiplexed with the PUCCH with a HARQ-ACK of the lower priority, the PUCCH with a HARQ-ACK of the lower priority is placed in set Q5 in the one or more slots/sub-slots of the higher priorities, which contains a first PUCCH which is configured and/or indicated to be multiplexed with the PUCCH with a HARQ-ACK of the lower priority and with a HARQ-ACK of the higher priority. If no PUCCH in one or more PUCCHs with a HARQ-ACK of the higher priorities is configured and/or indicated to be multiplexed with the PUCCH with a HARQ-ACK of the lower priority, the UE does not transmit this PUCCH with a HARQ-ACK of the lower priority. Alternatively, the UE cannot place this PUCCH with a HARQ-ACK of the lower priority in set Q5 of any one slot/sub-slot in the one or more slots/sub-slots of the higher priorities.

If the PUCCH with a HARQ-ACK of the lower priority does not overlap with the PUCCH with a HARQ-ACK of the higher priority in the time domain and the PUCCH with a HARQ-ACK of the lower priority overlaps with the PUCCH with an SR of the higher priority in the time domain, the PUCCH with a HARQ-ACK of the lower priority is placed in set Q5 of the slot/sub-slot of the higher priority, which contains a first PUCCH with an SR of the higher priority.

If the PUCCH with a HARQ-ACK of the lower priority does not overlap with the PUCCH with a HARQ-ACK of the higher priority in the time domain and the PUCCH with a HARQ-ACK of the lower priority overlaps with the PUCCH with an SR of the higher priority in the time domain, the PUCCH with a HARQ-ACK of the lower priority is placed in set Q5 of the slot/sub-slot of the higher priority, which contains a first PUCCH satisfying a multiplexing condition and with the SR of the higher priority. If all the PUCCHs with SRs of the higher priorities do not satisfy the multiplexing conditions, the UE does not transmit this PUCCH with a HARQ-ACK of the lower priority. Alternatively, the UE cannot place this PUCCH with a HARQ-ACK of the lower priority in set Q5 of any one slot/sub-slot in the one or more slots/sub-slots of the higher priorities.

If the PUCCH with a HARQ-ACK of the lower priority does not overlap with the PUCCH with a HARQ-ACK of the higher priority in the time domain and the PUCCH with a HARQ-ACK of the lower priority overlaps with the PUCCH with an SR of the higher priority in the time domain and if the PUCCH with a HARQ-ACK of the lower priority is configured or indicated to be multiplexed with the SR of the higher priority, the PUCCH with a HARQ-ACK of the lower priority is placed in set Q5 of the slot/sub-slot of the higher priority, which contains a first PUCCH with an SR of the higher priority. If the PUCCH with a HARQ-ACK of the lower priority is not configured or indicated to be multiplexed with the SR of the higher priority (or the PUCCH with a HARQ-ACK of the lower priority is configured or indicated not to be multiplexed with the SR of the higher priority), the UE does not transmit this PUCCH with a HARQ-ACK of the lower priority. Alternatively, the UE cannot place this PUCCH with a HARQ-ACK of the lower priority in set Q5 of any one slot/sub-slot in the one or more slots/sub-slots of the higher priorities.

If the PUCCH with a HARQ-ACK of the lower priority does not overlap with the PUCCH with a HARQ-ACK of the higher priority in the time domain and the PUCCH with a HARQ-ACK of the lower priority overlaps with the PUCCH with an SR of the higher priority in the time domain and if the PUCCH with a HARQ-ACK of the lower priority is configured or indicated to be multiplexed with the SR of the higher priority, the PUCCH with a HARQ-ACK of the lower priority is placed in set Q5 of the slot/sub-slot of the higher priority, which contains the first PUCCH satisfying the multiplexing conditions and with the SR of the higher priority. If the PUCCH with a HARQ-ACK of the lower priority is not configured or indicated to be multiplexed with the SR of the higher priority (or the PUCCH with a HARQ-ACK of the lower priority is configured or indicated not to be multiplexed with the SR of the higher priority) or if all the PUCCHs with the SR of the higher priority do not satisfy the multiplexing conditions, the UE does not transmit this PUCCH with a HARQ-ACK of the lower priority. Alternatively, the UE cannot place this PUCCH with a HARQ-ACK of the lower priority in set Q5 of any one slot/sub-slot in the one or more slots/sub-slots of the higher priorities.

The method provides a method for determining a set which contains a PUCCH with a HARQ-ACK of the lower priority, specifies a behavior of a UE, and improves reliability of uplink control signaling transmission.

The method for multiplexing and/or prioritizing the PUCCH with a HARQ-ACK of the lower priority with the PUCCH with a HARQ-ACK of the higher priority and/or the PUCCH with an SR of the higher priority, as specified in the present disclosure, is also applicable to multiplexing and/or prioritizing the PUCCH with an SR of the lower priority with the PUCCH with a HARQ-ACK of the higher priority and/or the PUCCH with an SR of the higher priority.

The method for multiplexing and/or prioritizing the PUCCH with a HARQ-ACK of the lower priority with the PUCCH with a HARQ-ACK of the higher priority and/or the PUCCH with an SR of the higher priority, as specified in the present disclosure, is also applicable to multiplexing and/or prioritizing the PUCCH with an SR of the lower priority and/or the HARQ-ACK of the lower priority with the PUCCH with a HARQ-ACK of the higher priority and/or the PUCCH with an SR of the higher priority.

The method for multiplexing and/or prioritizing the PUCCH with a HARQ-ACK of the lower priority with the PUCCH with a HARQ-ACK of the higher priority and/or the PUCCH with an SR of the higher priority, as specified in the present disclosure, is also applicable to multiplexing and/or prioritizing the PUCCH with an SR of the lower priority and/or the PUCCH with a HARQ-ACK of the lower priority with the PUCCH with a HARQ-ACK of the higher priority and/or the PUCCH with an SR of the higher priority.

For placing the PUCCH with a HARQ-ACK of the lower priority in a set of time units of the PUCCH of the higher priority, as specified in the present disclosure, a limiting condition which should be satisfied can also be added. For example, the limiting condition may be that the multiplexed PUCCH cannot exceed a boundary of this slot. For example, the limiting condition may be multiplexing conditions between the PUCCH with a HARQ-ACK of the lower priority and the PUCCH with HARQ-ACK and/or the SR of the higher priority. The multiplexing methods specified in the present disclosure all should satisfy the multiplexing conditions, e.g., a timeline condition or whether it is configured or indicated to be multiplexed.

The conditions which should be satisfied when multiplexing a PUCCH (for example, a PUCCH with HARQ-ACK (e.g., the HARQ-ACK of SPS PDSCHs and/or the HARQ-ACK of PDSCHs scheduled by DCIs) of the higher priority overlaps with one or more PUCCHs (e.g., the PUCCHs with a HARQ-ACK of the lower priority) in the time domain) are multiplexed in one PUCCH can be specified by a standard and/or configured via higher layer signaling and/or dynamically indicated by DCI. The multiplexing conditions may be at least one of the following.

Condition 1-1: the number of bits of UCIs after multiplexing does not exceed a predefined number.

Condition 1-2: a maximum coding rate of the UCIs after multiplexing does not exceed a predefined coding rate.

Condition 1-3: the multiplexed PUCCH does not overlap with a downlink symbol and/or a flexible symbol in the time domain. For example, the downlink symbol and/or the flexible symbol may be configured via higher layer signaling and/or indicated by a slot format indicator (SFI) and/or determined by a synchronization signal block (SSB) and/or a CORESET0.

For example, the UCI may be a total of UCIs and/or UCIs of the lower priority and/or UCIs of the higher priority.

For example, the predefined number and/or the predefined coding rate may be configured by the higher layer signaling, and the HARQ-ACK of SPS PDSCHs and the HARQ-ACK of PDSCHs scheduled by DCIs can be separately or uniformly configured.

If the multiplexing conditions are satisfied, the UE can multiplex multiple PUCCHs in one PUCCH; and if the multiplexing conditions are not satisfied, the UE can transmit the PUCCH of the higher priority. However, the UE does not transmit the PUCCH of the lower priority.

The method defines the PUCCH multiplexing conditions, and can avoid a case in which the multiplexed PUCCH cannot be transmitted, e.g., cases in which the multiplexed PUCCH overlaps with the downlink symbol and/or the flexible symbol in the time domain, the number of the bits of the PUCCH exceeds the predefined number, or the maximum coding rate of the multiplexed PUCCH exceeds the predefined coding rate and the like, so that reliability of transmission of the PUCCH of the higher priority can be improved, the user side delay can be decreased, and the system performance can be improved.

The conditions which should be satisfied when multiplexing a PUCCH with UCI of the higher priority and a PUSCH of the lower priority can be specified in a standard and/or configured via higher layer signaling and/or dynamically indicated by DCI. The multiplexing conditions may be at least one of the following.

Condition 2-1: the PUSCH of the lower priority does not overlap with the SR of the higher priority in the time domain.

Condition 2-2: the PUSCH of the lower priority does not overlap with a PUSCH of the higher priority in a same serving cell in the time domain.

Condition 2-3: the PUSCH of the lower priority is a configured grant PUSCH.

Condition 2-4: the PUSCH of the lower priority is a DCI scheduled PUSCH.

Condition 2-5: the PUSCH of the lower priority does not overlap with a downlink symbol and/or a flexible symbol in the time domain. For example, the downlink symbol and/or the flexible symbol can be configured via the higher layer signaling and/or indicated by the SFI and/or determined by SSB and/or CORESET0.

Condition 2-6: the configured grant PUSCH is configured to support multiplexing with UCIs of a different priority (the higher priority).

If the multiplexing conditions are satisfied, the UE can multiplex the PUCCH with UCI of the higher priority in the PUSCH of the lower priority; and if the multiplexing conditions are not satisfied, the UE can transmit the PUCCH of the higher priority. However, the UE does not transmit the PUSCH of the lower priority.

It also may be specified in the standard that the UE does not expect to multiplex UCI (e.g., HARQ-ACK) of the higher priority in a PUSCH of the lower priority, where transmission of the PUSCH of the lower priority is canceled, and/or the PUSCH of the lower priority overlaps with another PUSCH of the higher priority in the same serving cell in the time domain, and/or the PUSCH of the lower priority overlaps with a PUCCH with an SR of the higher priority in the time domain.

It also can be specified in the standard that if a PUSCH of the lower priority with UCI (e.g., HARQ-ACK) of the higher priority overlaps with a PUCCH with an SR of the higher priority in the time domain, the UE transmits the PUSCH of the lower priority with UCI (e.g., HARQ-ACK) of the higher priority, but does not transmit the PUCCH with an SR of the higher priority.

The method defines the PUCCH multiplexing conditions, and can avoid the case in which the multiplex PUCCH cannot be transmitted, e.g., cases that the PUSCH of the lower priority overlaps with the downlink symbols and/or the flexible symbols in the time domain and the like, so that reliability of transmission of the PUCCH of the higher priority can be improved, the user side delay can be decreased, and the system performance can be improved.

In a method for determining a PUCCH contained in a set (for example, a set Q), a timeline condition which the PUCCH should satisfy may be that a time distance between the ending position (or the ending symbol) of a PDSCH associated with a PUCCH in set Q and the starting position (or the starting symbol) of a slot (or a sub-slot) corresponding to set Q is not smaller than T1, and a time distance between the ending position (or the ending symbol) of a PDCCH associated with the PUCCH in set Q and the starting position (or the starting symbol) of the slot (or the sub-slot) corresponding to set Q is not smaller than T2, where T1 and T2 can be determined by the timeline condition that should be satisfied in the PUCCH multiplexing which is specified by 3GPP TS38.213. In this method, by defining the uniform timeline condition for the PUCCH in the set, the UE can process the time when the PUCCH in the set is multiplexed according to the timeline condition, and the implementation complexity of the UE can be reduced.

The method for multiplexing and/or prioritizing the multiple UCIs of different priorities in the disclosure may also be applicable to multiplexing and/or prioritizing of unicasted UCI/PUCCH(s) and groupcast (or multicast)/broadcast UCI/PUCCH(s). In this case, various methods for multiplexing of unicasted UCI/PUCCH(s) and groupcast/broadcast UCI/PUCCH(s) may be obtained by replacing the multiple UCIs/PUCCHs of different priorities in the embodiments of the present disclosure with unicast UCI/PUCCH(s) and groupcast/broadcast UCI/PUCCH(s) or by replacing the multiple UCIs/PUCCHs of different priorities in the embodiments of the present disclosure with unicast UCI/PUCCH(s) and groupcast/broadcast UCI/PUCCH(s) of the same priority. For example, UCI/PUCCH(s) of the higher priority can be replaced with unicast UCI/PUCCH(s); UCI/PUCCH(s) of the lower priority can be replaced with groupcast/broadcast UCI/PUCCH(s). For the purpose of brevity, a detailed description is omitted here.

AA groupcast/broadcast PUCCH time unit may be different from a unicast PUCCH time unit, and it can be specified in a standard and/or configured via higher layer signaling and/or dynamically indicated by DCI that the unicast PUCCH time unit serves as a PUCCH multiplexing time unit, a PUCCH with a HARQ-ACK of groupcast/broadcast PDSCHs is placed in a PUCCH set of the unicast PUCCH time unit, and the PUCCH in the PUCCH set is multiplexed and/or prioritized according to the methods herein. It can be specified in a standard and/or configured via higher layer signaling and/or dynamically indicated by DCI that the groupcast/broadcast PUCCH time unit serves as the PUCCH multiplexing time unit. It can be specified in a standard and/or configured via higher layer signaling and/or dynamically indicated by DCI that the groupcast/broadcast PUCCH time unit is not smaller than the unicast PUCCH time unit. It can be specified in a standard and/or configured via higher layer signaling and/or dynamically indicated by DCI that one smaller (or larger) time unit in the unicast PUCCH time unit and the groupcast/broadcast PUCCH time unit serves as the PUCCH multiplexing time unit. According to the method, the unicast PUCCH and groupcast/broadcast PUCCH multiplexing time unit is defined, then the unicast PUCCH and the groupcast/broadcast PUCCH can be multiplexed based on an existing mode, the implementation complexity of the UE is low, and reliability of UCI transmission can be improved.

If one PUCCH configuration parameter (e.g., PUCCH-Config in 3GPP, the PUCCH-Config may be a PUCCH-Config of the lower priority) of the UE is configured with the sub-slot length parameter (e.g., subslotLengthForPUCCH in 3GPP), and if multiple CSI PUCCH resource list parameters (e.g., multi-CSI-PUCCH-ResourceList in 3GPP) are configured in the PUCCH configuration parameter, it can be specified by standards and/or configured via the higher layer signaling and/or dynamically indicated by DCI that PUCCH resources in the multiple CSI PUCCH resource list parameters are configured in a same sub-slot (for example, in a same subslotLengthForPUCCH symbol). It can be specified in a standard and/or configured via higher layer signaling and/or dynamically indicated by DCI that the PUCCH resources in the multiple CSI PUCCH resource list parameters are configured in a same time domain resource (e.g., an OFDM symbol). It can be specified in a standard and/or configured via higher layer signaling and/or dynamically indicated by DCI that the UE does not expect to configure the PUCCH resources in the multiple CSI PUCCH resource list parameters in different time domain resources (e.g., OFDM symbols). It can be specified in a standard and/or configured via higher layer signaling and/or dynamically indicated by DCI that the UE does not expect to configure the PUCCH resources in the multiple CSI PUCCH resource list parameters in different sub-slots. If the PUCCH resources in the multiple CSI PUCCH resource list parameters are configured in different sub-slots and if a PUCCH with a HARQ-ACK of SPS PDSCHs overlaps with a first PUCCH resource in the multiple CSI PUCCH resource list parameters in the time domain, the HARQ-ACK and the CSI can be multiplexed in one CSI PUCCH resource, the CSI PUCCH resource may be a second PUCCH resource in the multiple CSI PUCCH resource list parameters, and if the second PUCCH resource in the multiple CSI PUCCH resource list parameters overlaps with another PUCCH with a HARQ-ACK of SPS PDSCHs in the time domain, the two pieces of HARQ-ACK and CSI should be multiplexed in one PUCCH resource, resulting in increase of the implementation complexity of the UE and increase of the delay of the HARQ-ACK. The method can avoid a case in which a HARQ-ACK of SPS PDSCHs of different sub-slots are multiplexed in one PUCCH and can reduce the delay of the HARQ-ACK of SPS PDSCHs, improve reliability of HARQ-ACK transmission and reduce the implementation complexity of the UE.

It can be specified in a standard and/or configured via higher layer signaling and/or dynamically indicated by DCI that the UE does not expect to multiplex an SR and/or HARQ-ACK of SPS PDSCHs only in one sub-slot (the slot does not include HARQ-ACK of dynamically scheduled PDSCHs) in another sub-slot. For example, it can be specified in a standard and/or configured via higher layer signaling and/or dynamically indicated by DCI that if a first PUCCH configuration which is a PUCCH configuration of the lower priority of the UE is configured with a sub-slot length (e.g., the 3GPP parameter subslotLengthForPUCCH), the UE does not expect to multiplex the SR or HARQ-ACK of SPS PDSCHs only in one sub-slot in another sub-slot, or the UE does not expect to move the SR or HARQ-ACK of SPS PDSCHs only in one sub-slot is moved to another sub-slot after multiplexing. The SR and the HARQ-ACK in this embodiment may be of the same priority.

The method can avoid a case in which a HARQ-ACK of SPS PDSCHs only included in different sub-slots and/or the SRs of different sub-slots are multiplexed in one PUCCH and can reduce the delay of the HARQ-ACK of SPS PDSCHs and/or SR, improve reliability of HARQ-ACK transmission and reduce the implementation complexity of the UE.

PUCCH resource with multiple multiplexed UCIs, obtained after two or more PUCCHs are multiplexed may overlap with another PUCCH (or PUSCH) in the time domain, and another PUCCH (or PUSCH) does not overlap with any of the PUCCHs before multiplexing in the time domain. At that moment, the UE should further multiplex the overlapped PUCCHs and/or PUSCHs. In order to reduce the implementation complexity of the UE, it can be specified in a standard and/or configured via higher layer signaling and/or dynamically indicated by DCI that when two or more PUCCHs overlap in the time domain (or, when two or more PUCCHs are multiplexed), the UE does not expect that the PUCCH after multiplexing (e.g., the PUCCH resource with multiple multiplexed UCIs) overlap with another PUCCH or PUSCH in the time domain, and the other PUCCH or PUSCH does not overlap with any of the PUCCHs before multiplexing in the time domain. It can be specified in a standard and/or configured via higher layer signaling and/or dynamically indicated by DCI that when two or more PUCCHs overlap in the time domain (or, when two or more PUCCHs are multiplexed), the UE does not expect that the time domain resource (e.g., the OFDM symbols) occupied by the PUCCH after multiplexing (e.g., the PUCCH resource with multiple multiplexed UCIs) is different from the time domain resource occupied by any of the PUCCHs before multiplexing.

It can be specified in a standard and/or configured via higher layer signaling and/or dynamically indicated by DCI that if a PUCCH with a HARQ-ACK of dynamically scheduled PDSCHs overlaps with a PUCCH with an SR or CSI in the time domain, the time domain resource (e.g., the OFDM symbol) occupied by the PUCCH after multiplexing is the same as that occupied by the PUCCH with a HARQ-ACK of dynamically scheduled PDSCHs before multiplexing. Alternatively, the UE does not expect that the time domain resource (e.g., the OFDM symbol) occupied by the PUCCH after multiplexing is different from that occupied by the PUCCH with a HARQ-ACK of dynamically scheduled PDSCHs before multiplexing.

It can be specified in a standard and/or configured via higher layer signaling and/or dynamically indicated by DCI that if a PUCCH with a HARQ-ACK overlaps with a PUCCH with an SR in the time domain, the time domain resource (e.g., the OFDM symbol) occupied by the PUCCH after multiplexing is the same as that occupied by the PUCCH with HARQ-ACK before multiplexing. Alternatively, the UE does not expect that the time domain resource (e.g., the OFDM symbols) occupied by the PUCCH after multiplexing is different from that occupied by the PUCCH with HARQ-ACK before multiplexing.

It can be specified in a standard and/or configured via higher layer signaling and/or dynamically indicated by DCI that the UE does not expect to receive two PUCCHs scheduled by DCIs with different time domain resources (e.g., the OFDM symbols) in the same slot.

It can be specified in a standard and/or configured via higher layer signaling and/or dynamically indicated by DCI that if a UE determines a first PUCCH resource that includes HARQ-ACK of SPS PDSCHs only, and does not include HARQ-ACK of dynamically scheduled PDSCHs, in a slot or the UE receives a first DCI format indicating a first PUCCH resource that includes HARQ-ACK in a slot and then the UE receives a second DCI format (time when the second DCI format is received is later than that when the first DCI format is received) indicating a second PUCCH resource that includes HARQ-ACK in the slot, the UE does not expect that the time domain resources (e.g., the OFDM symbols) occupied by the two PUCCHs are different.

It can be specified in a standard and/or configured via higher layer signaling and/or dynamically indicated by DCI that if a UE determines a first PUCCH resource that includes HARQ-ACK of SPS PDSCHs only in a slot and then the UE receives a DCI format indicating a second PUCCH resource that includes HARQ-ACK in the slot, the UE does not expect that the time domain resources (e.g., the OFDM symbols) occupied by the two PUCCHs are different.

It can be specified in a standard and/or configured via higher layer signaling and/or dynamically indicated by DCI that if a UE determines a first PUCCH resource that includes HARQ-ACK of SPS PDSCHs only in a slot or the UE receives a first DCI format indicating the first PUCCH resource that includes HARQ-ACK in a slot and then the UE receives a second DCI format (the time when the second DCI format is received is later than that when the first DCI format is received) indicating the second PUCCH resource that includes HARQ-ACK in the slot, the UE does not expect that the starting position (or the starting symbol) of the second PUCCH is earlier than the starting position (or the starting symbol) of the first PUCCH.

The PUCCH resource in the embodiments of the present disclosure may be used for PUCCH transmission.

The method in the embodiments of the present disclosure may be applicable to all or specific scenarios (or configurations). A specific scenario may be that the UE is configured with a sub-slot length and/or the UE is configured with two priorities, that the PUCCH configuration of the lower priority and/or the higher priority (e.g., a first PUCCH-Config and/or a second PUCCH-Config in the 3GPP parameters) is configured with the sub-slot length, or that the PUCCH is of the higher priority and/or the lower priority.

In the present disclosure, the time domain resources (e.g., the OFDM symbols) occupied by two PUCCHs and/or PUSCHs are different can be replaced with the starting (or ending) symbols of two PUCCHs and/or PUSCHs are different.

This method specifies the time domain resource occupied by the PUCCH in the PUCCH multiplexing process, so that the implementation complexity of the UE and the network can be reduced. When the PUCCHs or the PUSCHs are configured with two priorities, multiplexing of the PUCCHs of the higher priority cannot influence transmission of the PUCCHs/PUSCHs of the lower priority.

Herein, if a behavior (or an operation) for which the UE does not expect has occurred, this can be regarded as a fault case/configuration/scheduling.

It can be specified in a standard and/or configured via higher layer signaling and/or dynamically indicated by DCI that if the PUCCHs with a HARQ-ACK of SPS PDSCHs of the higher priority overlaps with the PUCCHs with a HARQ-ACK of PDSCHs scheduled by DCIs of the lower priority in the time domain, PUCCHs resource of the higher priority may be used for the multiplexed UCI. For example, the PUCCH resource maybe a PUCCH resource configured in a 3GPP parameter PUCCH-ResourceSet. The PUCCHs resource with the UCI after multiplexing can be indicated by scheduling PUCCH resource indicator (PRI) field in a last DCI of the HARQ-ACK of the lower priority.

This method specifies a resource determination mode of the PUCCH, and can improve the flexibility of scheduling and improve the overall performance of the network.

It can be configured via the higher layer signaling whether a CG-PUSCH can be multiplexed with the UCI.

The UCI may be at least one of:
A certain specific UCI type;
All UCI types;
A UCI with a same priority as the configured grant PUSCH;
A UCI with a different priority from the configured grant PUSCH;
A UCI of the lower priority;
A UCI of the higher priority.

The configured grant PUSCH may be at least one of:
All configured grant PUSCH configurations;
A configured grant PUSCH of the lower priority;
A configured grant PUSCH of the higher priority;
A certain configured grant PUSCH configuration.

If the UE is not configured to support multiplexing the configured grant PUSCH and UCI of the same priority, when the configured grant PUSCH overlaps with the PUCCH with UCI in the time domain, the UE transmits the PUCCH, but does not transmit the configured grant PUSCH, or the UE does not transmit the PUCCH, but transmits the configured grant PUSCH.

If the UE is not configured to support multiplexing the configured grant PUSCH and UCI of different priorities, when the configured grant PUSCH overlaps with the PUCCH with UCI in the time domain, the UE transmits the PUCCH or configured grant PUSCH of the higher priority but does not transmit the PUCCH or configured grant PUSCH of the lower priority.

This method can enable a base station to flexibly configure whether to multiplex the configured grant PUSCH with the UCI and can improve the flexibility of scheduling and improve the network performance.

It can be specified in a standard and/or configured via higher layer signaling and/or dynamically indicated by DCI that if a PUCCH with the HARQ-ACK of the higher priority and the HARQ-ACK of the lower priority overlaps with both a PUSCH of the lower priority and a PUSCH of the higher priority in the time domain, the UE multiplexes the UCI of the higher priority and the UCI of the lower priority in the PUSCH of the higher priority.

This method can ensure reliability of transmission of the UCI of the higher priority.

It can be specified in a standard and/or configured via higher layer signaling and/or dynamically indicated by DCI that if the PUCCH with the HARQ-ACK of the higher priority and the PUCCH with the HARQ-ACK of the lower priority both overlap with the PUSCH of the lower priority in the time domain, where the PUCCH with the HARQ-ACK of the lower priority does not overlap with the PUSCH of the lower priority in the time domain, the UE multiplexes the PUCCH with UCI of the higher priority in the PUSCH of the lower priority. It also can be specified in a standard that the UE does not expect for occurrence of such a case.

If a PUCCH with the HARQ-ACK of the lower priority overlaps with both a PUCCH with the HARQ-ACK of the higher priority and a PUSCH of the higher priority in the time domain, where the PUCCH with the HARQ-ACK of the higher priority does not overlap with the PUSCH of the higher priority in the time domain, the UE multiplexes the PUCCH with the UCI of the lower priority in the PUSCH or PUCCH of the higher priority. Alternatively, the UE multiplexes the PUCCH with the UCI of the lower priority in the PUSCH or PUCCH of the higher priority, of which the starting time (or the ending time) is earlier (or later). It also can be specified in a standard that the UE does not expect for occurrence of such case.

This method defines the behavior of the UE and can improve the reliability of uplink transmission.

Multiplexing and/or prioritization for PUCCHs and/or PUSHs of different priorities can be performed as follows.

Step 1: PUCCHs and/or PUSCHs of the same priority are multiplexed and/or prioritized. This may follow the rules for multiplexing and/or prioritizing PUCCHs and/or PUSCHs of the same priority specified in 3GPP TS38.213. In step 1, PUCCHs and/or PUSCHs of the lower priority may be multiplexed and/or prioritized first, and then, PUCCHs and/or PUSCHs of the higher priority may be multiplexed and/or prioritized. Alternatively, the PUCCHs and/or PUSCHs of the higher priority may be multiplexed and/or prioritized first, and then, the PUCCHs and/or PUSCHs of the lower priority may be multiplexed and/or prioritized.

Step 2: PUCCHs and/or PUSCHs of different priorities are multiplexed and/or prioritized.

After step 1 ends, uplink channels of the lower priority may be one or more PUCCHs and/or one or more PUSCHs, where the PUCCHs do not overlap in the time domain, and the PUCCHs and PUSCHs do not overlap in the time domain.

After step 1 ends, uplink channels of the higher priority may be one or more PUCCHs and/or one or more PUSCHs, where the PUCCHs do not overlap in the time domain, and the PUCCHs and PUSCHs do not overlap in the time domain.

Step 2 can be implemented according to at least one of the following.

Mode 1:

PUCCHs of different priorities are multiplexed and/or prioritized. For example, as taught herein, a PUCCH including HARQ-ACK of the lower priority and a PUCCH of the higher priority are multiplexed and/or prioritized. If a PUCCH with an SR or CSI of the lower priority overlaps with a PUCCH including HARQ-ACK and/or SR of the higher priority in the time domain, the UE does not transmit (discards) the PUCCH with an SR and/or CSI of the lower priority.

PUCCHs including HARQ-ACK of the higher priority and/or SR of the higher priority and PUSCHs are multiplexed and/or prioritized. For example, PUCCHs including HARQ-ACK and/or SR of the higher priority and PUSCHs of the higher priority are multiplexed and/or prioritized first. Then, PUCCHs including HARQ-ACK and/or SR of the higher priority and PUSCHs of the lower priority are multiplexed and/or prioritized. Alternatively, PUCCHs including HARQ-ACK and/or SR of the higher priority and PUSCHs of the higher priority and/or the lower priority are multiplexed and/or prioritized first. Alternatively, the PUCCH including HARQ-ACK and/or SR of the higher priority and PUSCHs of the lower priority are multiplexed and/or prioritized first. Then, PUCCHs including HARQ-ACK and/or SR of the higher priority and PUSCHs of the higher priority are multiplexed and/or prioritized.

PUCCHs of the lower priority and PUSCHs of the higher priority may be multiplexed and/or prioritized.

Mode 2:

PUCCHs of the lower priority and PUSCHs of the higher priority are multiplexed and/or prioritized. PUCCHs of the higher priority and PUSCHs of the lower priority are multiplexed and/or prioritized, or PUCCHs of the higher priority and PUSCHs of the lower priority are multiplexed and/or prioritized. PUCCHs of the lower priority and PUSCHs of the higher priority may be multiplexed and/or prioritized.

PUCCHs of different priorities may be multiplexed and/or prioritized.

PUCCHs including HARQ-ACK of the higher priority and/or SR of the higher priority and PUSCHs are multiplexed and/or prioritized. For example, PUCCHs including HARQ-ACK and/or SR of the higher priority and PUSCHs of the higher priority are multiplexed and/or prioritized first. Then, PUCCHs including HARQ-ACK and/or SR of the higher priority and PUSCHs of the lower priority are multiplexed and/or prioritized. PUCCHs including HARQ-ACK and/or SR of the higher priority and PUSCHs of the higher priority and/or the lower priority may be multiplexed and/or prioritized first.

In mode 2, if a PUSCH of the lower priority and a PUSCH of the higher priority on a same serving cell overlap in the time domain, the PUSCH of the lower priority can be dropped before multiplexing.

The method defines the PUCCH and PUSCH multiplexing method, specifies the behavior of the UE, and can improve the reliability of uplink transmission.

Mode 3:

PUCCHs and/or PUSCHs can be multiplexed and/or prioritized according to one or more of steps S121, S122, and S123 below.

Step S121: for each serving cell, if a PUSCH of the lower priority in a serving cell overlaps with a PUSCH of the higher priority in the serving cell in the time domain, the UE does not transmit (cancels transmission of) the PUSCH of the lower priority.

Step S122: if more than one PUCCH overlaps in the time domain, the more than one PUCCH is multiplexed and/or prioritized. For example, more than one PUCCH can be multiplexed and/or prioritized according to any suitable method.

Step S123: PUCCHs and/or PUSCHs are multiplexed and/or prioritized. For example, PUCCHs and/or PUSCHs can be multiplexed and/or prioritized according to any suitable method.

Steps S121, S122, and S123 in mode 3 can be performed in any order, or the steps S121, S122, and S123 can be performed simultaneously.

In step S123 of mode 3, the PUCCHs and/or PUSCHs can be multiplexed and/or prioritized according to the following sub-steps.

Sub-step 1: PUCCHs of the lower priority and/or PUSCHs of the lower priority and/or PUSCHs of the higher priority are multiplexed and/or prioritized. For example, PUCCHs of the lower priority and/or PUSCHs of the lower priority and/or of the higher priority can be multiplexed and/or prioritized according to any suitable method (for example, a predefined rule).

Sub-step 2: PUCCHs of the higher priority and/or PUSCHs of the lower priority and/or PUSCHs of the higher priority are multiplexed and/or prioritized. For example, PUCCHs of the higher priority and/or PUSCHs of the lower priority and/or PUSCHs of the higher priority can be multiplexed and/or prioritized according to any suitable method (for example, a predefined rule).

The order of the sub-step 1 and sub-step 2 can be exchanged, or the sub-step 1 and sub-step 2 can be performed simultaneously, without distinguishing the priorities of the PUCCHs.

This method can avoid cancellation of transmission after UCI is multiplexed in PUSCH, and the reliability of UCI transmission can be improved.

Mode 4:

The UE does not expect to multiplex a PUCCH with a HARQ-ACK of the higher priority in a PUSCH of the lower priority in a serving cell, where the PUSCH of the lower priority overlaps with another PUSCH of the higher priority in the serving cell in the time domain. This method is simple to implement and can reduce the complexity of the implementation of UE and base station.

Mode 5:

If a PUCCH and multiple PUSCHs overlap in the time domain, where the priority of the multiple PUSCHs is different from the priority of the PUCCH, the UE determines the PUSCH according to a predefined priority order. For example, the predefined priority order may include at least one of.

{a PUSCH without UCI, a PUSCH with UCI} (in order of the priority from high to low). If there are many types of UCI carried by a PUSCH, the UE may discard a part of UCIs. This method can avoid discarding UCI.

{a DG (dynamic grant) PUSCH without UCI, a DG PUSCH with UCI, a CG PUSCH without UCI, and a CG PUSCH with UCI} (in order of the priority from high to low). Compared with the CG PUSCH, the DG PUSCH can improve the reliability of UCI transmission. This method compromises the improvement of the reliability of UCI transmission with the discarding of UCIs. Under the premise of ensuring the reliability of UCI transmission, it is possible to avoid discarding UCI as much as possible.

{a PUSCH without CSI, and a PUSCH with CSI} (in order of the priority from high to low). If there are many types of UCIs carried by a PUSCH, the UE may discard a part of UCIs. This method can avoid discarding UCIs.

{a PUSCH with CSI, and a PUSCH without CSI} (in order of the priority from high to low).

{a DG PUSCH without CSI, a PUSCH with CSI (for example, a DG PUSCH), and a CG PUSCH (for example, a CG PUSCH without CSI)} (in order of the priority from high to low). If there are many types of UCIs carried by a PUSCH, the UE may discard a part of UCIs. This method can avoid discarding UCIs.

{a HP PUSCH without HP HARQ-ACK, a HP PUSCH with HP HARQ-ACK} (in order of the priority from high to low). If there are many types of UCIs carried by a PUSCH, the UE may discard a part of UCIs. This method can avoid discarding UCIs. LP HARQ-ACK may be missed, and this method can improve the reliability of the HP HARQ-ACK.

{an HP PUSCH with HP HARQ-ACK, and a HP PUSCH without HP HARQ-ACK} (in order of the priority from high to low).

Figure 10:
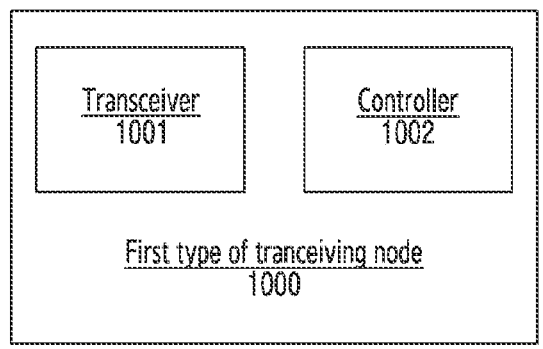
FIG. 10 illustrates a first type of transceiving node according to an embodiment.

FIG. 10 illustrates a first type of transceiving node 1000 according to an embodiment.

Referring to FIG. 10, the first type of transceiving node 1000 may include a transceiver 1001 and a controller 1002.

The transceiver 1001 may be configured to transmit a first type of data and/or a first type of control signaling to a second type of transceiving node and receive a second type of data and/or a second type of control signaling from the second type of transceiving node in the time unit.

The controller 1002 may be an ASIC or at least one processor. The controller 1002 may be configured to control the overall operation of the first type of transceiving node, including controlling the transceiver 1001 to transmit the first type of data and/or the first type of control signaling to the second type of transceiving node and receive the second type of data and/or the second type of control signaling from the second type of transceiving node in the time unit.

The controller 1002 may be configured to perform one or more operations in the methods of the various embodiments described above.

In the following description, a base station is taken as an example (but not limited thereto) to illustrate the first type of transceiving node, a UE is taken as an example, but is not limited thereto, to illustrate the second type of transceiving node. Downlink data and/or downlink control signaling, for example, is used to illustrate the first type of data and/or the first type of control signaling. A HARQ-ACK codebook may be included in the second type of control signaling, and uplink control signaling is used to illustrate the second type of control signaling.

Figure 11:
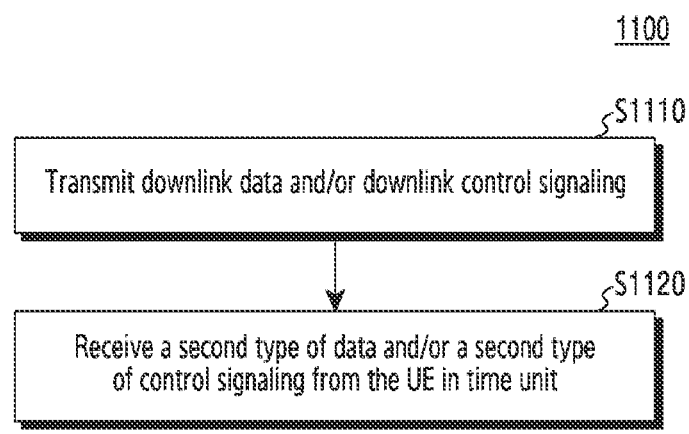
FIG. 11 illustrates a method performed by a base station according to an embodiment.

FIG. 11 illustrates a method 1100 performed by a base station according to an embodiment.

Referring to FIG. 11, in step S1110, the base station transmits downlink data and/or downlink control signaling.

In step S1120, the base station receives a second type of data and/or a second type of control signaling from the UE at the time unit.

For example, the method 1100 may include one or more of the operations performed by the base station described in embodiments of the present disclosure.

The uplink channel includes a PUCCH or a PUSCH.

According to various embodiments, a method performed by a second type of transceiving node in a wireless communication system, comprising: receiving a first type of data and/or a first type of control signaling from a first type of transceiving node; transmitting Uplink Control Information (UCI) to the first type of transceiving node, where if multiple Physical Uplink Control Channels (PUCCHs) with UCIs of different priorities overlap in time domain, the multiple PUCCHs are multiplexed and/or prioritized.

In some embodiments, wherein the UCI includes one or more of: Hybrid Automatic Repeat request-Acknowledgement (HARQ-ACK), Scheduling Request (SR), and Channel State Information (CSI).

In some embodiments, the method further comprising: if a PUCCH with HARQ-ACK of the lower priority and a PUCCH with an SR of the higher priority overlap in time domain, the multiple PUCCHs are multiplexed according to one of: the number of the HARQ-ACK bits of the lower priority and/or the format of the PUCCH with HARQ-ACK of the lower priority and/or the number of the PUCCH symbols; the format of the PUCCH with SR of the higher priority and/or the number of the HARQ-ACK bits of the lower priority and/or the format of the PUCCH with HARQ-ACK of the lower priority and/or the number of the PUCCH symbols; the starting symbol and/or the ending symbol of the PUCCH with SR of the higher priority and/or the starting symbol and/or the ending symbol of the PUCCH with HARQ-ACK of the lower priority; and the starting symbol and/or the ending symbol of the PUCCH with SR of the higher priority and/or the starting symbol and/or the ending symbol of the PUCCH with HARQ-ACK of the lower priority and/or the format of the PUCCH with SR of the higher priority and/or the number of the HARQ-ACK bits of the lower priority and/or the format of the PUCCH with HARQ-ACK of the lower priority and/or the number of the PUCCH symbols.

In some embodiments, wherein if a PUCCH with HARQ-ACK of the lower priority and a PUCCH with an SR of the higher priority overlap in time domain, and the PUCCH with HARQ-ACK of the lower priority has an associated DCI or DCI format or PDCCH, it is determined whether to support multiplexing of the multiple PUCCHs according to an indication in the DCI or DCI format or PDCCH; otherwise, if the PUCCH with HARQ-ACK of the lower priority does not have an associated DCI or DCI format or PDCCH, it is determined whether to support multiplexing of the multiple PUCCHs according to higher layer signaling parameters.

In some embodiments, wherein a time unit for multiplexing and/or prioritizing the multiple PUCCHs of different priorities is a slot, a PUCCH time unit of the higher priority, or a PUCCH time unit of the lower priority.

In some embodiments, wherein a length of the time unit is determined according to one of: a maximum value of the PUCCH time unit of the lower priority and the PUCCH time unit of the higher priority; a minimum value of the PUCCH time unit of the lower priority and the PUCCH time unit of the higher priority; and a least common multiple of the PUCCH time unit of the lower priority and the PUCCH time unit of the higher priority.

In some embodiments, the method further comprising: grouping PUCCHs satisfying a first specific condition in a slot in a set Q1.

In some embodiments, the method further comprising: sorting the PUCCHs in the set Q1 according to at least one rule of: the PUCCH time units are sorted according to the time order of the PUCCH time units; for PUCCHs in one PUCCH time unit, sorting is performed according to a sorting priority of the carried UCI; if one PUCCH overlaps with multiple PUCCH time units, the PUCCH is sorted according to a predefined rule; for a PUCCH with multiple UCI types, sorting is performed based on the highest priority of the sorting priorities among the multiple UCI types in the PUCCH according to a first predefined rule; for PUCCHs with a same UCI type, sorting is performed according to a second predefined rule; and a PUCCH with a negative SR that does not overlap with a PUCCH with HARQ-ACK and/or CSI in time domain is removed from the set Q1.

In some embodiments, the method further comprising: sorting the PUCCHs in the set Q1 according to at least one rule of: a PUCCH included in the PUCCH time unit of the higher priority is placed before a PUCCH included in the PUCCH time unit of the lower priority; in a same PUCCH time unit, a PUCCH with HARQ-ACK is placed before a PUCCH with an SR; in a same PUCCH time unit, a PUCCH with HARQ-ACK of the higher priority is placed before a PUCCH with HARQ-ACK of the lower priority; if the PUCCH with HARQ-ACK of the lower priority overlaps with one or more PUCCHs with UCIs in time domain, sorting of the PUCCH with HARQ-ACK of the lower priority is determined according to the types of UCIs in the one or more PUCCHs and the priority of the UCI; for a PUCCH with multiple UCI types, sorting is performed based on the highest priority of the sorting priorities among the multiple UCI types in the PUCCH according to a first predefined rule; for PUCCHs with a same UCI type, sorting is performed according to a second predefined rule; and a PUCCH with a negative SR that does not overlap with a PUCCH with HARQ-ACK and/or CSI in time domain is removed from the set.

In some embodiments, wherein multiplexing and/or prioritizing the multiple PUCCHs comprising: multiplexing and/or prioritizing PUCCHs of different priorities in one sequence of: multiplexing and/or prioritizing PUCCHs of the higher priority, and multiplexing and/or prioritizing PUCCHs of the lower priority and PUCCHs of the higher priority; or multiplexing and/or prioritizing PUCCHs of the higher priority, multiplexing and/or prioritizing PUCCHs of the lower priority and PUCCHs including a HARQ-ACK of the higher priority, and multiplexing and/or prioritizing PUCCHs of the lower priority and PUCCHs with SR of the higher priority; or multiplexing and/or prioritizing PUCCHs of the lower priority and PUCCHs with HARQ-ACK of the higher priority, multiplexing and/or prioritizing PUCCHs including the HARQ-ACK of the higher priority and the PUCCH with SR of the higher priority, and multiplexing and/or prioritizing PUCCHs of the lower priority and PUCCHs with SR of the higher priority.

In some embodiments, wherein the time unit is a PUCCH time unit of the higher priority, and the method further comprising: grouping PUCCHs satisfying a second specific condition in one PUCCH time unit of the higher priority in a set Q2; and if the PUCCH with HARQ-ACK of the lower priority overlaps with one or more PUCCH time units of the higher priority, determining to put the PUCCH with HARQ-ACK of the lower priority in the set Q2 which contains one of the one or more PUCCH time units of the higher priority, according to the types of UCI in the PUCCHs of the one or more PUCCH time units of the higher priority and the priorities of the UCI.

In some embodiments, wherein PUCCHs in the set Q2 are sorted according to at least one rule of: a PUCCH with HARQ-ACK is placed before a PUCCH with an SR; a PUCCH with HARQ-ACK of the higher priority is placed before a PUCCH with HARQ-ACK of the lower priority; for a PUCCH with multiple UCI types, sorting is performed based on the highest priority of the sorting priorities among the multiple UCI types in the PUCCH according to a third predefined rule; for PUCCHs with a same UCI type, sorting is performed according to a fourth predefined rule; and a PUCCH with a negative SR that does not overlap with a PUCCH with HARQ-ACK and/or CSI in time domain is removed from the set.

In some embodiments, wherein PUCCHs in the set Q2 are sorted according to at least one rule of: a PUCCH with HARQ-ACK of the higher priority is placed before a PUCCH with an SR; a PUCCH with HARQ-ACK of the higher priority is placed before a PUCCH with HARQ-ACK of the lower priority; a PUCCH with an SR of the higher priority is placed before a PUCCH with HARQ-ACK of the lower priority; PUCCHs with a same UCI type are sorted according to a fifth predefined rule; and a PUCCH with a negative SR that does not overlap with a PUCCH with HARQ-ACK and/or CSI in time domain is removed from the set.

In some embodiments, wherein PUCCHs in the set Q2 are sorted according to at least one rule of: a PUCCH with HARQ-ACK of the higher priority is placed before a PUCCH with an SR; a PUCCH with HARQ-ACK of the higher priority is placed before a PUCCH with HARQ-ACK of the lower priority; a PUCCH with HARQ-ACK of the lower priority is placed before a PUCCH with an SR of the higher priority; for a PUCCH with multiple UCI types, sorting is performed based on the highest priority of the sorting priorities among the multiple UCI types in the PUCCH according to a sixth predefined rule; for PUCCHs with a same UCI type, sorting is performed according to a seventh predefined rule; and a PUCCH with a negative SR that does not overlap with a PUCCH with HARQ-ACK and/or CSI in time domain is removed from the set.

In some embodiments, wherein PUCCHs in the set Q2 are sorted according to at least one rule of: sorting is performed according to the types of the carried UCI; PUCCHs with a same UCI type or PUCCHs with UCI types of a same highest sorting priority are sorted according to an eighth predefined rule; and a PUCCH with a negative SR that does not overlap with a PUCCH with HARQ-ACK and/or CSI in time domain is removed from the set.

Those skilled in the art will understand that the above illustrative embodiments are described herein and are not intended to be limiting. It should be understood that any two or more of the embodiments disclosed herein may be combined in any combination. Furthermore, other embodiments may be utilized and other changes may be made without departing from the spirit and scope of the subject matter presented herein. It will be readily understood that aspects of the invention of the present disclosure as generally described herein and shown in the drawings may be arranged, replaced, combined, separated and designed in various different configurations, all of which are contemplated herein.

Various functions described below can be implemented or supported by one or more computer programs, each of which being formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as a ROM, a RAM, a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Those skilled in the art will understand that the various illustrative logical blocks, modules, circuits, and steps described herein may be implemented as hardware, software, or a combination of both. To clearly illustrate this interchangeability between hardware and software, various illustrative components, blocks, modules, circuits, and steps are generally described above in the form of their functional sets. Whether such function sets are implemented as hardware or software depends on the specific application and the design constraints imposed on the overall system. Technicians may implement the described functional sets in different ways for each specific application, but such design decisions should not be interpreted as causing a departure from the scope of this application.

The various illustrative logic blocks, modules, and circuits described in this application may be implemented or performed by a general purpose processor, a digital signal processor (DSP), an ASIC, a field programmable gate array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm described in this application may be embodied directly in hardware, in a software module executed by a processor, or in a combination thereof. The software module may reside in RAM memory, flash memory, ROM memory, erasable programmable ROM (EPROM) memory, electronically erasable programmable ROM (EEPROM) memory, register, hard disk, removable disk, or any other form of storage medium known in the art. An exemplary storage medium is coupled to a processor to enable the processor to read and write information from/to the storage media. In an alternative, the storage medium may be integrated in the processor. The processor and the storage medium may reside in an ASIC. The ASIC may reside in a user terminal. In an alternative, the processor and the storage medium may reside in the user terminal as discrete components.

In other designs, the functions may be implemented in hardware, software, firmware, or any combination thereof. If implemented in software, each function may be stored or delivered as one or more pieces of instructions or codes on a computer-readable medium. The computer-readable medium includes both a computer storage medium and a communication medium, the latter including any medium that facilitates the transfer of computer programs from one place to another. The storage medium may be any available medium that can be accessed by a general purpose or special purpose computer.

While the disclosure has been described with reference to various embodiments, various changes may be made without departing from the spirit and the scope of the present disclosure, which is defined, not by the detailed description and embodiments, but by the appended claims and their equivalents.

What is claimed is:

1. A method performed by a user equipment (UE) in a wireless communication system, the method comprising:
   receiving, from a base station, first configuration information for multiplexing uplink control information (UCI) with different priorities;
   receiving, from the base station, second configuration information indicating a subslot length for a physical uplink control channel (PUCCH);
   determining an overlapping for uplink transmissions of different priorities;
   resolving a first overlapping for uplink transmissions of a same priority, wherein the uplink transmissions of the same priority include a PUCCH transmission and a physical uplink shared channel (PUSCH) transmission;
   after resolving the first overlapping, resolving a second overlapping for PUCCH transmissions of different priorities, wherein a PUCCH transmission of a smaller priority among the PUCCH transmissions is associated with a first overlapping slot with the subslot length for the PUCCH of a larger priority;
   after resolving the second overlapping, resolving a third overlapping for a PUCCH transmission and a PUSCH transmission of different priorities; and
   performing an uplink transmission to the base station.

2. The method of claim 1, wherein the PUCCH transmissions include a first PUCCH transmission with a hybrid automatic repeat request-acknowledgement (HARQ-ACK) of a smaller priority and a second PUCCH transmission, and wherein the second PUCCH transmission includes a PUCCH transmission with a HARQ-ACK of a larger priority, or a PUCCH transmission with a HARQ-ACK and a scheduling request (SR) of a larger priority.

3. A user equipment (UE) in a wireless communication system, the UE comprising:
   a transceiver; and
   at least one processor coupled with the transceiver and configured to:
      receive, from a base station, first configuration information for multiplexing uplink control information (UCI) with different priorities,
      receive, from the base station, second configuration information indicating a subslot length for a physical uplink control channel (PUCCH),
      determine an overlapping for uplink transmissions of different priorities, resolve a first overlapping for uplink transmissions of a same priority, wherein the uplink transmissions of the same priority include a PUCCH transmission and a physical uplink shared channel (PUSCH) transmission, after resolving the first overlapping, resolve a second overlapping for PUCCH transmissions of different priorities, wherein a PUCCH transmission of a smaller priority among the PUCCH transmissions is associated with a first overlapping slot with the subslot length for the PUCCH of a larger priority, after resolving the second overlapping, resolve a third overlapping for a PUCCH transmission and a PUSCH transmission of different priorities, and perform an uplink transmission to the base station.

4. The UE of claim 3, wherein the PUCCH transmissions includes a first PUCCH transmission with a hybrid automatic repeat request-acknowledgement (HARQ-ACK) of a smaller priority and a second PUCCH transmission, and wherein the second PUCCH transmission includes a PUCCH transmission with a HARQ-ACK of a larger priority, or a PUCCH transmission with a HARQ-ACK and a scheduling request (SR) of a larger priority.

* * * * *